(12) United States Patent
Nordlin et al.

(10) Patent No.: US 10,486,248 B2
(45) Date of Patent: Nov. 26, 2019

(54) CUTTING TOOL

(71) Applicant: Greenlee Textron Inc., Rockford, IL (US)

(72) Inventors: William Frederick Nordlin, Poplar Grove, IL (US); Benjamin R. Vander Loop, Rockford, IL (US)

(73) Assignee: Greenlee Tools, Inc., Rockford, IL (US)

( * ) Notice: Subject to any disclaimer, the term of this patent is extended or adjusted under 35 U.S.C. 154(b) by 35 days.

(21) Appl. No.: 15/617,298

(22) Filed: Jun. 8, 2017

(65) Prior Publication Data

US 2018/0354044 A1   Dec. 13, 2018

(51) Int. Cl.
| | |
|---|---|
| *B23D 21/10* | (2006.01) |
| *B26B 13/28* | (2006.01) |
| *B23D 29/00* | (2006.01) |

(52) U.S. Cl.
CPC ........... *B23D 21/10* (2013.01); *B23D 29/002* (2013.01); *B26B 13/28* (2013.01)

(58) Field of Classification Search
CPC ........ B23D 21/10; B23D 29/002; B26B 13/28
See application file for complete search history.

(56) References Cited

U.S. PATENT DOCUMENTS

| | | | | |
|---|---|---|---|---|
| 4,312,127 A | * | 1/1982 | Tanaka ................... | B23D 21/10 30/250 |
| 4,674,184 A | * | 6/1987 | Anderson ............... | B26D 3/169 30/251 |
| 5,718,051 A | * | 2/1998 | Huang .................... | B23D 21/10 30/250 |
| 6,098,291 A | * | 8/2000 | Wang ..................... | B23D 21/06 30/190 |
| 6,237,449 B1 | | 5/2001 | Orlosky | |
| 6,305,087 B1 | * | 10/2001 | Huang .................... | B23D 21/10 30/188 |
| 6,370,780 B1 | | 4/2002 | Robertson et al. | |

(Continued)

FOREIGN PATENT DOCUMENTS

| | | |
|---|---|---|
| EP | 1195216 | 4/2002 |
| EP | 1236529 | 5/2003 |

(Continued)

OTHER PUBLICATIONS

English translation of WO 2018/120841 A1, publication date Jul. 2018.*

(Continued)

*Primary Examiner* — Hwei-Siu C Payer
(74) *Attorney, Agent, or Firm* — Klintworth & Rozenblat IP LLP

(57) ABSTRACT

A cutting tool according to some embodiments of the disclosure includes a stationary handle and a movable handle pivotally attached thereto, a blade receiving gear mounted on the stationary handle, a blade removably mounted to the blade receiving gear, and a spring-loaded slide plate mounted to the blade receiving gear for holding the blade in the blade receiving gear. The blade seats within a notch of the blade receiving gear and the slide plate engages with a notch in the blade. The slide plate can be removed without the use of tools from engagement with the blade to allow user to easily remove the blade from the cutting tool.

28 Claims, 49 Drawing Sheets

(56) References Cited

U.S. PATENT DOCUMENTS

| | | | |
|---|---|---|---|
| 6,393,700 B1 | 5/2002 | Babb | |
| 6,401,340 B1 | 6/2002 | King | |
| 6,658,738 B1 | 12/2003 | King | |
| D485,150 S | 1/2004 | Loparo | |
| 6,739,055 B2 | 5/2004 | Lee | |
| 7,127,819 B1 * | 10/2006 | Huang | B23D 21/06 30/92 |
| 7,159,319 B2 | 1/2007 | Huang | |
| 7,204,021 B2 | 4/2007 | Houseman et al. | |
| D583,208 S * | 12/2008 | Huang | D8/60 |
| 7,716,840 B2 | 5/2010 | Nandkumar et al. | |
| 7,743,509 B2 | 6/2010 | Macsay et al. | |
| D626,812 S | 11/2010 | Macsay et al. | |
| D660,116 S | 5/2012 | Owen et al. | |
| 8,266,991 B2 | 9/2012 | Thorson et al. | |
| 8,683,704 B2 | 4/2014 | Scott et al. | |
| 8,763,257 B2 | 7/2014 | Thorson et al. | |
| 8,875,404 B2 | 11/2014 | Scott et al. | |
| 9,216,465 B2 * | 12/2015 | Ronan | B23D 21/10 |
| 9,302,402 B2 | 4/2016 | Thorson et al. | |
| 9,308,660 B2 | 4/2016 | Macsay et al. | |
| 9,622,422 B2 * | 4/2017 | Hsu | B26B 13/26 |
| 2004/0134073 A1 * | 7/2004 | Kochi | B25B 7/12 30/92 |
| 2012/0102752 A1 | 5/2012 | Steele et al. | |
| 2013/0097873 A1 | 4/2013 | Luo et al. | |
| 2014/0173907 A1 | 6/2014 | Scott et al. | |
| 2014/0182137 A1 | 7/2014 | Liu et al. | |
| 2014/0366382 A1 | 12/2014 | Krause et al. | |
| 2016/0059327 A1 * | 3/2016 | Han | B23D 21/06 30/92 |
| 2016/0214265 A1 | 7/2016 | Thorson et al. | |
| 2018/0222065 A1 * | 8/2018 | Chen | B26B 13/04 |
| 2018/0326513 A1 * | 11/2018 | Chen | B26D 3/169 |
| 2018/0354044 A1 * | 12/2018 | Nordlin | B23D 29/002 |

FOREIGN PATENT DOCUMENTS

| | | |
|---|---|---|
| EP | 2162265 | 3/2010 |
| WO | WO 2018/120841 A1 * | 7/2018 |

OTHER PUBLICATIONS

RIDGID RC-1625 Plastic Pipe Cutter, published at least as early as Jun. 7, 2016, 1 page.

Instruction Manual for 864 PVC Cutter, Greenlee Textron, 1997, 2 pages.

Instruction Manual for 865 PVC Cutter, Greenlee Textron, 2000, 2 pages.

Press Release, Lenox Press Releases Lenox Introduces the Plastic Tubing Cutter, 2009, 1 page.

Catalog for Lenox Hand Tools, lenoxtools.com, published at least as early as 2011, 17 pages.

Kobalt 1-1/4 in PVC Pipe Cutter #0150994, Lowe's Brand, published at least as early as May 2016, 1 page.

\* cited by examiner

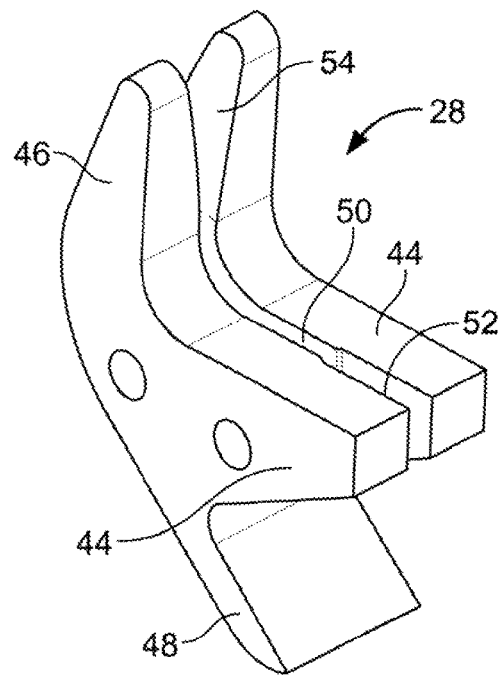
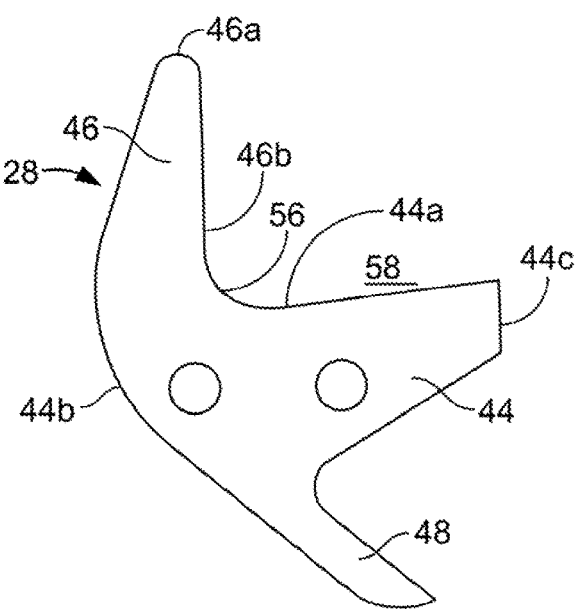
FIG. 6                FIG. 7
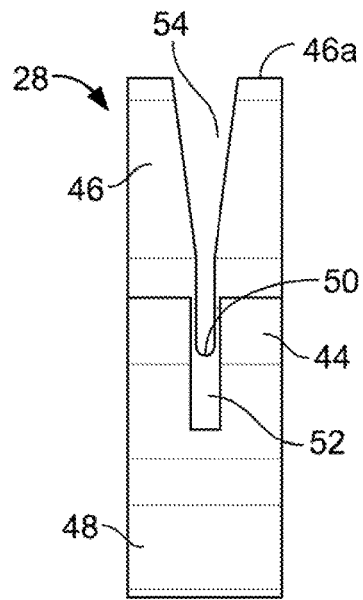
FIG. 8

CUTTING TOOL

FIELD OF THE DISCLOSURE

The present disclosure relates to a cutting tool configured to cut a workpiece, such as conduit, pipe and tubing.

BACKGROUND

Prior art cutting tools are known for cutting rigid polyvinyl chloride conduit and pipe and flexible plastic and rubber tubing. It is desirable to allow for the replacement of a blade of the cutting tool when the blade becomes worn. Prior art cutting tools have used fasteners to attach the blades to the cutting tool. When a blade becomes worn, the fasteners must be removed, usually with the use of tools, to remove the blade from the cutting tool.

SUMMARY

A cutting tool configured to cut workpieces, such as conduit, pipe and tubing according to some embodiments of the disclosure includes a stationary handle and a movable handle pivotally attached thereto, a blade receiving gear mounted on the stationary handle, a blade removably mounted to the blade receiving gear, and a spring-loaded slide plate mounted to the blade receiving gear for holding the blade in the blade receiving gear. The blade seats within a notch of the blade receiving gear and the slide plate engages with a notch in the blade. The slide plate can be removed without the use of tools from engagement with the blade to allow user to easily remove the blade from the cutting tool.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which:

FIG. 6 is a perspective view of an anvil of the tool;
FIG. 7 is a side elevation view of the anvil;
FIG. 8 is a rear plan view of the anvil.

DETAILED DESCRIPTION

Figure 1:
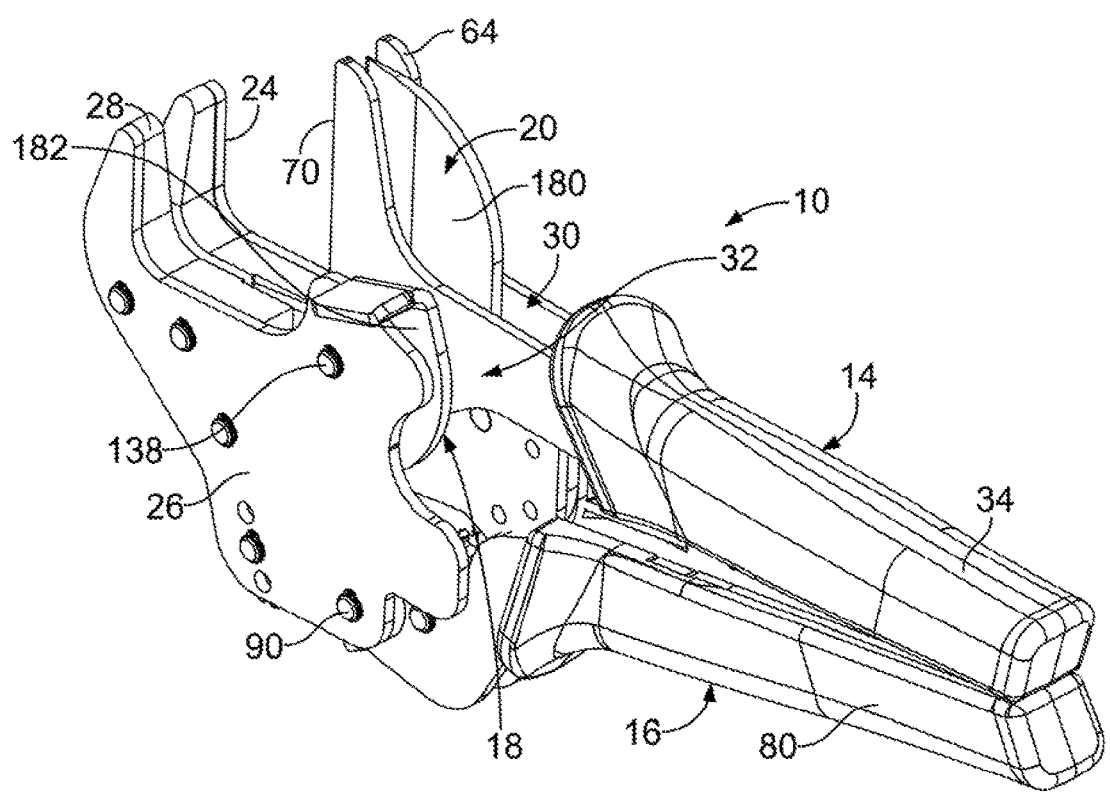
FIG. 1 is a perspective view of a tool.
Figure 2:
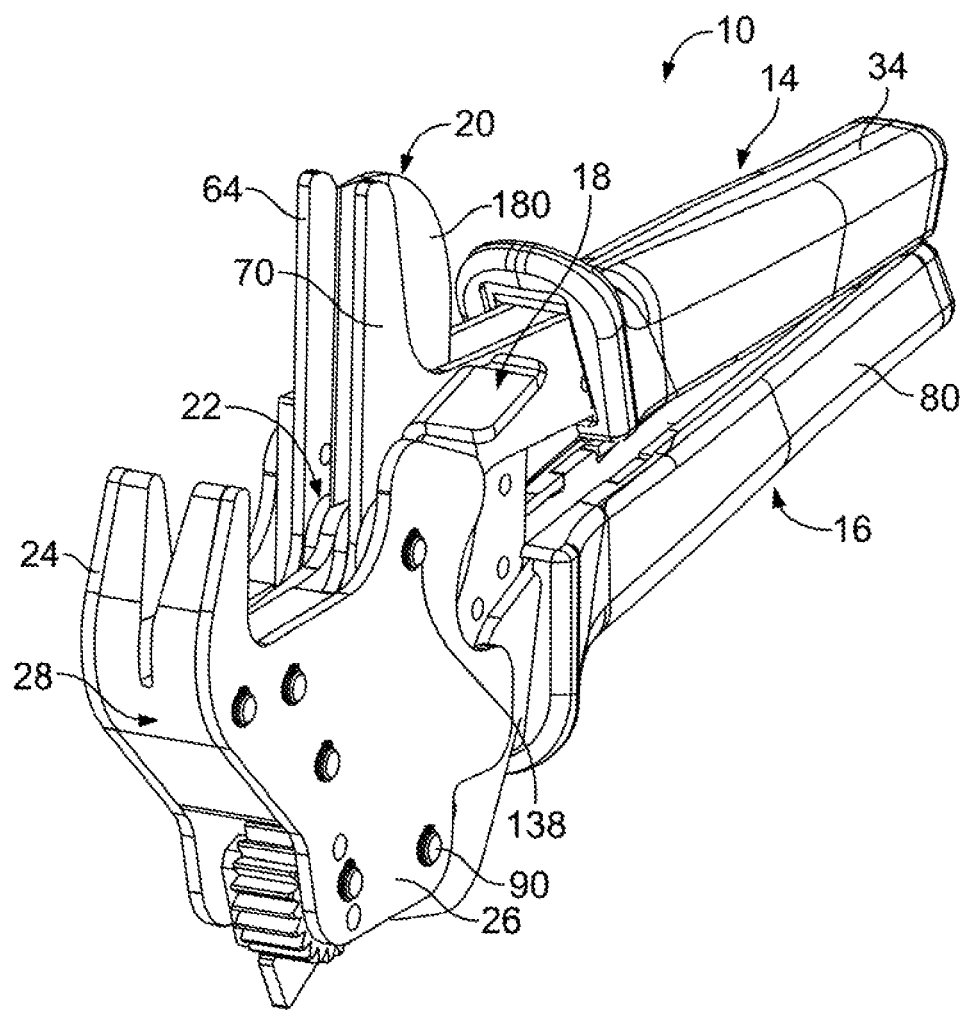
FIG. 2 is an alternate perspective view of a tool.
Figure 3:
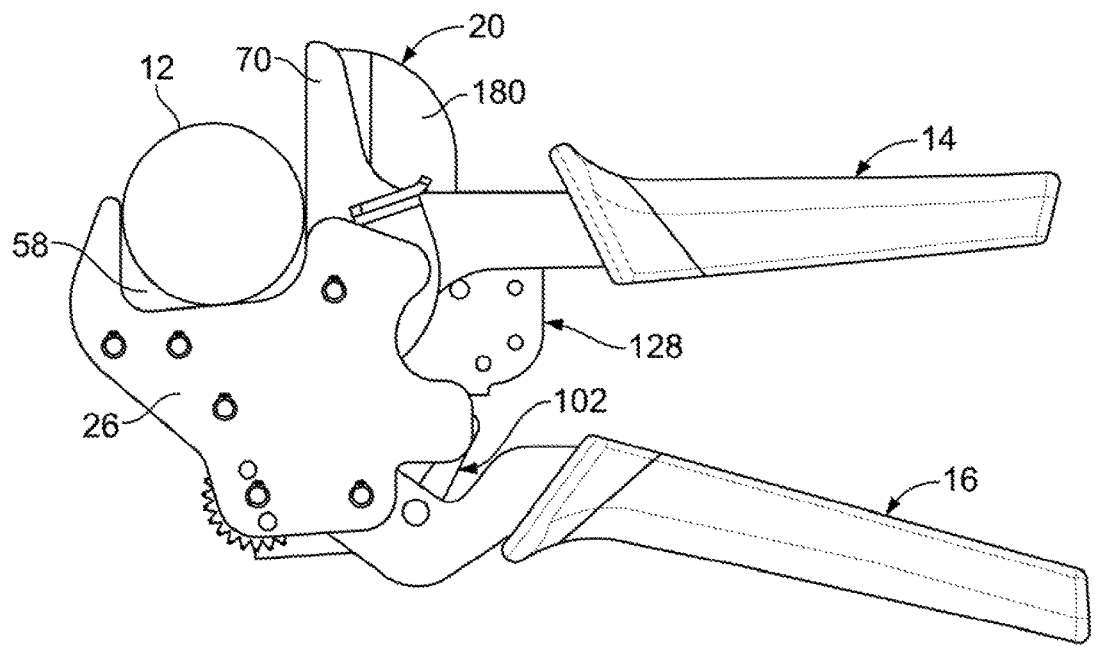
FIG. 3 is a side elevation view of the tool having a workpiece of a first diameter seated therein.

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

Directional terms such as front, rear upper, lower, top, bottom etc. are used herein for ease of description and do not denote a required orientation in use.

A tool 10, 1010 is provided for engagement with a workpiece 12. In some embodiments, the tool 10, 1010 is a cutting tool and is configured to cut a workpiece 12. In some embodiments, the workpiece 12 may be polyvinyl chloride (PVC) rigid plastic conduit and pipe used in plumbing and electrical applications. In some embodiments, the workpiece 12 may be flexible plastic and rubber tubing used in plumbing and heating, ventilation and air conditioning (HVAC) applications. Other workpieces 12 may be engaged by the tool 10, 1010. FIGS. 1-32 illustrate a single handed, hand-held tool 10. FIGS. 33-73 illustrate a dual handed, hand-held tool 1010.

Attention is invited to the single handed, hand-held tool 10 shown in FIGS. 1-32. The tool 10 of some embodiments is designed to cut PVC conduit and pipe up to 1¼ conduit size (1.62 in/32 mm OD), polyethylene, polybutylene. However, it will be appreciated that the tool 10 of various embodiments may additionally or alternatively be used to cut other diameters of workpieces 12 and workpieces 12 made of alternative materials. The tool 10 is designed to be held in a single hand of the user for one-handed operation.

In an embodiment, the tool 10 includes a stationary handle 14 pivotally attached to a movable handle 16, a release assembly 18, a blade 20 pivotally attached to the stationary handle 14, and a blade receiving assembly 22.

The stationary handle 14 includes first and second jaws 24, 26, an anvil 28 mounted between the jaws 24, 26, a first elongated member 30 mounted between the first jaw 24 and the anvil 28, a second elongated member 32 mounted between the second jaw 26 and the anvil 28, and a grip 34 attached to the first and second elongated members 30, 32. The jaws 24, 26, the anvil 28 and the elongated members 30, 32 are fixedly attached to each other.

As used herein, "fixedly attached" means that the components are attached to each other such that the components do not move relative to each other.

Figure 5:
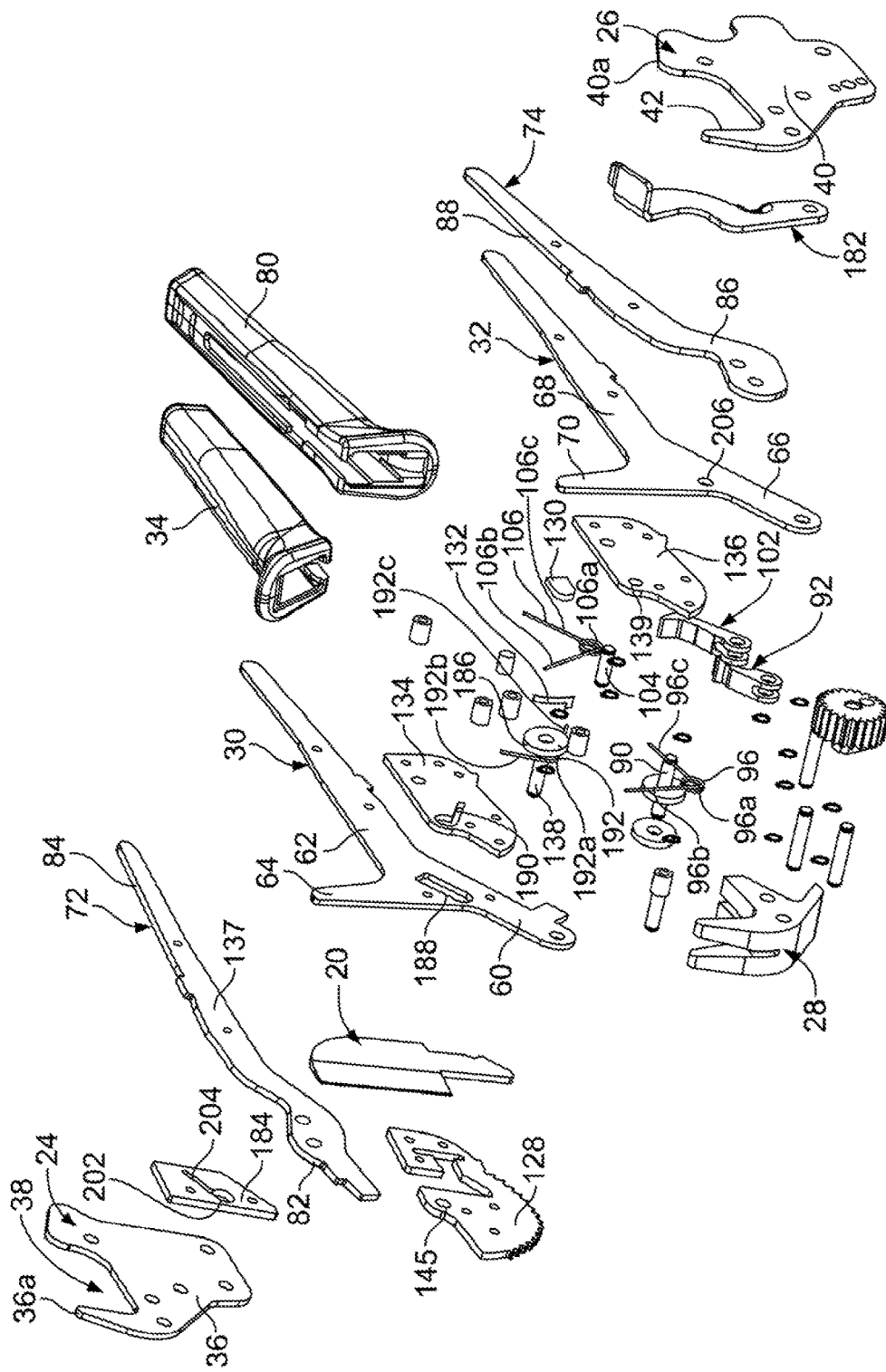
FIG. 5 is an exploded perspective view of the tool.

As shown in FIG. 5, the first jaw 24 is formed of a plate 36 having planar side surfaces which are defined by a front edge, a rear edge, a top edge 36a and a bottom edge. A cutout 38 is provided in the plate 36 and extends downwardly from the top edge 36a. In an embodiment, the first jaw 24 is generally square. The second jaw 26 is formed of a plate 40 having planar side surfaces which are defined by a front edge, a rear edge, a top edge 40a and a bottom edge. A cutout 42 is provided in the top edge 40a. In an embodiment, the second jaw 26 is generally square. The first and second jaws 24, 26 may be identically formed.

As shown in FIGS. 6-8, the anvil 28 is formed of a generally T-shaped member having a base 44, an upper leg 46 extending upwardly from the base 44, and a lower leg 48 extending downwardly from the base 44.

The base 44 has side surfaces and upper, lower, front and rear surfaces extending between the side surfaces. In an embodiment, the base 44 has a recess 50 which extends downwardly from the upper surface 44a and from the front surface 44b rearwardly and has a slot 52 which bifurcates the base 44 and which extends from the rear surface 44c forwardly to the recess 50. The recess 50 and the slot 52 are aligned with each other. In an embodiment, the recess 50 is U-shaped. In an embodiment, the slot 52 is eliminated and the recess 50 extends along the entire upper surface 44a of the anvil 28.

The upper leg 46 has side surfaces and upper, front and rear surfaces extending between the side surfaces. The upper leg 46 extends upwardly from the front end of the base 44 and is generally perpendicular to the base 44. In an embodiment, the upper leg 46 is curved. The upper leg 46 is bifurcated by a slot 54 which extends from the upper surface 46a downwardly to the recess 50 in the base 44. The recess 50 and the slots 52, 54 are aligned with each other.

Figure 4:
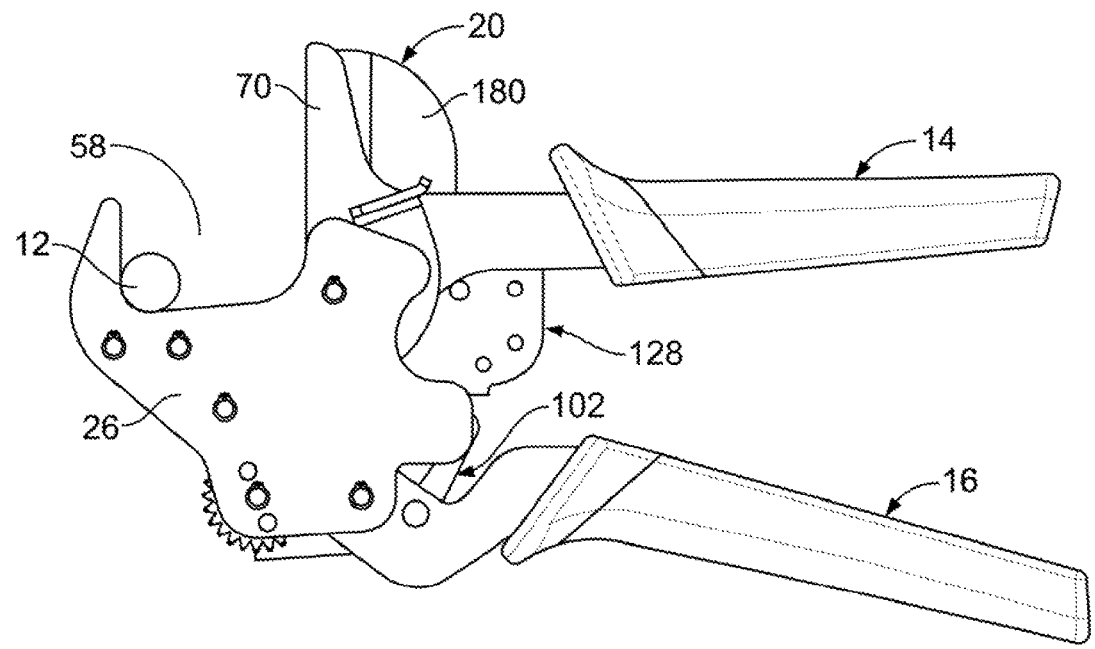
FIG. 4 is a side elevation view of the tool having a workpiece of a second diameter seated therein.

The upper surface 44a of the base 44 and the rear surface 46b of the upper leg 46 are generally perpendicular to each other and meet at a corner 56. The upper surface 44a of the base 44, the rear surface 46b of the upper leg 46, and the corner 56 define a receiving space 58 into which workpiece 12 is seated so that the workpiece 12 can be cut and a square cut is obtained. In an embodiment, the corner 56 is radiused. In an embodiment, the corner 56 is radiused at a radius of 0.540 inches so that a workpiece 12 having a radius of 0.540 inches seats in the corner 56, as shown in FIG. 4.

The lower leg 48 has side surfaces and upper, front and rear surfaces extending between the side surfaces. The lower leg 48 extends downwardly from the front end of the base 44 and is generally perpendicular to the base 44. In an embodiment, the lower leg 48 is curved.

Figure 9:
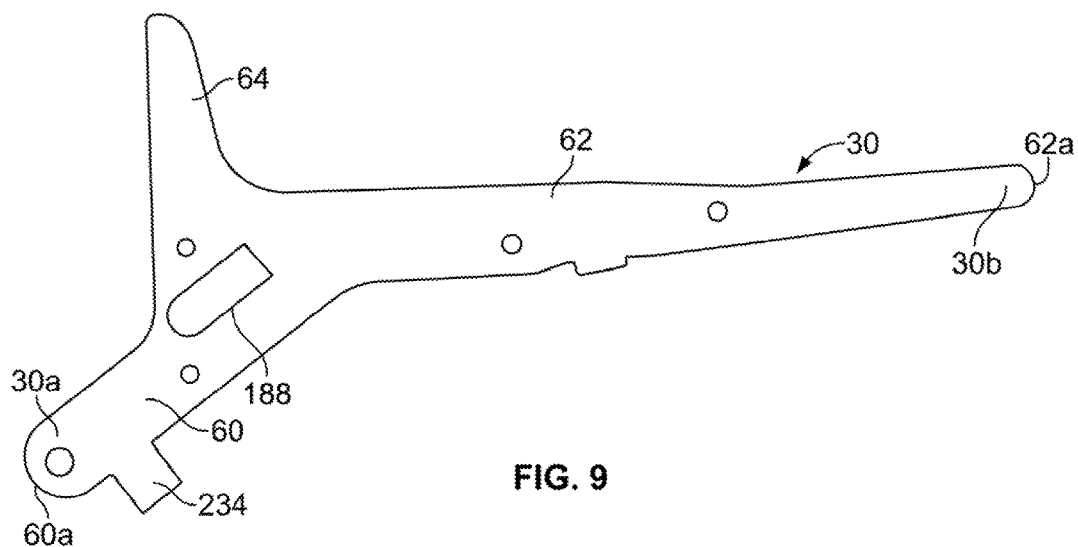
FIG. 9 is a side elevation view of a first elongated member of a stationary handle of the tool.
Figure 10:
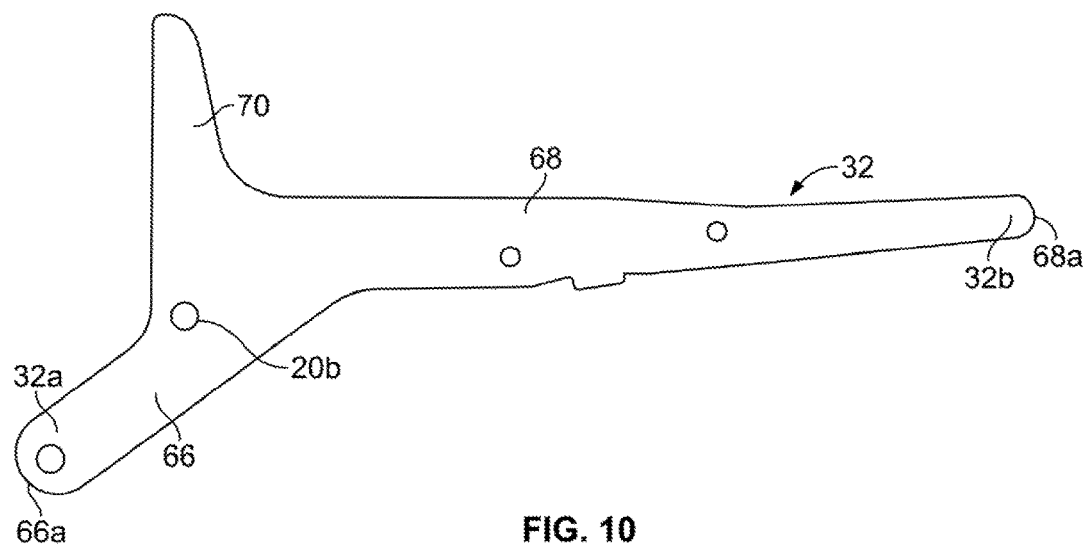
FIG. 10 is a side elevation view of a second elongated member of the stationary handle of the tool.

As shown in FIGS. 9 and 10, the first elongated member 30 has an elongated front portion 60, an elongated rear portion 62 and an intermediate portion 64. The front portion 60 has inner and outer planar surfaces and front, top and bottom surfaces extending therebetween. The front surface 60a of the front portion 60 forms a front end 30a of the first elongated member 30. The rear portion 62 has inner and outer planar surfaces and rear, top and bottom surfaces extending therebetween. The rear surface 62a of the rear portion 62 forms a rear end 30b of the first elongated member 30. The rear portion 62 extends from the rear end of the front portion 60. The front and rear portions 60, 62 are angled relative to each other. The intermediate portion 64 has planar inner and outer surfaces and front, rear and top surfaces extending therebetween. The intermediate portion 64 extends upwardly from the rear end of the front portion 60. The intermediate portion 64 extends at an angle relative to the front portion 60 and relative to the rear portion 62.

The second elongated member 32 has an elongated front portion 66, an elongated rear portion 68 and an intermediate portion 70. The front portion 66 has inner and outer planar surfaces and front, top and bottom surfaces extending therebetween. The front surface 66a of the front portion 66 forms a front end 32a of the second elongated member 32. The rear portion 68 has inner and outer planar surfaces and rear, top and bottom surfaces extending therebetween. The rear surface 68a of the rear portion 68 forms a rear end 32b of the second elongated member 32. The rear portion 68 extends from the rear end of the front portion 66. The front and rear portions 66, 68 are angled relative to each other. The intermediate portion 70 has planar inner and outer surfaces and front, rear and top surfaces extending therebetween. The intermediate portion 70 extends upwardly from the rear end of the front portion 66. The intermediate portion 70 extends at an angle relative to the front portion 66 and relative to the rear portion 68.

The anvil 28 seats between the jaws 24, 26 such that the cutouts 38, 42 in the jaws 24, 26 align with the receiving space 58 formed by the anvil 28. The jaws 24, 26 extend rearwardly of the anvil 28. The jaws 24, 26 do not overlap the receiving space 58 such the workpiece 12 can be seated in the cutouts 38, 42 in the jaws 24, 26 and the receiving space 58 formed by the anvil 28. In an embodiment, the recesses in the jaws 24, 26 mirror the shape of the receiving space 58. The jaws 24, 26 are fixedly attached to the anvil 28 by suitable means, such as fasteners.

The front end 30a of the first elongated member 30 is fixedly attached to the jaw 24, and a rear section of the front portion 60 extends rearwardly of the rear end of the base 44 of the anvil 28. The first jaw 24 and the first elongated member 30 are fixedly attached to each other by suitable means, such as fasteners. The intermediate portion 64 of the first elongated member 30 extends upwardly in the same direction as the upper leg 46 of the anvil 28. The intermediate portion 64 is spaced from the rear surface 44c of the base 44. The front end 32a of the second elongated member 32 is fixedly attached to the jaw 26, and a rear section of the front portion 66 extends rearwardly of the rear surface 44c of the base 44 of the anvil 28. The second jaw 26 and the second elongated member 32 are fixedly attached to each other by suitable means, such as fasteners. The intermediate portion 70 of the second elongated member 32 extends upwardly in the same direction as the upper leg 46 of the anvil 28. The intermediate portion 70 is spaced from the rear surface 44c of the base 44. The front portions 60, 66 of the elongated members 30, 32 are fixedly attached to the anvil 28 by suitable means, such as fasteners. The front portions 60, 66 align with each other; the rear portions 62, 68 align with each other; and the intermediate portions 64, 70 align with each other. In an embodiment, the elongated members 30, 32 are integrally formed with the anvil 28. In an embodiment, the elongated members 30, 32, the anvil 28 and the jaws 24, 26 are integrally formed. The grip 34 is attached to the rear portions 62, 68 to provide a grasping region for a user to grasp during operation of the tool 10. While separate first and second elongated members 30, 32 are shown and described herein, it is to be understood that the rear portions 62, 68 of the first and second elongated members 30, 32 can be integrally formed with each other to form a single elongated member, with the front and intermediate portions 60, 66, 64, 70 separated from each other by a slot.

The movable handle 16 includes a first elongated member 72, a second elongated member 74, a holding pawl assembly 76 mounted on the movable handle 16, a driving pawl assembly 78 mounted on the movable handle 16, and a grip 80 attached to the first and second elongated members 72, 74. Directions of rotation of the movable handle 16 are described herein for ease in description with respect to the tool 10 having its receiving space 58 to the left as shown in FIGS. 1-4, 23-25, 27 and 31.

Figure 11:
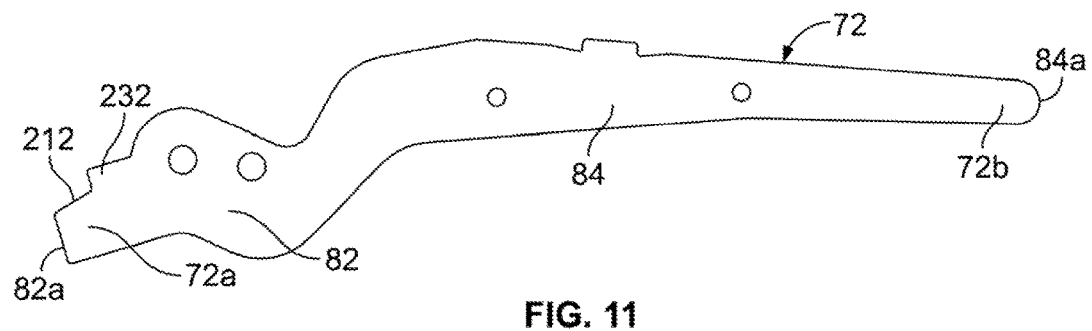
FIG. 11 is a side elevation view of a first elongated member of a movable handle of the tool.
Figure 12:
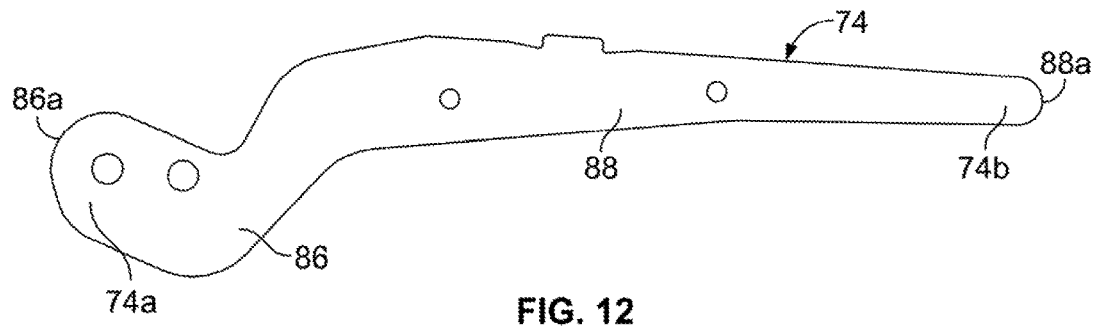
FIG. 12 is a side elevation view of a second elongated member of the movable handle of the tool.

As shown in FIGS. 11 and 12, the first elongated member 72 has an elongated front portion 82 and an elongated rear portion 84. The front portion 82 has inner and outer planar surfaces and front, top and bottom surfaces extending therebetween. The front surface 82a of the front portion 82 forms a front end 72a of the first elongated member 72. The rear portion 84 has inner and outer planar surfaces and rear, top and bottom surfaces extending therebetween. The rear surface 84a of the rear portion 84 forms a rear end 72b of the first elongated member 72. The rear portion 84 extends from the rear end of the front portion 82. The front portion 82 is offset from the rear portion 84 such that a dogleg shape is formed by the first elongated member 72.

The second elongated member 74 has an elongated front portion 86 and an elongated rear portion 88. The front portion 86 has inner and outer planar surfaces and front, top and bottom surfaces extending therebetween. The front surface 86a of the front portion 86 forms a front end 74a of the second elongated member 74. The rear portion 88 has inner and outer planar surfaces and rear, top and bottom surfaces extending therebetween. The rear surface 88a of the rear portion 88 forms a rear end 74b of the second elongated member 74. The rear portion 88 extends from the rear end of the front portion 86. The front portion 86 is offset from the rear portion 88 such that a dogleg shape is formed by the second elongated member 74.

The front end 72a of the first elongated member 72 is pivotally attached to the inner surface of the first jaw 24 at a bottom end thereof, and a rear section of the front portion 82 and the rear portion 84 extends rearwardly of the first jaw 24. The front end 74a of the second elongated member 74 is pivotally attached to the inner surface of the second jaw 26, and a rear section of the front portion 86 and the rear portion 88 extends rearwardly of the second jaw 26. A pivot pin 90 extends through the first jaw 24, the first elongated member 72, the second elongated member 74 and the second jaw 26 to pivotally attach the first and second elongated members 72, 74 to the jaws 24, 26. The front portions 82, 86 align with each other; and the rear portions 84, 88 align with each other. The grip 80 is attached to the rear portions 84, 88 to provide a grasping region for a user to grasp during operation of the tool 10. While separate first and second elongated members 72, 74 are shown and described herein, it is to be understood that the rear portions 84, 88 of the first and second elongated members 72, 74 can be integrally formed with each other to form a single elongated member, with the front portions 82, 86 separated from each other by a slot.

The holding pawl assembly 76 has a holding pawl 92 pivotally mounted between the first and second elongated members 72, 74 of the movable handle 16 by the pivot pin 90, and a holding pawl torsion spring 96.

Figure 13:
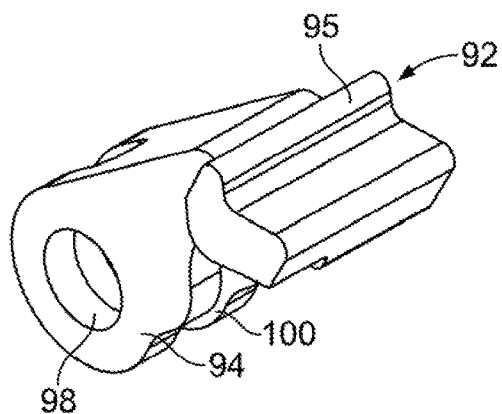
FIG. 13 is a perspective view of a holding pawl of the tool.
Figure 14:
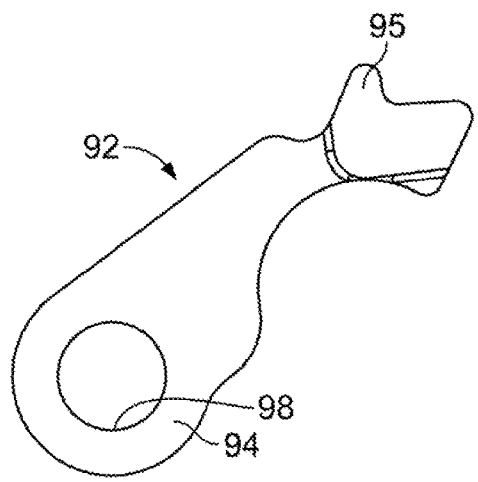
FIG. 14 is a side elevation view of the holding pawl.
Figure 15:
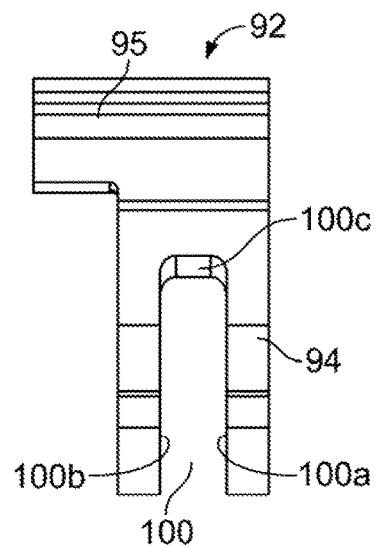
FIG. 15 is a rear plan view of the holding pawl.

As shown in FIGS. 13-15, the holding pawl 92 has a body 94 with a tooth 95 extending from an upper end of the body 94. An aperture 98 is provided through the body 94 proximate to the lower end thereof. A portion of the body 94 is bifurcated by a slot 100 which extends from a lower end of the body 94 upwardly. The slot 100 is formed of a first side wall 100a which extends upwardly from the lower end of the body 94, a second side wall 100b which extends upwardly from the lower end of the body 94, and a top wall 100c connecting the upper ends of the side walls 100a, 100b. Each wall 100a, 100b, 100c extends from a front end of the body 94 to a rear end of the body 94. In an embodiment, the top wall 100c is angled from the front end to the rear end of the body 94. The pivot pin 90 extends through the aperture 98.

The holding pawl torsion spring 96, see FIG. 5, seats within the slot 100 and has a coiled portion 96a wrapped around the pivot pin 90 and legs 96b, 96c extending outwardly therefrom. The upper leg 96b extends outwardly from the coiled portion 96a and engages the top wall 100c of the holding pawl 92, and the lower leg 96c extends outwardly from the coiled portion 96a and engages with the pin 104. The holding pawl torsion spring 96 normally biases the holding pawl 92 in a counter-clockwise direction around the pivot pin 90.

The driving pawl assembly 78 has a driving pawl 102 mounted between the first and second elongated members 72, 74 of the movable handle 16 and pivotally attached to the first and second elongated members 72, 74 by a driving pawl pin 104, and a driving pawl torsion spring 106. The driving pawl pin 104 is attached to the first and second elongated members 72, 74 proximate to, but spaced rearwardly of, the pivot pin 90 such that the driving pawl 102 is mounted rearwardly of the holding pawl 92. The driving pawl 102 is longer than the holding pawl 92.

Figure 16:
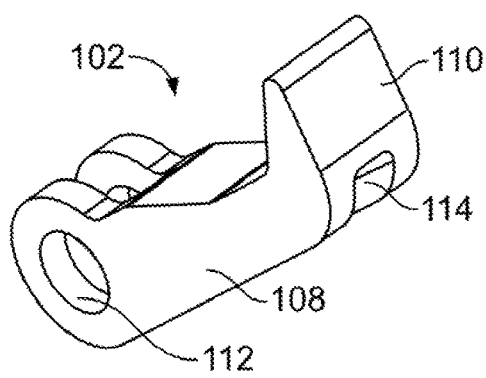
FIG. 16 is a perspective view of a driving pawl of the tool.
Figure 17:
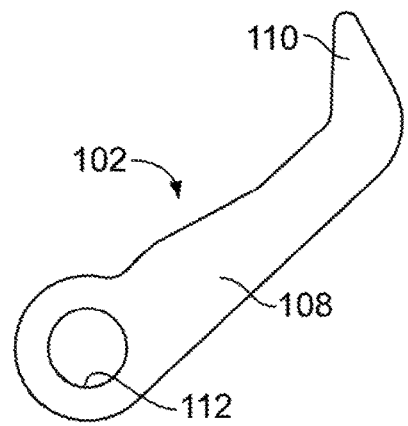
FIG. 17 is a side elevation view of the driving pawl.
Figure 18:
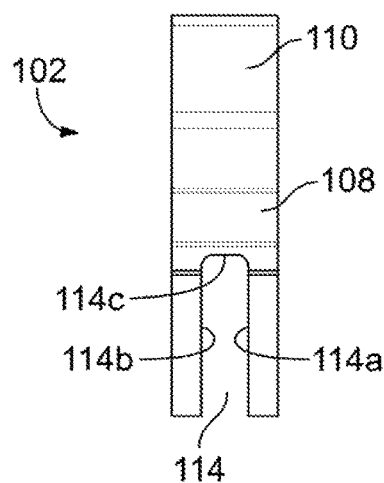
FIG. 18 is a rear plan view of the driving pawl.

As shown in FIGS. 16-18, the driving pawl 102 has a body 108 with a hook end 110 extending from an upper end of the body 108. An aperture 112 is provided through the body 108 proximate to the lower end of the body 108. The driving pawl pin 104 extends through the aperture 112. A portion of the body 108 is bifurcated by a slot 114 which extends from a lower end of the body 108 upwardly. The slot 114 is formed of a first side wall 114a which extends upwardly from the lower end of the body 108, a second side wall 114b which extends upwardly from the lower end of the body 108, and a top wall 114c connecting the upper ends of the side walls 114a, 114b. Each wall 114a, 114b, 114c extends from a front end of the body 108 to a rear end of the body 108. In an embodiment, the top wall 114c is angled from the front end to the rear end of the body 108.

The driving pawl torsion spring 106, see FIG. 5, seats within the slot 114 and has a coiled portion 106a wrapped around the driving pawl pin 104 and legs 106b, 106c extending outwardly therefrom. The upper leg 106b extends outwardly from the coiled portion 106a and engages the top wall 114c of the driving pawl 102, and the lower leg 106c extends outwardly from the coiled portion 106a and engages with the grip 80. The driving pawl torsion spring 106 normally biases the driving pawl 102 in a counter-clockwise direction.

Figure 19:
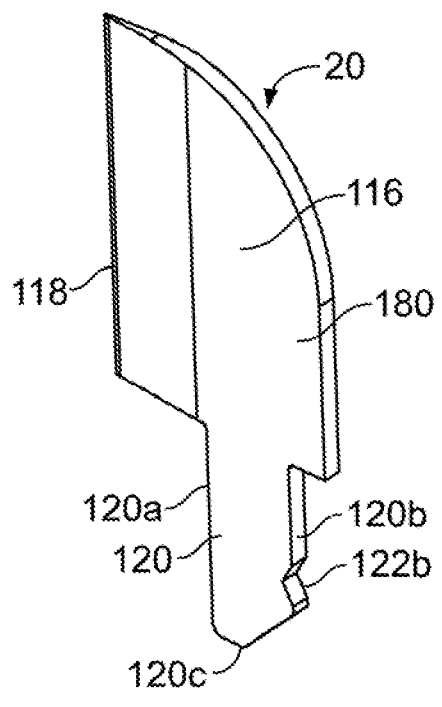
FIG. 19 is a perspective view of a blade of the tool.
Figure 20:
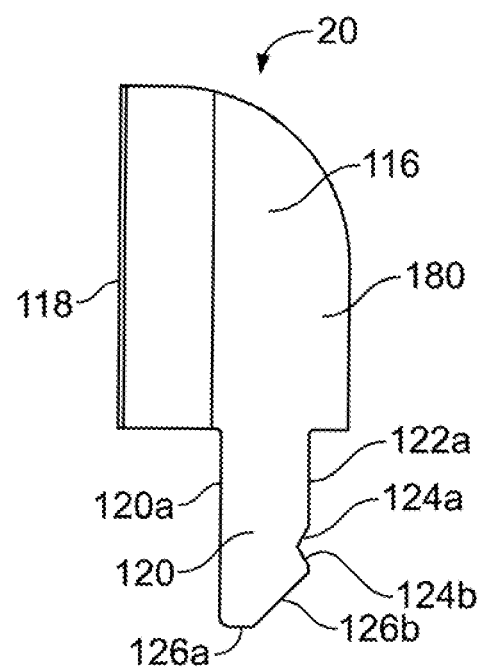
FIG. 20 is a side elevation view of the blade.

As shown in FIGS. 19 and 20, the blade 20 has a body 116 having a cutting edge 118 provided at a front edge thereof, and a leg 120 extending downwardly from the body 116. The cutting edge 118 is centered on the front edge such that the body 116 is substantially symmetrical on both sides of the cutting edge 118. The body 116 has a width which is greater than a width of the leg 120. In an embodiment, the leg 120 has an outer profile defined by a planar forward edge 120a which extends downwardly from the body 116, a rearward edge 120b which extends downwardly from the body 116, and a lower edge 120c which extends between the forward edge 120a and the rearward edge 120b. In an embodiment, the rearward edge 120b has an upper planar section 122a which is parallel to the forward edge 120a, and a lower generally V-shaped notched section 122b which extends from the upper section 122a to the lower edge 120c. The notched section 122b has an upper wall 124a which joins with a lower wall 124b to form the generally V-shape. In an embodiment, the lower edge 120c has a front section 126a which is perpendicular to the forward edge 120a and a rear section 126b which extends upwardly at an angle from the front section 126a to the rearward edge 120b.

Figure 21A:
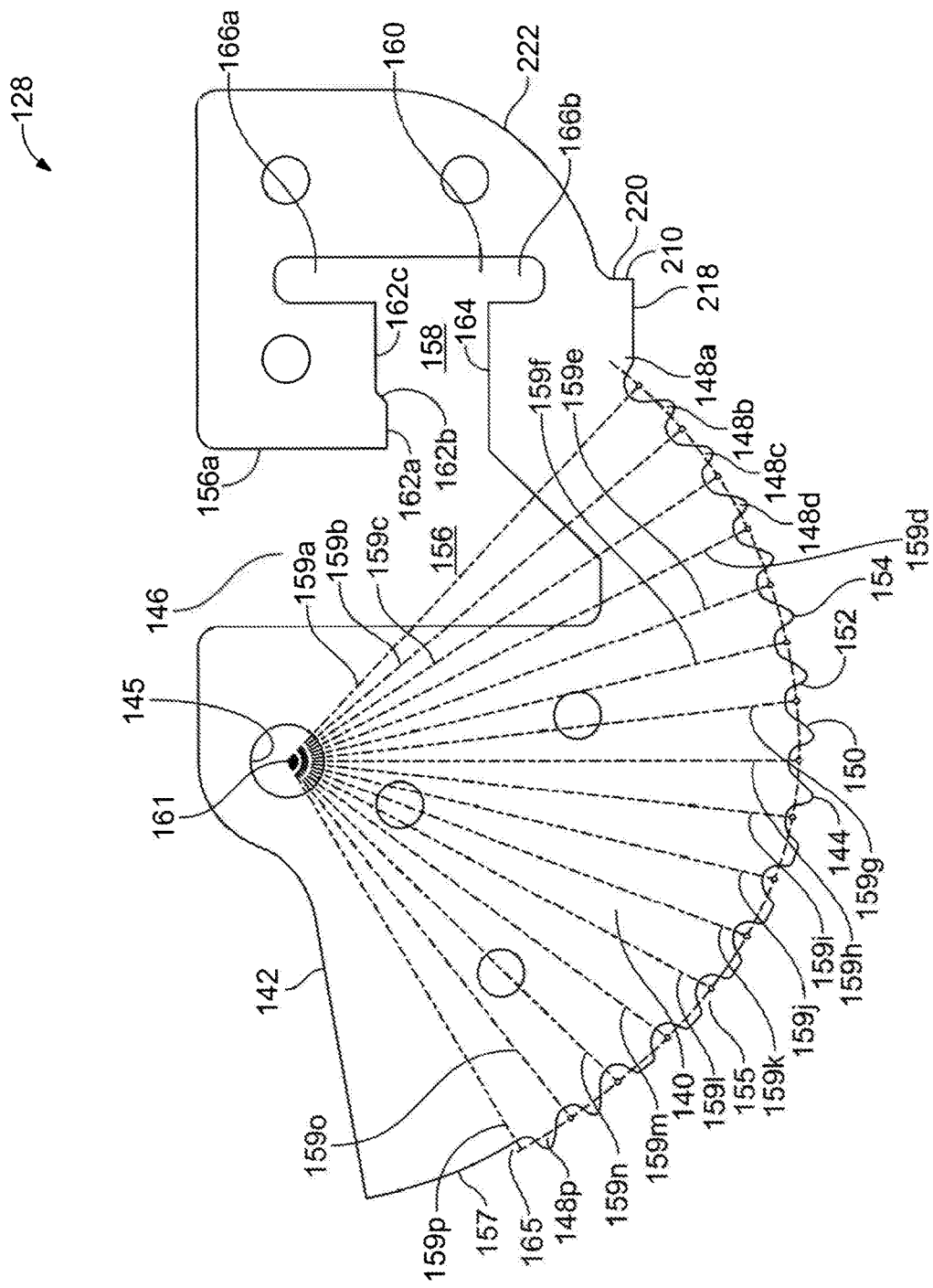
FIG. 21A is a side elevation view of an embodiment of a blade receiving gear of the tool.
Figure 21B:
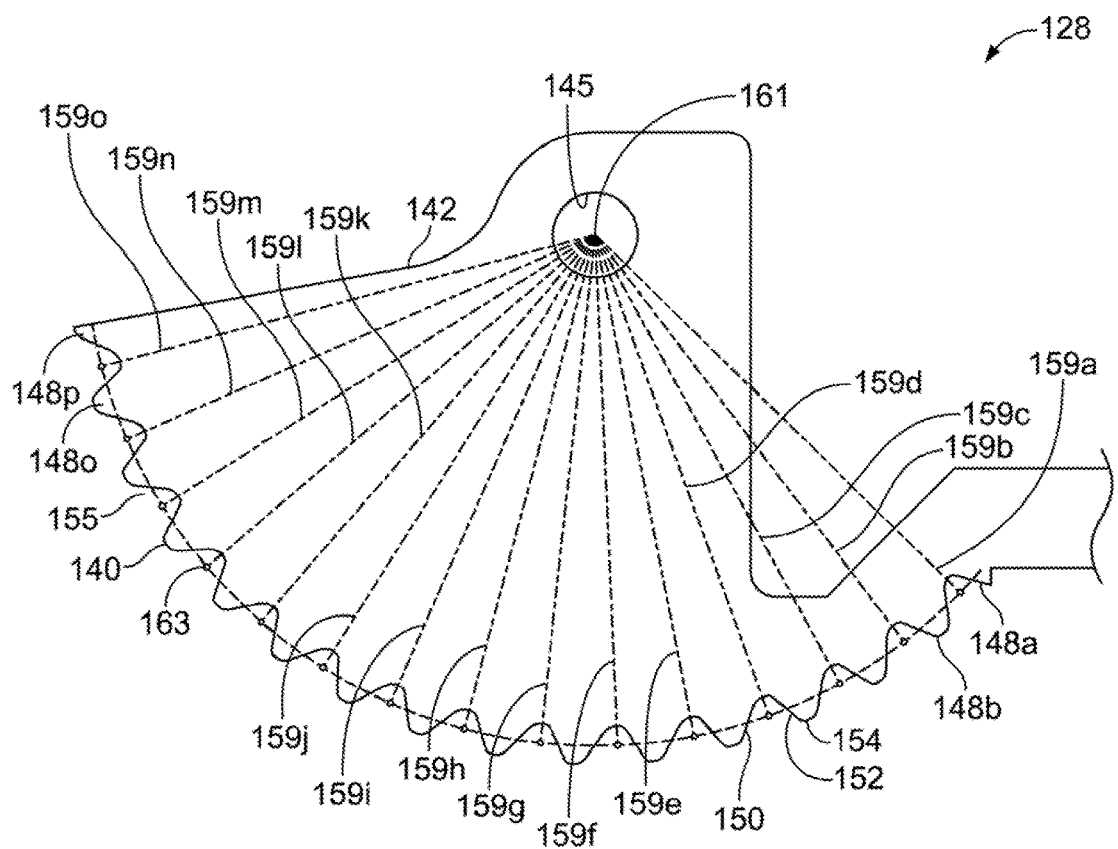
FIG. 21B is a partial side elevation view of an alternate embodiment of a blade receiving gear of the tool.

The blade receiving assembly 22, see FIGS. 5, 21A and 21B, includes a blade receiving gear 128 into which the blade 20 is inserted, a slide plate 130, a spring 132, and first and second plates 134, 136. The blade 20 can be released from the blade receiving gear 128 for replacement with a new blade. The blade receiving gear 128 is fixedly attached between the first and second plates 134, 136. The blade receiving gear 128/first plate 134/second plate 136 are pivotally mounted between the elongated members 30, 32 of the stationary handle 14 by a pivot pin 138. The slide plate 130 and the spring 132 are mounted on the blade receiving gear 128. In some embodiments, the spring 132 is a leaf spring. In some embodiments, the spring 132 is a coiled spring. In some embodiments, the spring 132 is a rubber block.

The first plate 134 has planar inner and outer surfaces which are defined by front, rear, top and bottom surfaces. A through hole 137, see FIG. 5, is provided through the first plate 134 proximate to the corner between the upper edge and the front edge, and the pivot pin 138 extends therethrough. The second plate 136 has planar inner and outer surfaces which are defined by front, rear, top and bottom surfaces. A through hole 139 is provided through the second plate 136 proximate to the corner between the upper edge and the front edge, and the pivot pin 138 extends therethrough.

Embodiments of the blade receiving gear 128 are shown in FIGS. 21A and 21B. The blade receiving gear 128 is formed of a body 140 having planar inner and outer surfaces which are defined by top and bottom surfaces 142, 144. An aperture 145 is provided through the body 140 and is spaced from the front and rear ends of the blade receiving gear 128 and the pivot pin 138 extends therethrough. A notch 146 extends downwardly from the top surface 142 rearwardly of the aperture 145. The bottom surface 144 is curved and has a plurality of teeth 148a-148p thereon. More or fewer teeth than what is shown in the drawings may be provided. A first tooth is denoted at 148a and is at the rearmost end of the teeth 148a-148p. A second tooth is denoted at 148b; the teeth 148c-148p continue to the last tooth 148p (in the embodiment as shown in the drawings) at the front of the teeth 148a-148p. A leading surface of each tooth 148a-148p is denoted at 150, a trailing surface of each tooth 148a-148p is denoted at 152, and a top land of each tooth 148a-148p is denoted at 154. A space 155 is defined between adjacent pairs of teeth 148a-148p. In some embodiments and as shown in the drawings, the first tooth 148a does not have a leading surface. In an embodiment, the bottom surface 144 has a front portion 157 which is smooth. Each tooth 148a-148o is defined by a radius 159a-159o which extends from the center 161 of the aperture 145 through which the pivot pin 138 extends to the center 163 of the space 155 between the adjacent teeth 148a-148p. Tooth 148p is defined by a radius 159p which extends from the center 161 of the aperture 145 through which the pivot pin 138 extends to the center of a space 165 trailing the tooth 148p which has a length equivalent to the length of the space 155 between teeth 148o and 148p.

In some embodiments as shown in FIG. 21A, the teeth 148a-148p have a variable radius 159a-159p, with the teeth 148a-148i having the same radius 159a-159i and the teeth 148j-149p having a radius 159j-159p which decreases as the teeth 148j-149p progress forwardly toward the front of the blade receiving gear 128. In some embodiments, the forwardmost teeth 148n-148p have the same radius 159n-159p. As an example, the teeth 148a-148i have a radius 159a-159i of 1.438 inches, tooth 149j has a radius 159j of 1.406 inches, tooth 149k has a radius 159k of 1.375 inches, tooth 149l has a radius 159l of 1.344 inches, tooth 149m has a radius 159m of 1.313 inches, tooth 149n has a radius 159n of 1.281 inches, teeth 148n-148p have a radius 159n-159p of 1.281 inches. In some embodiments, the teeth 148a-148i have the same shape as each other; the teeth 148j-148m having varying shapes, and teeth 148n-148p have the same shape as each other. In some embodiments, teeth 148j-148m have top lands 154 which are longer than the top lands 154 of teeth 148a-148i and 148n-148p. In some embodiments, teeth 148j-148m have top lands 154 which are linear and longer than the top lands 154 of teeth 148a-148i and 148n-148p which are curved.

In some embodiments as shown in FIG. 21B, the teeth 148a-148p are defined by the same radius 159a-159p and the teeth 148a-148p have the same shape. In some embodiments, teeth 148a-148p have top lands 154 which are curved.

The notch 146 has first, second and third sections 156, 158, 160. The first section 156 extends downwardly from the top surface 142 of the body 140 and mirrors the shape of the leg 120 of the blade 20 with the exception of the notched section 122b. The second section 158 extends from the first section 156 rearwardly. The second section 158 has a first upper wall section 162a which extends perpendicularly from a rear wall 156a of the first section 156, a second upper wall section 162b which extends from the rear end of the first upper wall section 162a and at an angle relative to the first upper wall section 162a, and a third upper wall section 162c which extends from the rear end of the second upper wall section 162b, at an angle relative to the second upper wall section 162b and parallel to the first upper wall section 162a. The second section 158 has a lower wall 164 which extends perpendicularly from the rear wall 156a of the first section 156 proximate to the lower edge of the first section 156. The third section 160 extends from the rear end of the second section 158. The third section 160 has an upper section 166a which extends upwardly from the rear end of the second section 158 and a lower section 166b which extends downwardly from the rear end of the second section 158.

Figure 22:
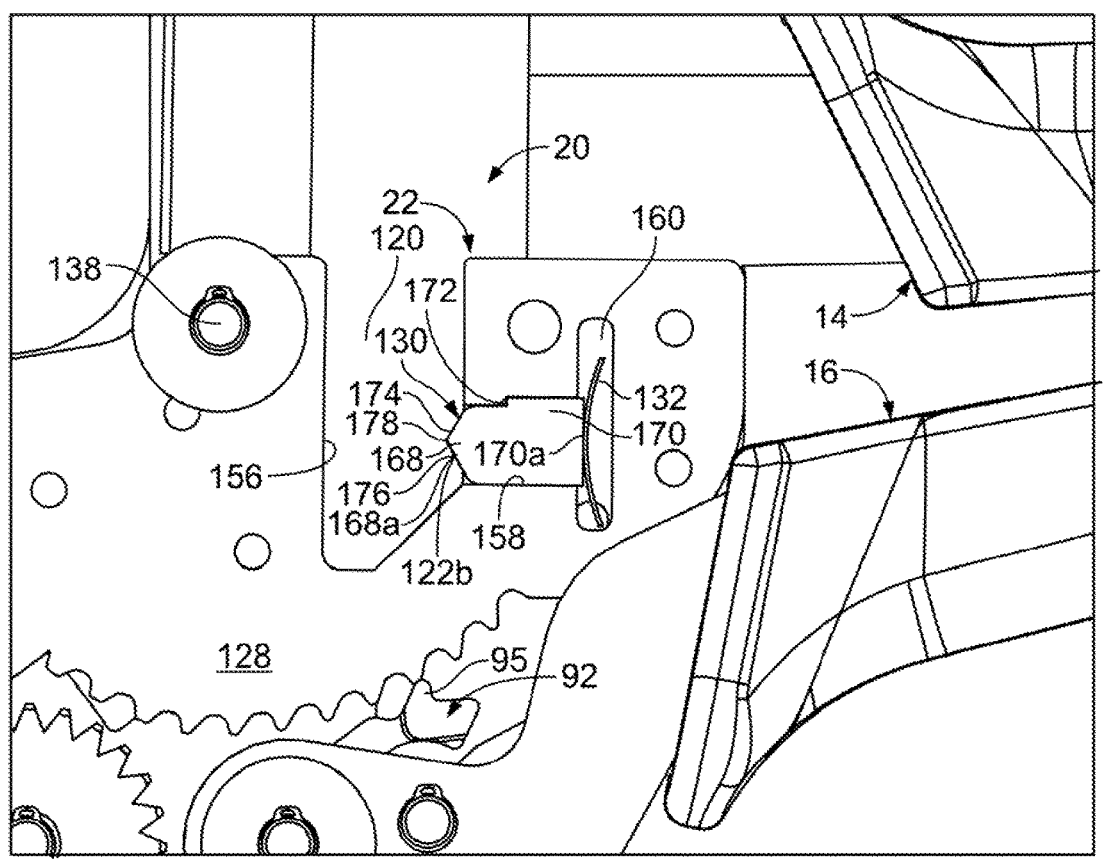
FIG. 22 is a partial side elevation view of the tool with some components removed so that internal structures can be seen.

The slide plate 130, see FIG. 22, is generally mounted within the second section 158 of the notch 146. The slide plate 130 has a front portion 168 and a rear portion 170; the front portion 168 having a height which is less than a height of the rear portion 170 such that a shoulder 172 is provided between the portions 168, 170. A front end 168a of the front portion 168 has a profile which mirrors or generally mirrors the profile of the notched section 122b of the blade 20 and forms a locking projection of the slide plate 130. As shown, the front end 168a of the front portion 168 has an upper wall 174 which joins with a lower wall 176 at a tip 178.

The spring 132 seats within the third section 160 of the notch 146. When the blade 20 is inserted into the notch 146, the spring 132 is expanded or substantially expanded. The third section 160 of the notch 146 has a height which is greater than the length of the spring 132 when the spring 132 is compressed.

In use, the leg 120 of the blade 20 seats within the first section 156 of the notch 146 and the notched section 122b aligns with the second section 158. The leg 120 is also captured between the first and second plates 134, 136. The front end 168a of the slide plate 130 seats within the notched section 122b of the blade 20. A rear end 170a of the rear portion 170 of the slide plate 130 engages with the spring 132. When the blade 20 is seated within the notch 146 of the blade receiving gear 128, the spring 132 is in its expanded or substantially expanded condition. As a result, the blade 20 is securely held within the blade receiving gear 128.

Figure 23:
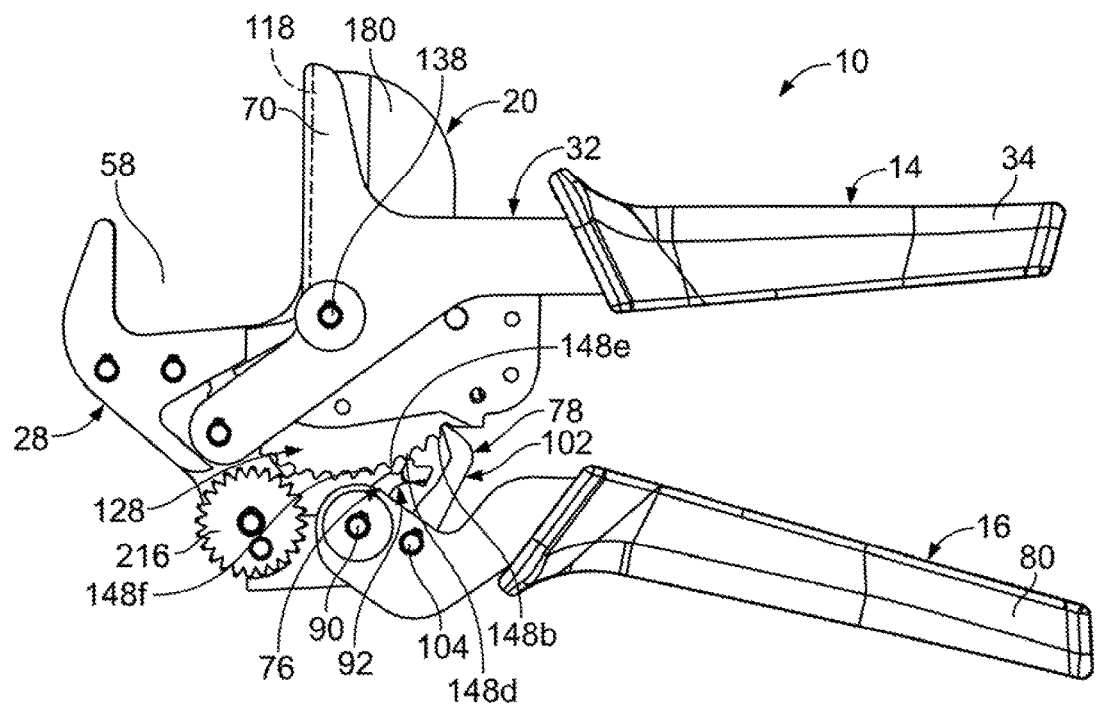
FIG. 23 is a side elevation view of the tool with some components removed so that internal structures can be seen, the tool being in a pre-cut position.

In a pre-cut position as shown in FIG. 23, where a cut of the workpiece 12 has not yet been started, the cutting edge 118 of the blade 20 is between the intermediate portions 64, 70 of the elongated members 30, 32 and a portion 180 of the body 116 of the blade 20 is rearwardly of the intermediate portions 64, 70 of the elongated members 30, 32. The blade 20 can be removed from the blade receiving gear 128 without the use of tools. To remove the blade 20, a user grasps the portion 180 of the body 116 of the blade 20 and pulls the blade 20 outwardly from the blade receiving gear 128. When this outward force is applied to the blade 20, the blade 20 moves outwardly from the blade receiving gear 128 and causes the slide plate 130 to move rearwardly and engage against the spring 132 as the lower angled wall 124b of the notched section 122b slides relative to the lower angled wall 176 of the slide plate 130. The spring 132 compresses and the rear end 170a of the slide plate 130 moves further into the third section 160 of the notch 146 such that the upper angled wall 174 of the slide plate 130 is the only portion of the slide plate 130 that engages with the rear section 126b of the lower edge 120c of the blade 20. Once the blade 20 is completely removed from the blade receiving gear 128, the spring 132 resumes its expanded condition, which causes the slide plate 130 to move forwardly in the second section 158. As the slide plate 130 moves forwardly, the shoulder 172 engages the second upper wall section 162b of the second section 158 to prevent the further movement of the slide plate 130 relative to the blade receiving gear 128.

The blade 20 can be inserted into the blade receiving gear 128 without tools and with one hand of the user. The user grasps the portion 180 of the body 116 of the blade 20 and pushes the leg 120 of the blade 20 downwardly into the first section 156 of the notch 146. As the blade 20 moves downwardly, the angled rear section 126b of the lower edge 120c of the blade 20 engages with the upper angled wall 174 of the slide plate 130 which causes the slide plate 130 to move rearwardly and engage against the spring 132. The spring 132 compresses and the rear end 170a of the slide plate 130 moves further into the third section 160 of the notch 146. After the angled rear section 126b of the blade 20 passes the slide plate 130, the spring 132 resumes its expanded condition, which causes the slide plate 130 to move forwardly in the second section 158 until the front end 168a of the slide plate 130 seat within the notched section 122b of the blade 20. As the slide plate 130 moves forwardly, the shoulder 172 engages the second upper wall section 162b of the second section 158 to prevent the further forward movement of the slide plate 130 relative to the blade receiving gear 128.

The blade receiving gear 128 seats between the first and second plates 134, 136 and are affixed together by suitable means, such as fasteners. The first plate 134 seats between the first jaw 24 and the blade receiving gear 128. The second plate 136 seats between the second jaw 26 and the blade receiving gear 128. The pivot pin 138 extends through the first jaw 24, the first elongated member 30 of the stationary handle 14, the first plate 134, the blade receiving gear 128, the second plate 136, the second elongated member 32 of the stationary handle 14, and the second jaw 26. The blade receiving gear 128 and the first and second plates 134, 136 can pivot relative to the first and second jaws 24, 26.

In the pre-cut position as shown in FIG. 23, where a cut of the workpiece 12 has not yet been started, the cutting edge 118 of the blade 20 is between the intermediate portions 64, 70 of the elongated members 30, 32 such that the cutting edge 118 is not easily accessible by a user. In the pre-cut position, the tooth 95 of the holding pawl 92 engages the trailing surface 152 of tooth 148d and the hook end 110 of the driving pawl 102 engages with the leading surface 150 of tooth 148b. The workpiece 12 is inserted into the receiving space 58. The tooth 95 of the holding pawl 92 is wider than the blade receiving gear 128 such that the tooth 95 extends outwardly from the blade receiving gear 128.

To operate the tool 10, the user grasps the tool 10 in one hand. The palm of the user engages the grip 34 of the stationary handle 14 and the fingers of the user engage the grip 80 of the movable handle 16. The movable handle 16 is pivoted around pivot pin 90 to move the rear portions 84, 88 of the movable handle 16 toward the rear portions 62, 68 of the stationary handle 14. This causes the movement of the holding pawl 92 and the driving pawl 102 which are mounted on the movable handle 16 toward the blade receiving gear 128 to move the blade receiving gear 128 in a ratcheting manner from an open position wherein the rear portions 84, 88 of the movable handle 16 are spaced from the rear portions 62, 68 of the stationary handle 14 to a closed position wherein the rear portions 84, 88 of the movable handle 16 are proximate to the rear portions 62, 68 of the stationary handle 14. The driving pawl 102 is biased in the counter-clockwise direction under the force of its torsion spring 106 and pushes against the trailing surface 152 of the tooth 148a as the movable handle 16 moves toward the stationary handle 14. This causes the blade receiving gear 128 to rotate in the counter-clockwise direction, thereby rotating the blade 20 in the counter-clockwise direction and into the receiving space 58.

Figure 24:
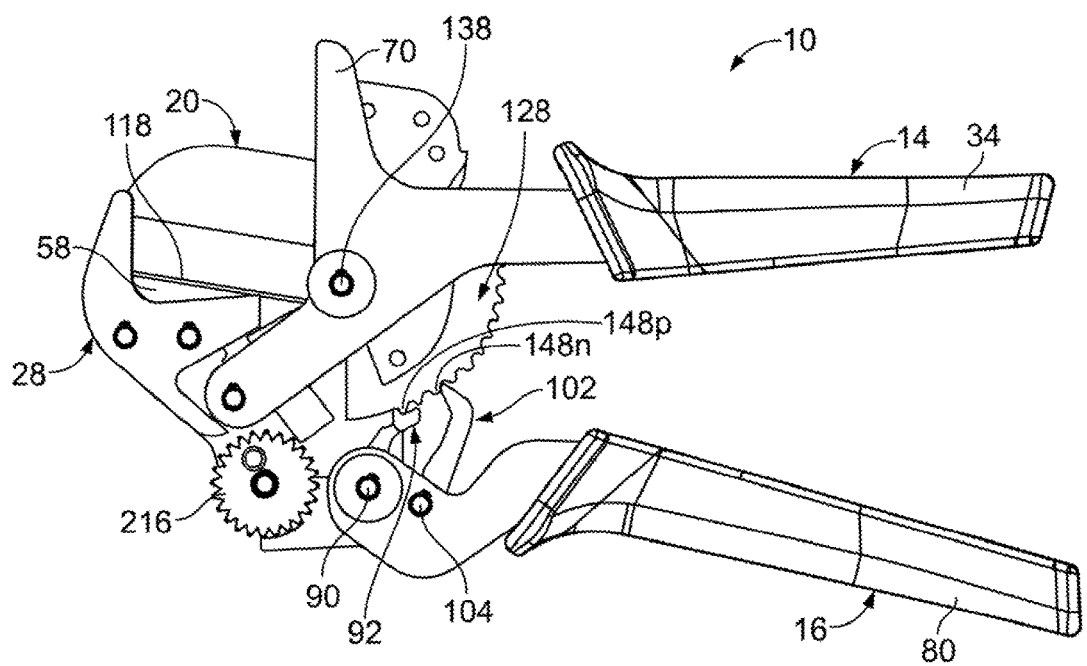
FIG. 24 is a side elevation view of the tool with some components removed so that internal structures can be seen, the tool during a cut.
Figure 25:
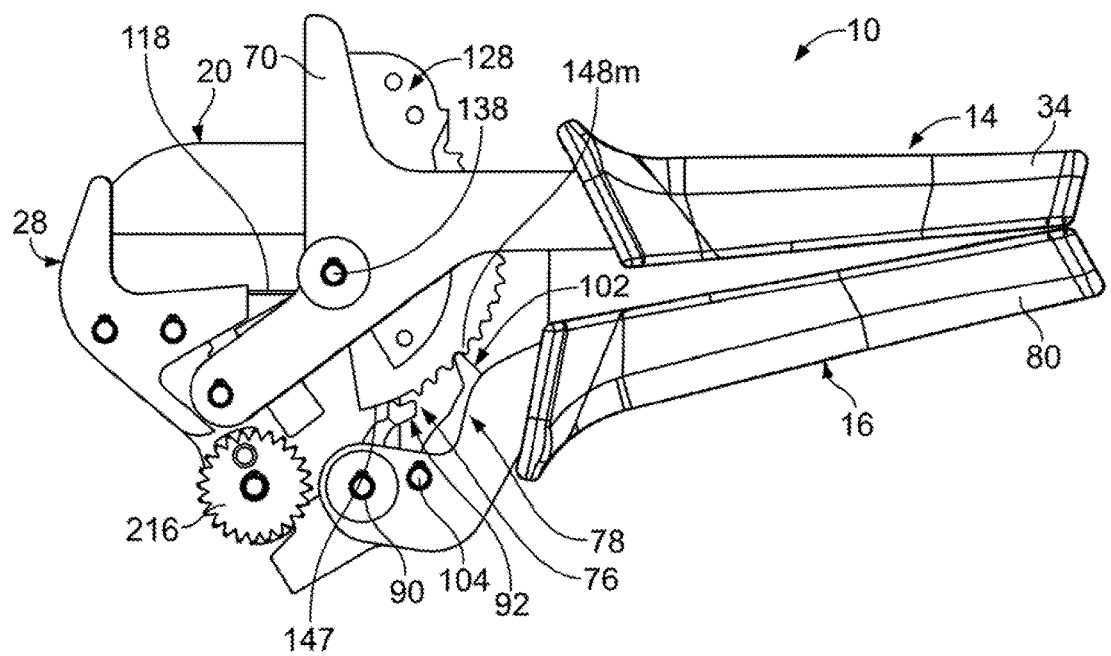
FIG. 25 is a side elevation view of the tool with some components removed so that internal structures can be seen, the tool being in a post-cut position.
Figure 27:
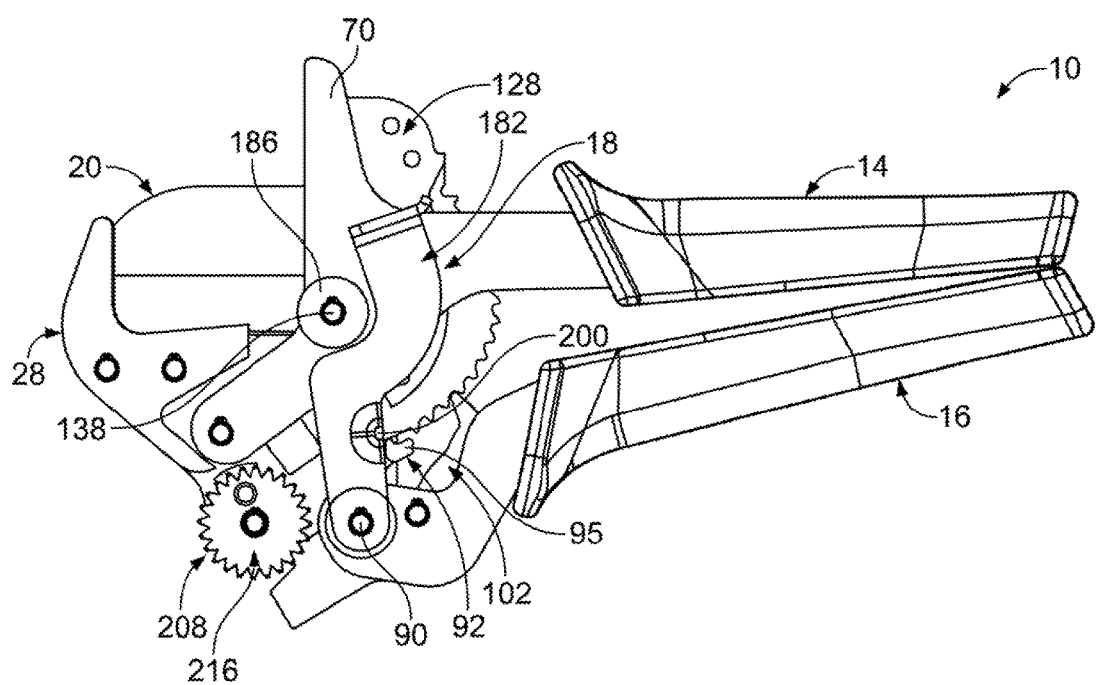
FIG. 27 is an alternate side elevation view of the tool with some components removed so that internal structures can be seen, the tool being in a post-cut position.
Figure 28:
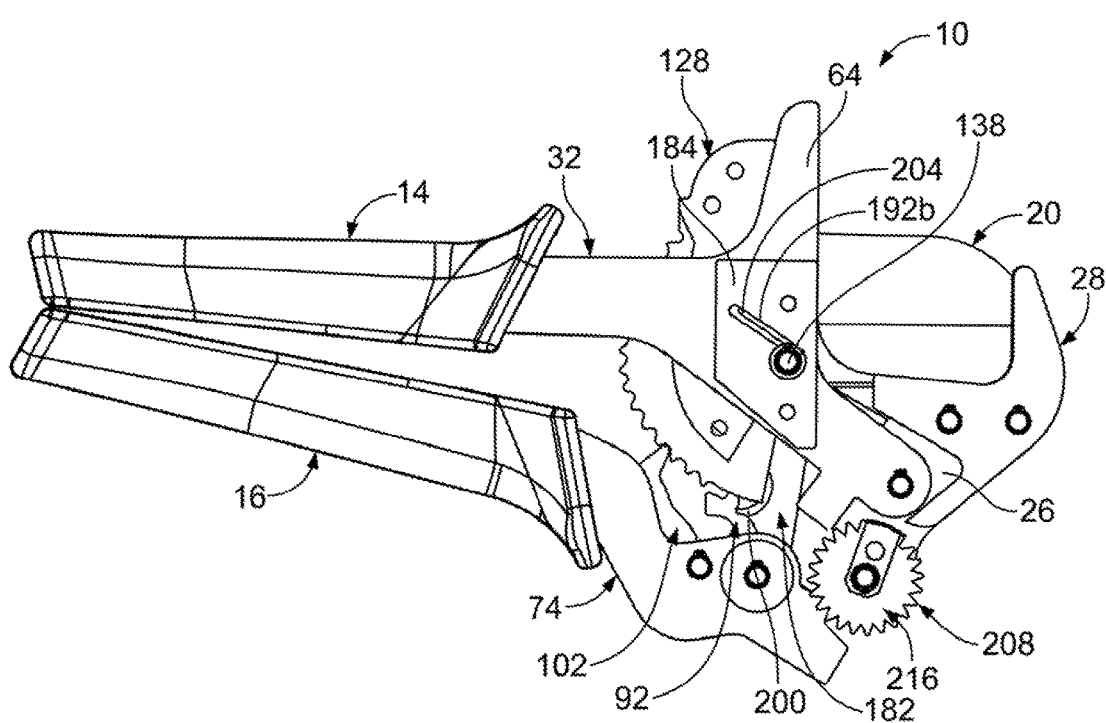
FIG. 28 is a side elevation view of the tool with some components removed so that internal structures can be seen, the tool being in a post-cut position.

When the blade receiving gear 128 rotates, the holding pawl 92 engages with the leading surface 150 of the next tooth 148e and moves along the leading surface 150 of tooth 148e. The biasing force from the torsion spring 96 biasing the holding pawl 92 in the counter-clockwise direction is overcome and the holding pawl 92 pivots in the clockwise direction to pass over the top land 154 of tooth 148e and thereafter engage the leading surface 150 of tooth 148f as the blade receiving gear 128 rotates in the counter-clockwise direction. The pressure on the movable handle 16 is thereafter released, and the holding pawl 92 rotates counter-clockwise under the force of its torsion spring 96. When the pressure on the movable handle 16 is released, the driving pawl 102 rides along the leading surface 150 of tooth 148b and the biasing force from the torsion spring 106 biasing the driving pawl 102 in the counter-clockwise direction is overcome and the driving pawl 102 pivots in the clockwise direction to pass over the top land 154 of tooth 148b and thereafter engage the trailing surface 152 of tooth 148b. This ratcheting action is repeated until the workpiece 12 is completely cut. FIG. 24 shows the positions of the holding pawl 92 and the driving pawl 102 at the start of the final movement of the movable handle 16 to complete the cut; the holding pawl 92 is engaged with the leading surface 150 of the last tooth 148p and the driving pawl 102 is engaged with the trailing surface 152 of tooth 148n. In its post-cut position as shown in FIGS. 25, 27 and 28, the holding pawl 92 is engaged with the front portion 157 (if provided) of the bottom surface 144 and the driving pawl 102 is engaged with the trailing surface 152 of tooth 148m, and the cutting edge 118 of the blade 20 is parallel to the upper surface 44a of the base 44 of the anvil 28 and the blade 20 seats within the slot 54 within the upper leg 46 and in the recess 50 in the base 44 of the anvil 28. In an embodiment, the holding pawl 92 engages another tooth in the post-cut position. The engagement of the blade 20 with the wall forming the recess 50 prevents the further movement of the blade 20 in the counter-clockwise direction.

When the blade receiving gear 128 of FIG. 21A is used in the tool 10, this results a mechanical advantage during the cut of the workpiece 12. By varying the radius 159*a*-159*p* of the teeth 148*a*-148*p* of the blade receiving gear 128, the effective gear ratio between the teeth 148*a*-148*p* and the driving pawl 102 is varied, which varies the mechanical advantage between the teeth 148*a*-148*p* and the driving pawl 102. Since the teeth 148*a*-148*i* have a larger radius 159*a*-159*i* at the beginning of the cut which are engaged by the driving pawl 102, the torque generated is greater. This is desirable as the greatest amount of workpiece material is being cut at the beginning of the cut. Once the initial cut through the wall of the workpiece 12 is completed, less torque is required so the radius 159*j*-159*p* decreases as the teeth 148*j*-149*p* progress forwardly toward the front of the blade receiving gear 128 and as the driving pawl 102 engages with the teeth 148*j*-149*p*. This enables the tool 10 to cut the workpiece 12 faster than the cut being made through the initial cut through the wall of the workpiece 12.

When the handles 14, 16 are in the open position, the spread of the handles 14, 16 is smaller than prior art one-handed tools, which allows for a more ergonomic one-handed use of tool 10 rather than requiring users with small (or even large hands) to initially use two hands to reduce the handle spread when initially closing the tool 10 around the workpiece 12 to be cut.

The blade 20 can be released from the blade receiving assembly 22 without tools and with one hand of the user when the blade receiving assembly 22 is partially rotated relative to the elongated members 30, 32, and a new blade inserted into the blade receiving assembly 22 when the blade receiving assembly 22 is partially rotated relative to the stationary handle 14.

The blade 20 can be released from its post-cut position shown in FIGS. 25, 27 and 28 by the release assembly 18. The release assembly 18 includes a release lever 182, a torsion spring holding plate 184, a release lever stop 186, an elongated slot 188 through the front portion 60 of the first elongated member 30, a slot 190 through the first plate 134, and a blade torsion spring 192.

Figure 26:
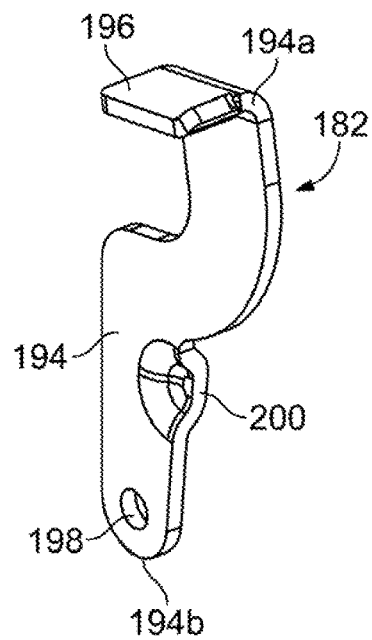
FIG. 26 is a perspective view of a release lever of the tool.
Figure 29:
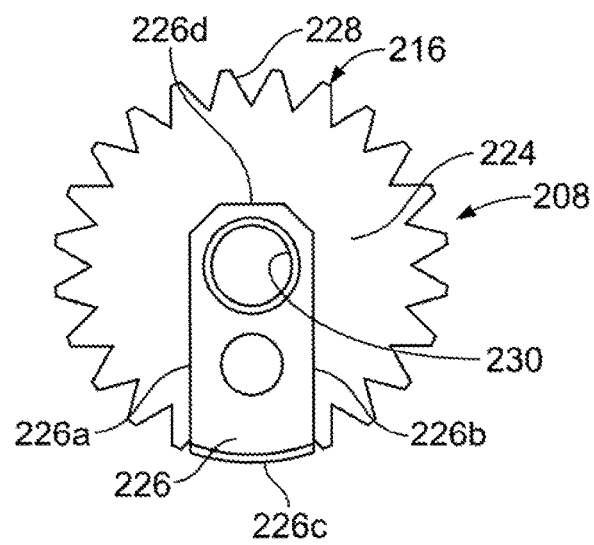
FIG. 29 is a side elevation view of a lock wheel of the tool.
Figure 30:
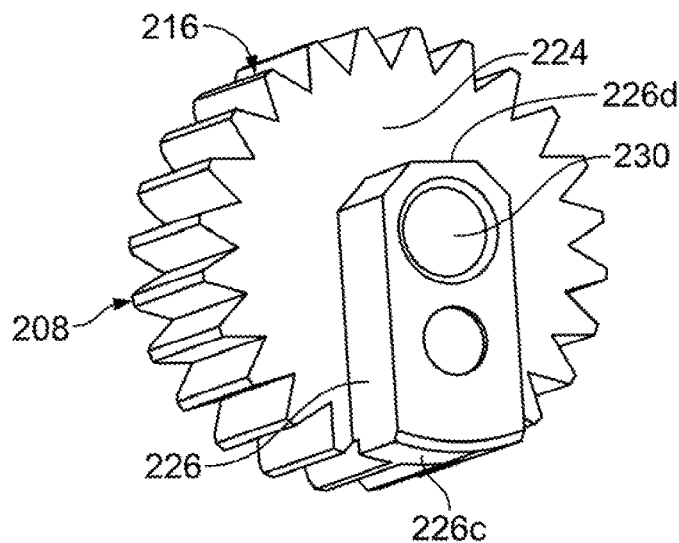
FIG. 30 is a perspective view of the lock wheel.

The release lever 182, see FIG. 26, has an elongated body 194 having an upper end 194*a* and a lower end 194*b*, and a tab 196. The tab 196 extends outwardly from the upper end 194*a* of the body 194. An aperture 198 is provided through the lower end 194*b* of the body 194 and the pivot pin 90 extends through the aperture 198 such that the release lever 182 is rotatably attached to the movable handle 16. The release lever 182 is provided between the second jaw 26 and the elongated member 72. A protrusion 200 extends from the body 194 at a position which is spaced from the lower end 194*b* of the body 194.

The torsion spring holding plate 184 has planar inner and outer surfaces. A through hole 202, see FIG. 5, is provided through the torsion spring holding plate 184, and an elongated slot 204 is provided therethrough and extends rearwardly from the through hole 202. In an embodiment, the torsion spring holding plate 184 is generally rectangular. In an embodiment, the elongated slot 204 is angled relative to a planar top surface of the torsion spring holding plate 184. The torsion spring holding plate 184 is mounted between the intermediate portion 64 of the first elongated member 30 and the first jaw 24. The through hole 202 and the slot 204 in the torsion spring holding plate 184 align with the slot 188 in the first elongated member 30. The torsion spring holding plate 184 does not overlap the receiving space 58 formed by the anvil 28. The first jaw 24, the torsion spring holding plate 184 and the first elongated member 30 are fixedly attached to each other by suitable means, such as fasteners. The torsion spring holding plate 184 and the first elongated member 30 may be integrally formed. The first jaw 24, the torsion spring holding plate 184 and the first elongated member 30 may be integrally formed.

The release lever stop 186, see FIG. 27, is mounted on the pivot pin 138 between the intermediate portion 70 of the second elongated member 32 and the second jaw 26. In an embodiment, the release lever stop 186 has a circular outer perimeter. The release lever stop 186 does not overlap the receiving space 58 formed by the anvil 28. In an embodiment, the release lever stop 186 is rotatable relative to the second elongated member 32/second jaw 26. The release lever stop 186 and the second elongated member 32 or the second jaw 26 may be integrally formed. The second jaw 26, the release lever stop 186 and the second elongated member 32 may be integrally formed.

In some embodiments, the pivot pin 138 extends through the first jaw 24, the through hole 202 in the torsion spring holding plate 184, the slot 188 in the first elongated member 30 of the stationary handle 14, the through hole 137 in the first plate 134, the aperture 145 in the blade receiving gear 128, the through hole 139 in the second plate 136, an aperture 206 in the second elongated member 32 of the stationary handle 14, the release lever stop 186, and the second jaw 26. In some alternative embodiments, the pivot pin 138 does not extend through the release lever stop 186 and the release lever stop 186 is mounted proximate to the hole 137 and the aperture 206.

As best illustrated in FIGS. 27 and 28 which show the post-cut position, to operate the release assembly 18, a user engages the tab 196 and rotates the release lever 182 in the clockwise direction. Upon rotation, the protrusion 200 of the release lever 182 engages against the tooth 95 of the holding pawl 92 and rotates the holding pawl 92 in the clockwise direction against the force of its torsion spring 96 such that the tooth 95 of the holding pawl 92 disengages from the blade receiving gear 128. As the holding pawl 92 rotates in the clockwise direction under the continued movement of the release lever 182 by the user, the tooth 95 of the holding pawl 92 engages with the body 108 of the driving pawl 102 and causes the driving pawl 102 to rotate in the clockwise direction against the force of its torsion spring 106 such that the hook end 110 of the driving pawl 102 disengages from the blade receiving gear 128.

When both the holding pawl 92 and the driving pawl 102 are released from engagement with the blade receiving gear 128, the blade torsion spring 192 causes the blade 20 and the blade receiving assembly 22 to rotate in the clockwise direction until the cutting edge 118 is between the intermediate portions 64, 70 of the elongated members 30, 32 of the stationary handle 14. Thereafter, the release lever 182 released by the user and the holding pawl 92 and the driving pawl 102 rotate in the counter-clockwise direction under the force of their torsion springs 96, 106 to reengage with the blade receiving gear 128. Rotation of the holding pawl 92 in the counter-clockwise direction causes rotation of the release lever 182 in the counter-clockwise direction since the tooth 95 of the holding pawl 92 is in engagement with the protrusion 200 of the release lever 182. Rotation of the release lever 182 in the counter-clockwise direction is stopped when the release lever 182 engages with the release lever stop 186. Thereafter, a new cutting cycle can be effected.

Having both pawls 92, 102 mounted on the movable handle 16 makes the release more reliable and simpler, and with a consistent feel, because the stack-up of tolerances which is created when one pawl is on the movable handle and the other pawl is on the stationary handle as is done in the prior art is eliminated.

The release assembly 18 can be used to release the blade 20 after a partial cut of the workpiece 12 has been effected, if desired.

In some embodiments, a handle lock assembly 208, see FIGS. 29-32, is provided to lock the tool 10 into a locked condition when in the closed position such that the movable handle 16 cannot move relative to the stationary handle 14. This makes the tool 10 more compact for stowage. The handle lock assembly 208 works in conjunction with the driving pawl 102 to lock the tool 10 into the locked condition. The handle lock assembly 208 includes a lock shoulder 210 provided on the bottom surface 144 of the blade receiving gear 128, see FIG. 11, a surface 212 provided on the front portion 82 of the first elongated member 72 of the movable handle 16, and a lock wheel 216 rotatably mounted between the jaws 24, 26 at a lower end of the jaws 24, 26. In an embodiment, the surface 212 is angled. The lock wheel 216 and the movable handle 16 are configured to engage with each other to prevent movement of the movable handle 16 relative to the stationary handle 14.

In an embodiment, the lock shoulder 210 on the blade receiving gear 128 is formed from a first planar section 218 extending from the first tooth 148*a* and a second planar section 220 extending from a rear end of the first planar section 218 and which is perpendicular to the first planar section 218 such that a corner is formed. The first planar section 218 is parallel to the top surface 142 of the blade receiving gear 128. Alternatively, the lock shoulder 210 can be formed by another tooth like those shown as teeth 148*a*-148*p*. In some embodiments, a curved section 222 extends from the rear end of the second planar section 220 to the top surface 142.

The surface 212 is provided on the front portion 82 of the first elongated member 72 proximate to the front end 72*a*. The surface 212 faces the bottom surface of the first elongated member 30 of the stationary handle 14.

The lock wheel 216 includes a body 224 and a locking ear 226 extending from a side of the body 224. In some embodiments, the body 224 is cylindrical. In some embodiments, the body 224 has a knurled outer surface 228. The locking ear 226 has opposite side walls 226*a*, 226*b*, a first end wall 226*c* extending between the side walls 226*a*, 226*b* at one end thereof, and a second end wall 226*d* extending between the side walls 226*a*, 226*b* at the other end thereof. The first end wall 226*c* is curved. A hole 230 extends through the lock wheel 216 and the locking ear 226 and a pivot pin 123*l* extends through the hole 230 to rotatably connect the lock wheel 216 to the first and second jaws 24, 26. The first end wall 226*c* aligns with the outer diameter of the lock wheel 216. In some embodiments, the first end wall 226*c* extends outwardly from the outer diameter of the lock wheel 216. The second end wall 226*d* is proximate to the hole 231 and is spaced inwardly from the outer diameter of the lock wheel 216.

In the locked position, the rear ends 30*b*, 32*b* of the stationary handle 14 and the rear ends 72*b*, 74*b* of the movable handle 16 are proximate to each other. The hook end 110 of the driving pawl 102 is engaged with the lock shoulder 210 on the blade receiving gear 128 and the tooth 95 on the holding pawl 92 is engaged with the top land 154 of tooth 148*d*. The first end wall 226*c* of the lock wheel 216 is engaged with the surface 212 of the front portion 82 of the elongated member 72 of the movable handle 16. Since lock wheel 216 is engaged with the movable handle 16 and the pawls 92, 102 bias the movable handle 16 away from the stationary handle 14, the handles 14, 16 are locked into position.

Figure 31:
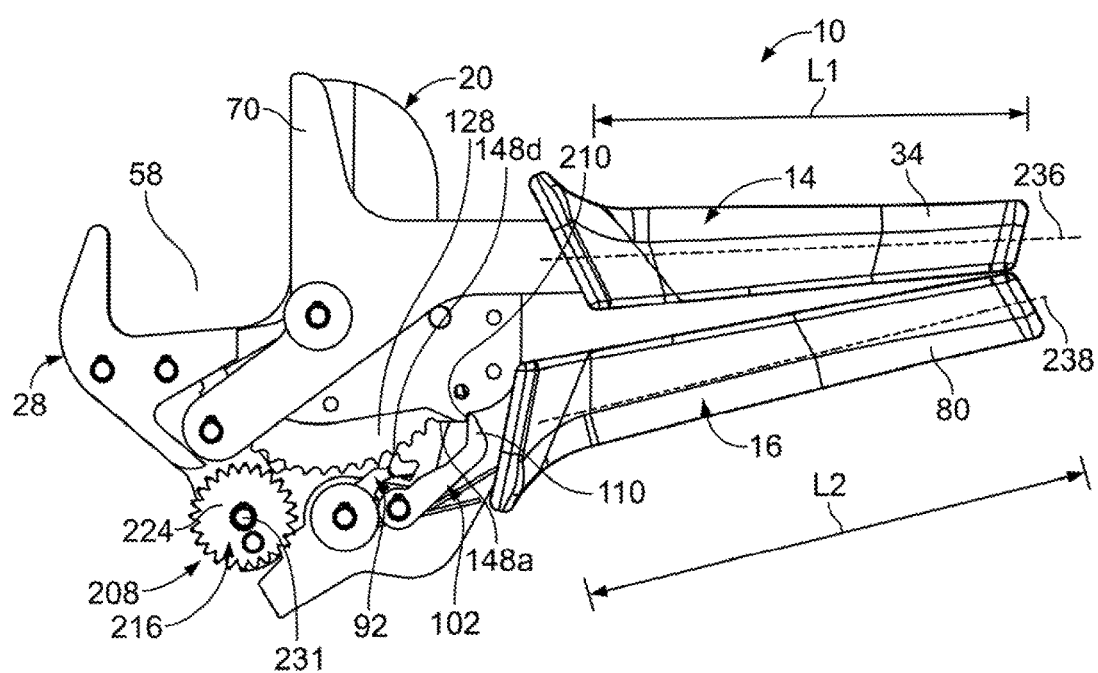
FIG. 31 is a side elevation view of the tool with some components removed so that internal structures can be seen, the tool being in a partially unlocked position.
Figure 32:
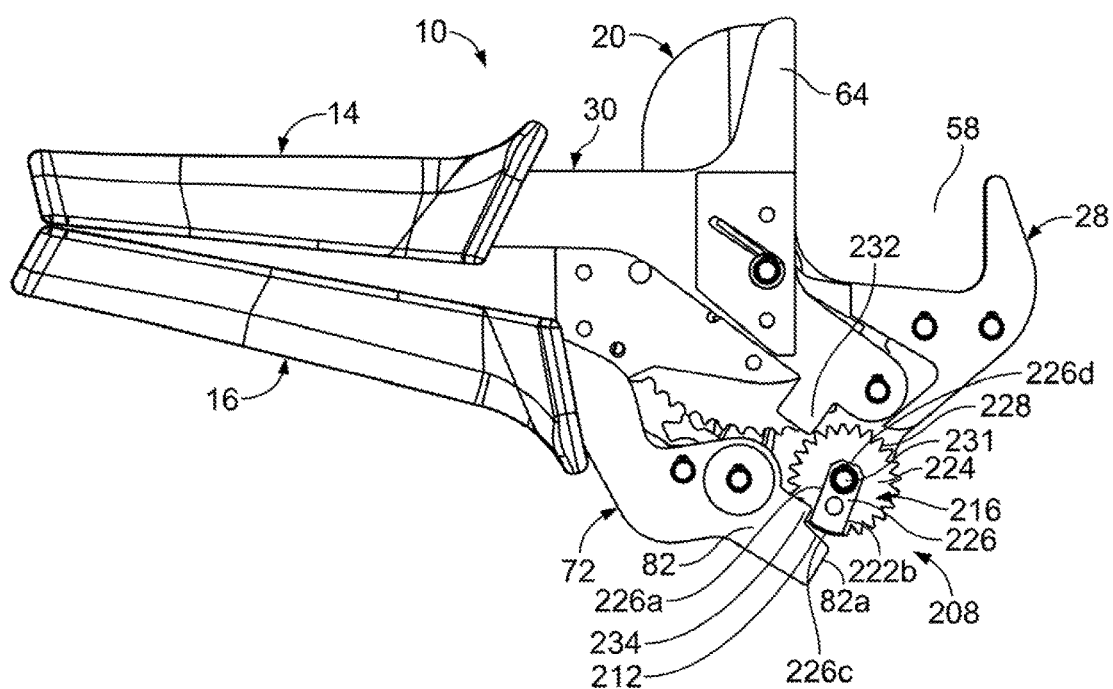
FIG. 32 is a side elevation view of the tool with some components removed so that internal structures can be seen, the tool being in a partially unlocked position.
Figure 33:
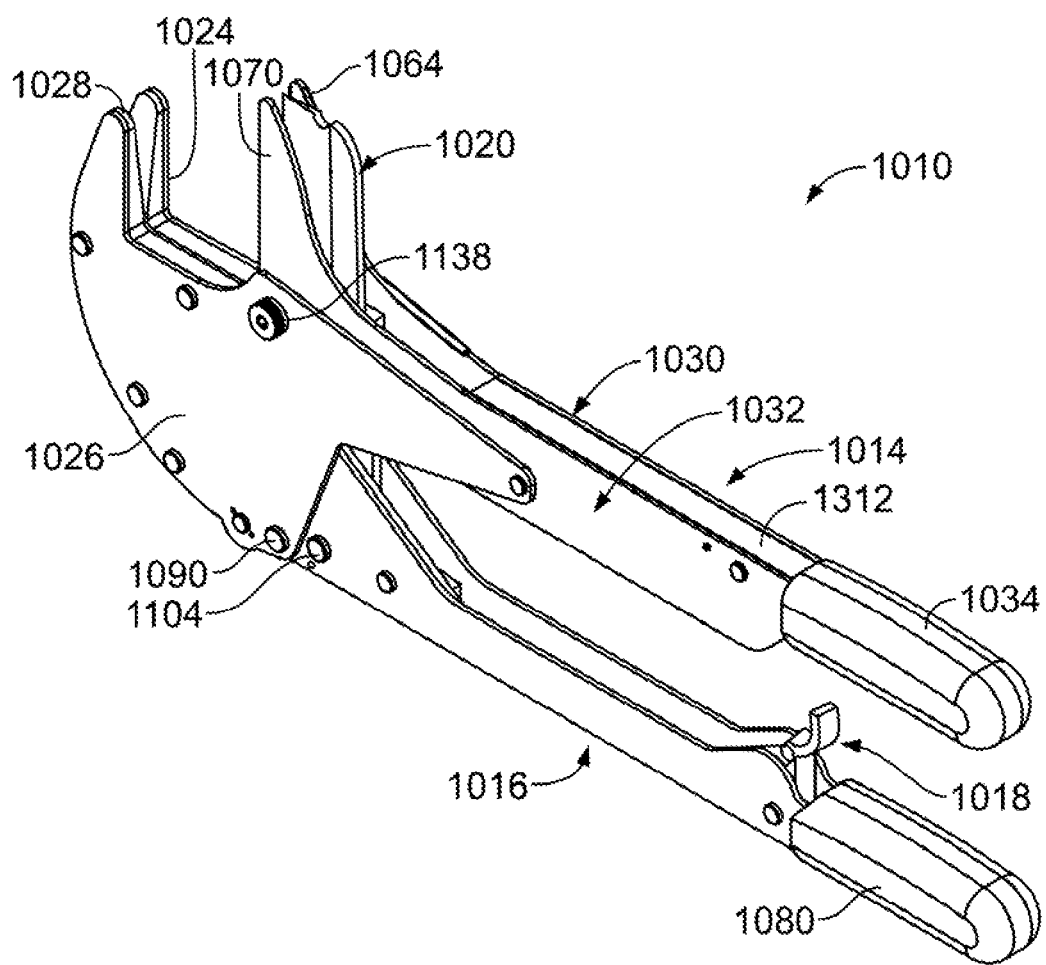
FIG. 33 is a rear perspective view of a tool.

FIGS. 31 and 32 show the handle lock assembly 208 in a partially unlocked position. To move the tool 10 from the locked position to the pre-cut position as shown in FIG. 23, the movable handle 16 is pivoted around pivot pin 90 to move the rear ends 72*b*, 74*b* of the movable handle 16 toward the rear ends 30*b*, 32*b* of the stationary handle 14. This causes the first end wall 226*c* to separate from the surface 212 of the movable handle 16 as shown in FIG. 32, thereby allowing a user to rotate the lock wheel 216. The lock wheel 216 is rotated to disengage the first end wall 226*c* from the surface 212. In some embodiments, the lock wheel 216 is rotated in the counter-clockwise direction. In some embodiments, the lock wheel 216 is rotated in the clockwise direction. As the movable handle 16 is released, the holding pawl 92 moves along the trailing surface 152 of tooth 148*d* which causes the hook end 110 of the driving pawl 102 to move over the lock shoulder 210 of the blade receiving gear 128 and move to the pre-cut position as shown in FIG. 23. Thereafter, the workpiece 12 is inserted into the receiving space 58 and the cut is performed.

To move the tool 10 from the pre-cut position shown in FIG. 23 to the locked position, the lock wheel 216 is rotated in the opposite direction. As the lock wheel 216 is rotated, the first end wall 226*c* engages with the surface 212 of the movable handle 16. As the movable handle 16 pivots, the pawls 92, 102 are biased in the clockwise direction until they move into the locked position.

In some embodiments, a locking projection stop 232, see FIG. 32, is provided on the first elongated member 30 of the stationary handle 14, and a locking projection stop 234 is provided on the first elongated member 72 of the movable handle 16. The first end wall 226*c* can engage with the stops 232, 234 to prevent the further rotation of the lock wheel 216 relative to the handles 14, 16.

When the handles 14, 16 are in the locked position or in the closed position, the grips 34, 80 of the handles 14, 16 are parallel to each other or are generally parallel to each other because the elongated members 72, 74 have a dogleg shape. Since the grips 34, 80 of the handles 14, 16 are parallel to each other or are generally parallel to each other, this reduces the distance across the grips 34, 80 to make the tool 10 easier to grasp, even by a user with small hands.

In an embodiment, the grips 34, 80 of the handles 14, 16 have two different lengths, see FIG. 31. The grip 34 has a length L1; the grip 80 has a length L2. In an embodiment, the lengths of the grips 34, 80 are defined by the ratio L2:L1 of about 1.10:1 to about 1.25:1, and more particularly 1.17:1. In an embodiment, the grip 34 of the stationary handle 14 has a length L1 of 4.546 inches from a front end 34*a* to a rear end 34*b* of the grip 34 which falls along the centerline 236 of the grip 34, and the grip 80 of the movable handle 16 has a length L2 of 5.310 inches from a front end 80*a* to a rear end 80*b* of the grip 80 which falls along the centerline of the grip 80. In use, the palm of the user engages the grip 34 of the stationary handle 14 and the fingers of the user engage the grip 80 of the movable handle 16. The pointer finger is forward of the palm on the tool 10 such that the pointer finger and the middle finger of the user on the movable handle 16 "lead" the palm of the user on the stationary handle 14. Since the grip 80 is longer than the grip 34, the tool 10 is easier to hold and operate.

Attention is invited to the dual-handed, hand-held tool 1010 shown in FIGS. 33-73. The tool 1010 of some embodiments is designed to cut PVC conduit and pipe up to 2½ conduit size (1.62 in/32 mm OD), polyethylene, polybutylene. However, it will be appreciated that the cutting tool 10 of various embodiments may additionally or alternatively be used to cut other diameters of workpieces 12 and workpieces 12 made of alternative materials. The tool 1010 is designed to be held in both hands of the user for two-handed operation.

In an embodiment, the tool 1010 includes a stationary handle 1014 pivotally attached to a movable handle 1016, a release assembly 1018, a blade 1020 pivotally attached to the stationary handle 1014, and a blade receiving assembly 1022.

The stationary handle 1014 includes first and second jaws 1024, 1026, an anvil 1028 mounted between the jaws 1024, 1026, a first elongated member 1030 mounted between the first jaw 1024 and the anvil 1028, a second elongated member 1032 mounted between the second jaw 1026 and the anvil 1028, and a grip 1034 attached to the first and second elongated members 1030, 1032. The jaws 1024, 1026, the anvil 1028 and the elongated members 1030, 1032 are fixedly attached to each other.

Figure 36:
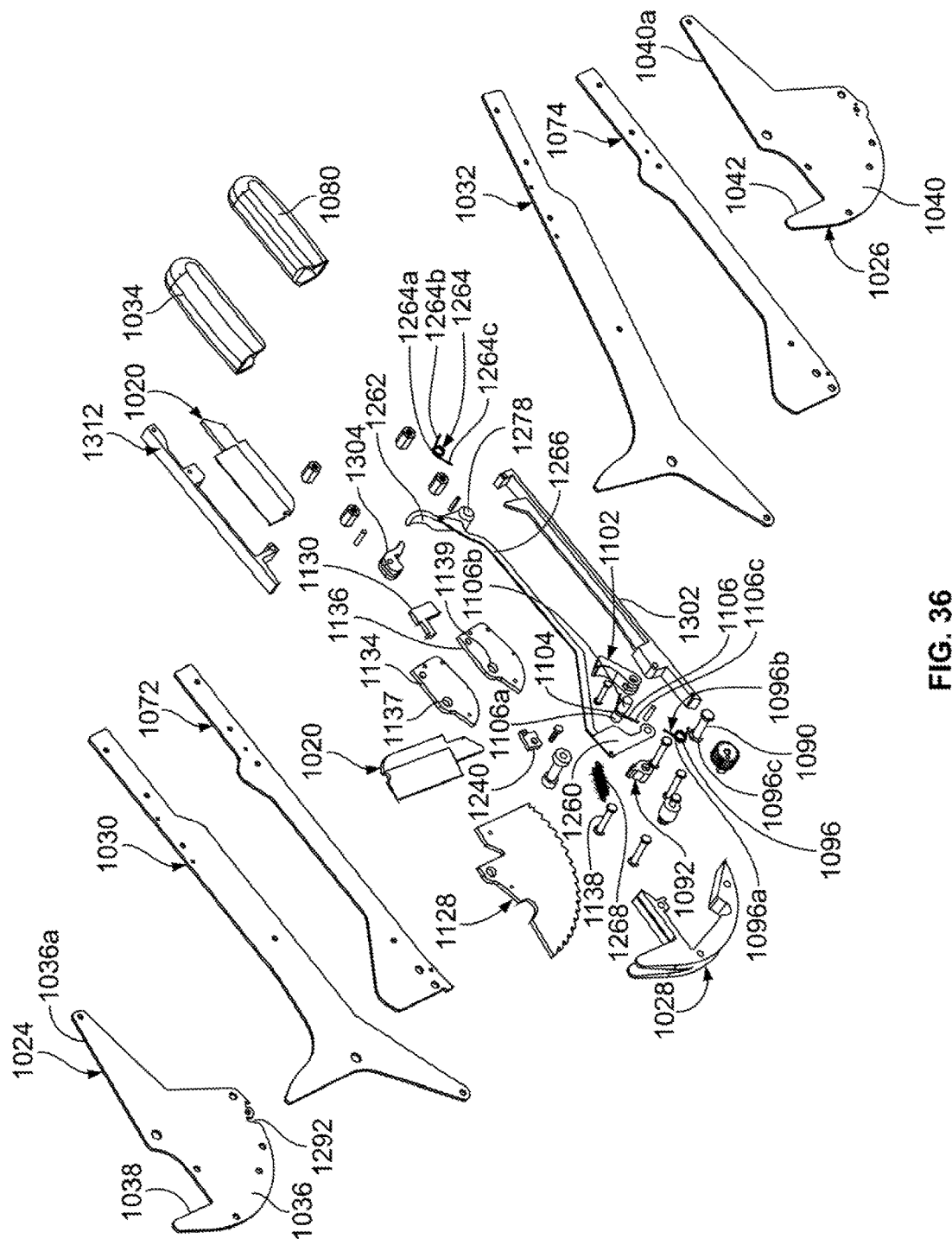
FIG. 36 is an exploded perspective view of the tool of FIG. 33.

As shown in FIG. 36, the first jaw 1024 is formed of a plate 1036 having planar side surfaces which are defined by a front edge, a rear edge, a top edge 1036a and a bottom edge. A cutout 1038 is provided in the plate 1036 and extends downwardly from the top edge 1036a. In an embodiment, the first jaw 1024 is generally square with an elongated leg extending from a rear end thereof. The second jaw 1026 is formed of a plate 1040 having planar side surfaces which are defined by a front edge, a rear edge, a top and a bottom edge. A cutout 1042 is provided in the top edge 1040a. In an embodiment, the second jaw 1026 is generally square with an elongated leg extending from a rear end thereof. The first and second jaws 1024, 1026 may be identically formed.

Figure 37:
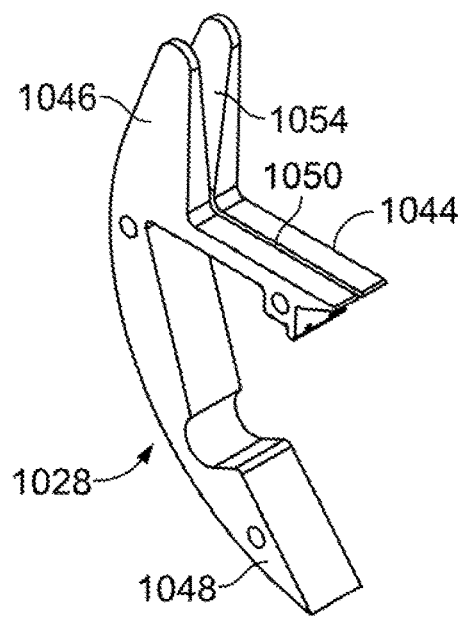
FIG. 37 is a rear perspective view of an anvil of the tool of FIG. 33.
Figure 38:
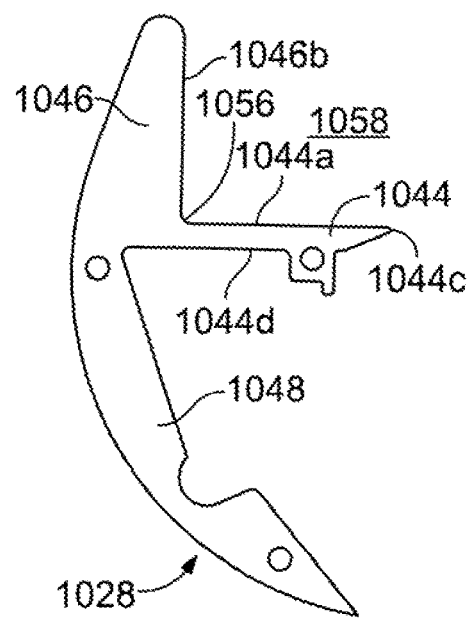
FIG. 38 is a side elevation view of the anvil of FIG. 37.
Figure 39:
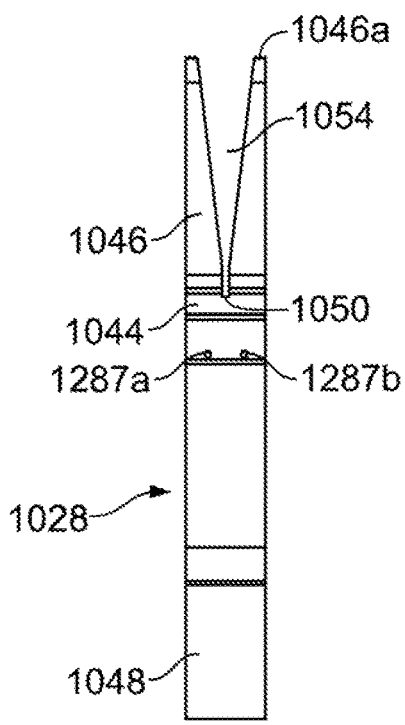
FIG. 39 is a rear plan view of the anvil of FIG. 37.

As shown in FIGS. 37-39, the anvil 1028 is formed of a generally T-shaped member having a base 1044, an upper leg 1046 extending upwardly from the base 1044, and a lower leg 1048 extending downwardly from the base 1044.

The base 1044 has side surfaces and upper, lower, front and rear surfaces extending between the side surfaces. In an embodiment, a recess 1050 extends downwardly from the entire upper surface 1044a of the base 1044 along the midline of the base 1044. In an embodiment, the recess 1050 is U-shaped. In an embodiment, a slot (not shown) is also provided similar to the embodiment shown in FIGS. 5-7.

The upper leg 1046 has side surfaces and upper, front and rear surfaces extending between the side surfaces. The upper leg 1046 extends upwardly from the front end of the base 1044 and is generally perpendicular to the base 1044. In an embodiment, the upper leg 1046 is curved. The upper leg 1046 is bifurcated by a slot 1054 which extends from the upper surface 1046a downwardly. The recess 1050 and the bottom of the slot 1054 are aligned with each other.

The upper surface 1044a of the base 1044 and the rear surface 1046b of the upper leg 1046 are generally perpendicular to each other and meet at a corner 1056. The upper surface 1044a of the base 1044, the rear surface 1046b of the upper leg 1046, and the corner 1056 define a receiving space 1058 into which workpiece 12 is seated so that the workpiece 12 can be cut and a square cut is obtained. In an embodiment, the corner 1056 is radiused. In an embodiment, the corner 1056 is radiused at a radius of 0.125 inches.

The lower leg 1048 has side surfaces and upper, front and rear surfaces extending between the side surfaces. The lower leg 1048 extends downwardly from the front end of the base 1044 and is generally perpendicular to the base 1044. In an embodiment, the lower leg 1048 is curved.

Figure 40:
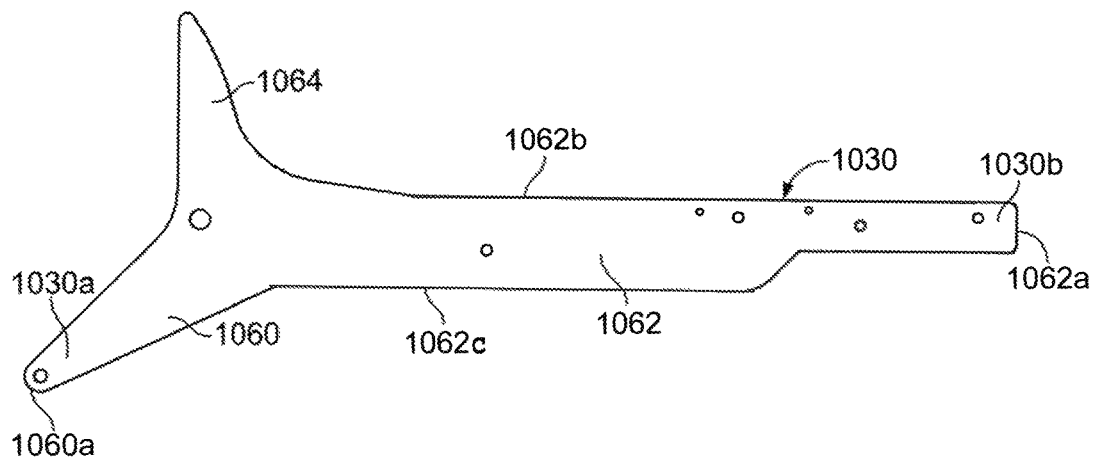
FIG. 40 is a side elevation view of a first elongated member of a stationary handle of the tool of FIG. 33.
Figure 41:
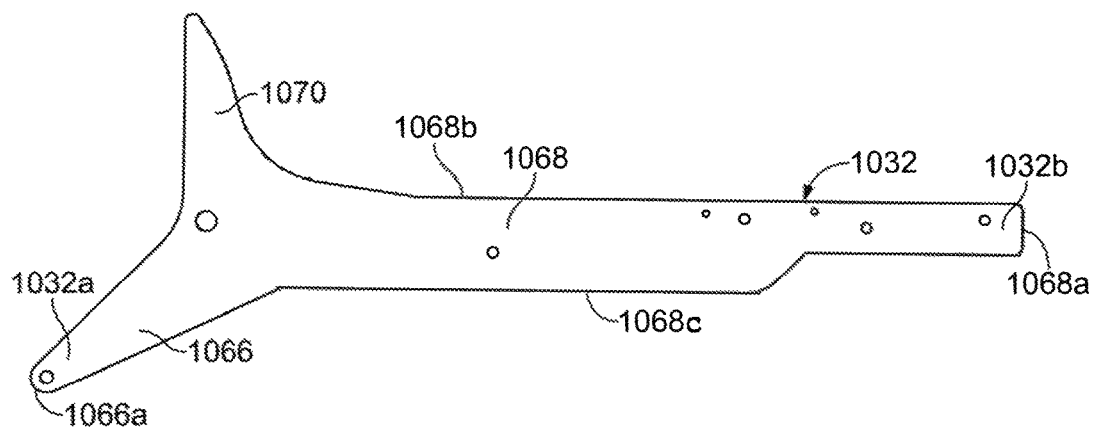
FIG. 41 is a side elevation view of a second elongated member of the stationary handle of the tool of FIG. 33.

As shown in FIGS. 40 and 41, the first elongated member 1030 has an elongated front portion 1060, an elongated rear portion 1062 and an intermediate portion 1064. The front portion 1060 has inner and outer planar surfaces and front, top and bottom surfaces extending therebetween. The front surface 1060a of the front portion 1060 forms a front end 1030a of the first elongated member 1030. The rear portion 1062 has inner and outer planar surfaces and rear, top and bottom surfaces 1062a, 1062b, 1062c extending therebetween. The rear surface 1062a of the rear portion 1062 forms a rear end 1030b of the first elongated member 1030. The rear portion 1062 extends from the rear end of the front portion 1060. The front and rear portions 1060, 1062 are angled relative to each other. The intermediate portion 1064 has planar inner and outer surfaces and front, rear and top surfaces extending therebetween. The intermediate portion 1064 extends upwardly from the rear end of the front portion 1060. The intermediate portion 1064 extends at an angle relative to the front portion 1060 and relative to the rear portion 1062.

The second elongated member 1032 has an elongated front portion 1066, an elongated rear portion 1068 and an intermediate portion 1070. The front portion 1066 has inner and outer planar surfaces and front, top and bottom surfaces extending therebetween. The front surface 1066a of the front portion 1066 forms a front end 1032a of the second elongated member 1032. The rear portion 1068 has inner and outer planar surfaces and rear, top and bottom surfaces 1068a, 1068b, 1068c extending therebetween. The rear surface 1068a of the rear portion 1068 forms a rear end 1032b of the second elongated member 1032. The rear portion 1068 extends from the rear end of the front portion 1066. The front and rear portions 1066, 1068 are angled relative to each other. The intermediate portion 1070 has planar inner and outer surfaces and front, rear and top surfaces extending therebetween. The intermediate portion 1070 extends upwardly from the rear end of the front portion 1066. The intermediate portion 1070 extends at an angle relative to the front portion 1066 and relative to the rear portion 1068.

Figure 34:
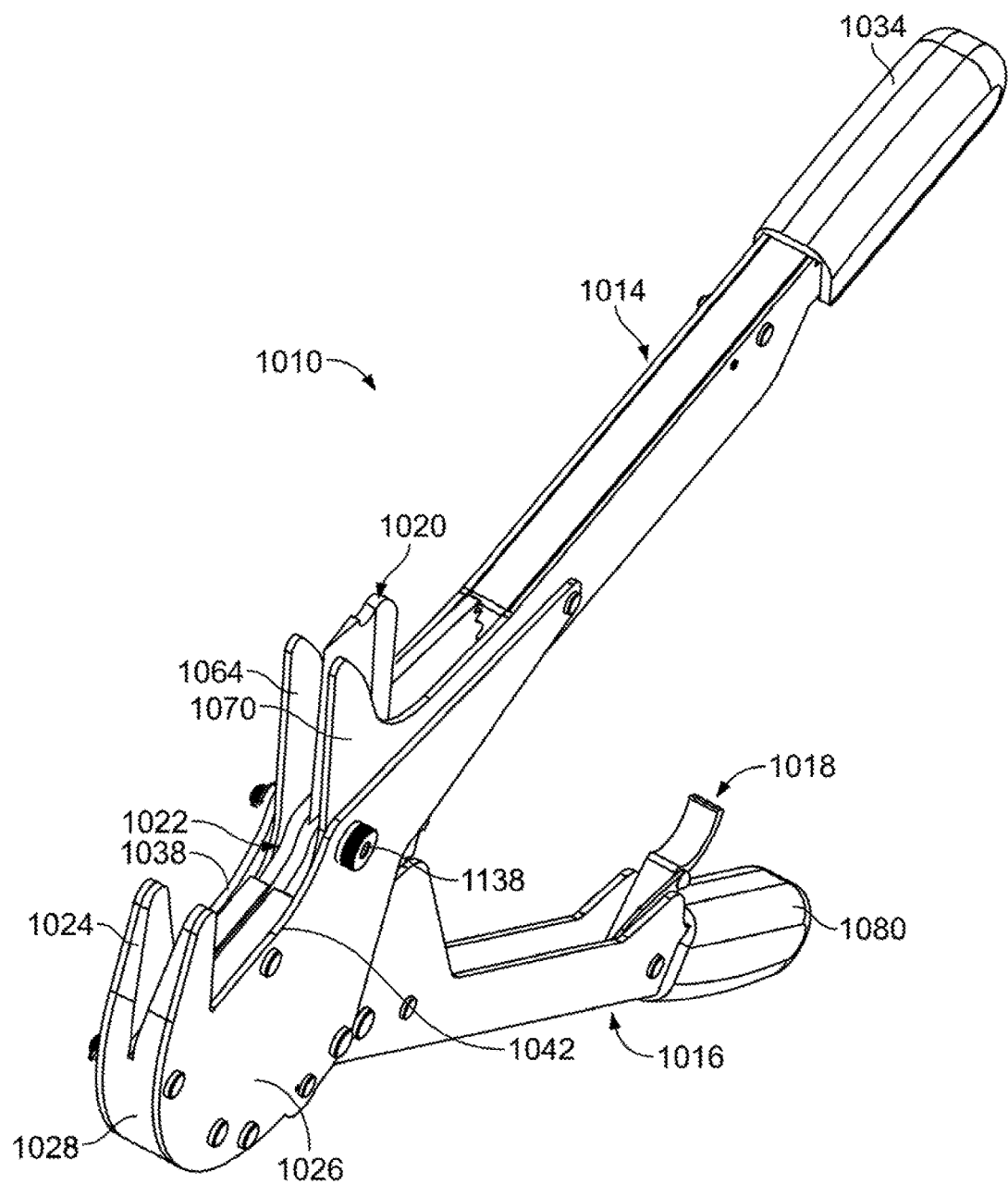
FIG. 34 is a front perspective view of a tool of FIG. 33.
Figure 35:
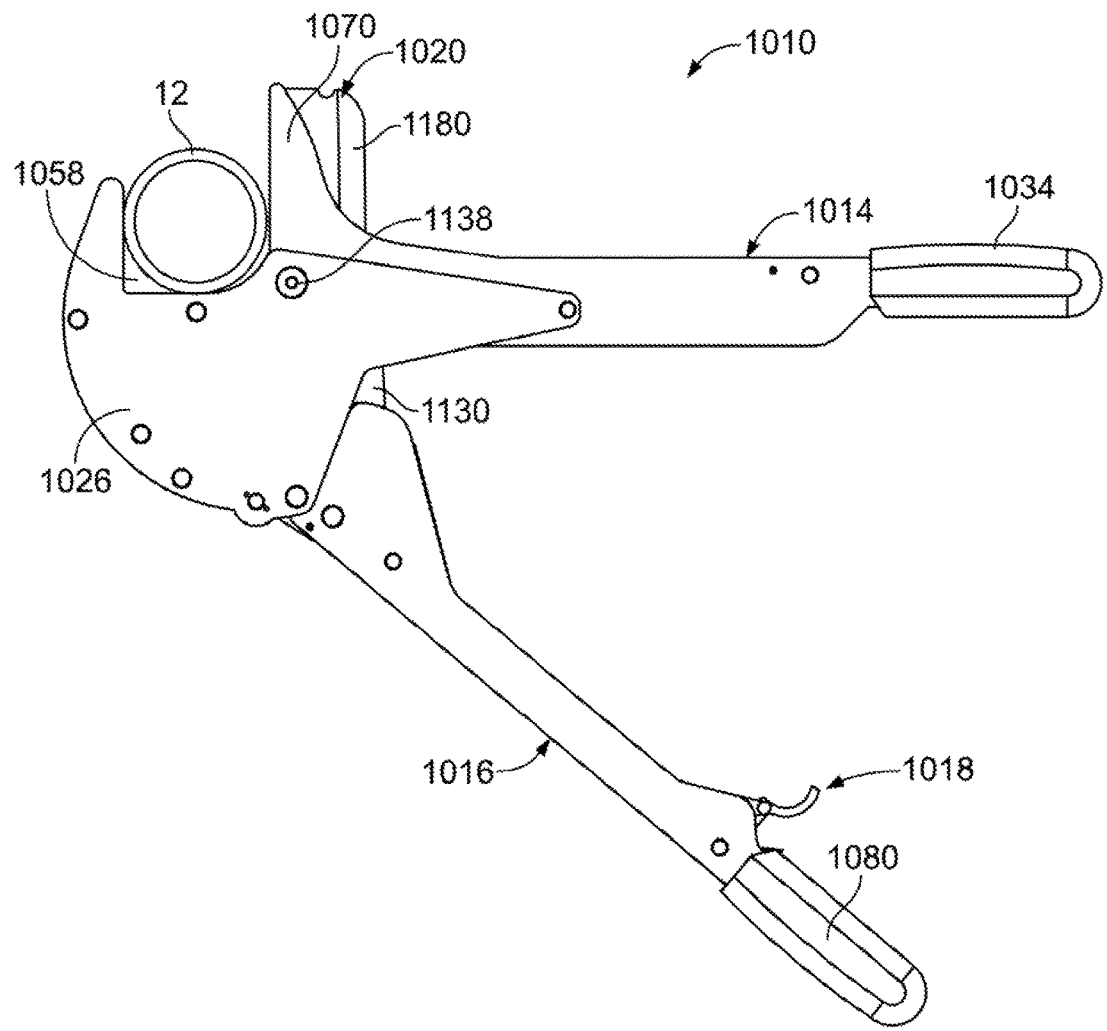
FIG. 35 is a side elevation view of the tool of FIG. 33 having a workpiece seated therein.

As shown in FIG. 34, the anvil 1028 seats between the jaws 1024, 1026 such that the cutouts 1038, 1042 in the jaws 1024, 1026 align with the receiving space 1058 formed by the anvil 1028. The jaws 1024, 1026 extend rearwardly of the anvil 1028. The jaws 1024, 1026 do not overlap the receiving space 1058 such the workpiece 12 can be seated in the cutouts 1038, 1042 in the jaws 1024, 1026 and the receiving space 1058 formed by the anvil 1028. In an embodiment, the recesses in the jaws 1024, 1026 mirror the shape of the receiving space 1058. The jaws 1024, 1026 are fixedly attached to the anvil 1028 by suitable means, such as fasteners.

The front end 1030a of the first elongated member 1030 is fixedly attached to the jaw 1024 proximate to the lower end thereof, and a rear section of the front portion 1066 extends rearwardly of the rear end of the base 1044 of the anvil 1028. The first jaw 1024 and the first elongated member 1030 are fixedly attached to each other by suitable means, such as fasteners. The intermediate portion 1064 of the first elongated member 1030 extends upwardly in the same direction as the upper leg 1046 of the anvil 1028. The intermediate portion 1064 is spaced from the rear surface 1044c of the base 1044. The front end 1032a of the second elongated member 1032 is fixedly attached to the jaw 1026, and a rear section of the front portion 1066 extends rearwardly of the rear end of the base 1044 of the anvil 1028. The second jaw 1026 and the second elongated member 1032 are fixedly attached to each other by suitable means, such as fasteners. The intermediate portion 1070 of the second elongated member 1032 extends upwardly in the same direction as the upper leg 1046 of the anvil 1028. The intermediate portion 1070 is spaced from the rear surface 1044c of the base 1044. The front portions 1060, 1066 of the elongated members 1030, 1032 are fixedly attached to the anvil 1028 by suitable means, such as fasteners. The front portions 1060, 1066 align with each other; the rear portions 1062, 1068 align with each other; and the intermediate portions 1064, 1070 align with each other. In an embodiment, the elongated members 1030, 1032 are integrally formed with the anvil 1028. In an embodiment, the elongated members 1030, 1032, the anvil 1028 and the jaws 1024, 1026 are integrally formed. The grip 1034 is attached to the rear portions 1062, 1068 to provide a grasping region for a user to grasp during operation of the tool 1010. While separate first and second elongated members 1030, 1032 are shown and described herein, it is to be understood that the rear portions 1062, 1068 of the first and second elongated members 1030, 1032 can be integrally formed with each other to form a single elongated member, with the front and intermediate portions 1060, 1066, 1064, 1070 separated from each other by a slot.

The movable handle 1016 includes a first elongated member 1072, a second elongated member 1074, a holding pawl assembly 1076 mounted on the movable handle 1016, a driving pawl assembly 1078 mounted on the movable handle 1016, and a grip 1080. Directions of rotation of the movable handle 1016 are described herein for ease in description with respect to the tool 1010 having its receiving space 1058 to the left as shown in FIGS. 33-35, 54, 56, 57, 61, 62 and 65.

Figure 42:
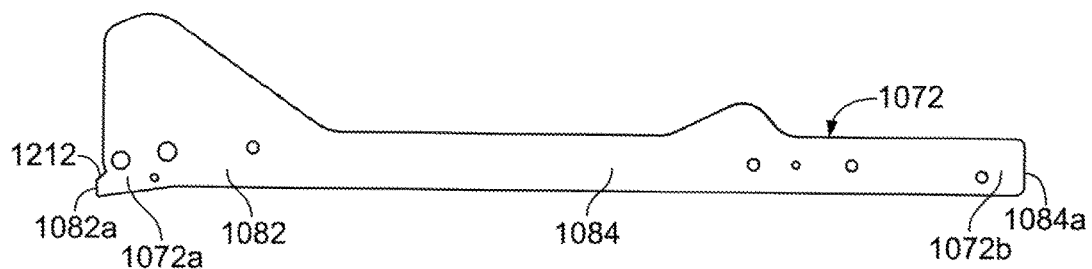
FIG. 42 is a side elevation view of a first elongated member of a movable handle of the tool of FIG. 33.
Figure 43:
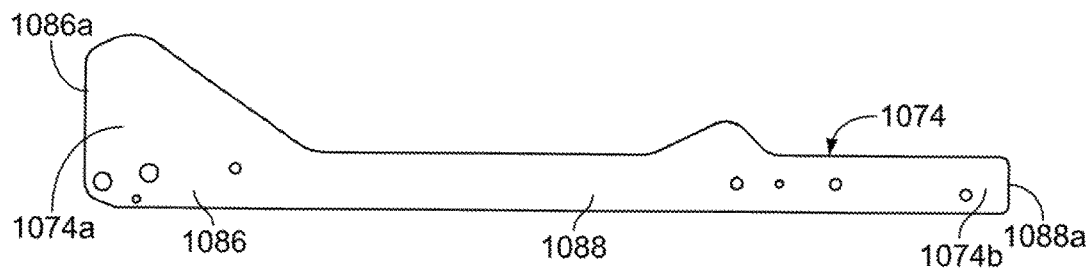
FIG. 43 is a side elevation view of a second elongated member of the movable handle of the tool of FIG. 33.

As shown in FIGS. 42 and 43, the first elongated member 1072 has an elongated front portion 1082 and an elongated rear portion 1084. The front portion 1082 has inner and outer planar surfaces and front, top and bottom surfaces extending therebetween. The front surface 1082a of the front portion 1082 forms a front end 1072a of the first elongated member 1072. The rear portion 1084 has inner and outer planar surfaces and rear, top and bottom surfaces extending therebetween. The rear surface 1084a of the rear portion 1084 forms a rear end 1072b of the first elongated member 1072. The rear portion 1084 extends from the rear end of the front portion 1082. In an embodiment, the front and rear portions 1082, 1084 are linearly aligned with to each other.

The second elongated member 1074 has an elongated front portion 1086 and an elongated rear portion 1088. The front portion 1086 has inner and outer planar surfaces and front, top and bottom surfaces extending therebetween. The front surface 86a of the front portion 1086 forms a front end 1074a of the second elongated member 1074. The rear portion 1088 has inner and outer planar surfaces and rear, top and bottom surfaces extending therebetween. The rear surface 1088a of the rear portion 1088 forms a rear end 1074b of the second elongated member 1074. The rear portion 1088 extends from the rear end of the front portion 1086. In an embodiment, the front and rear portions 1086, 1088 are linearly aligned with to each other.

The front end 1072a of the first elongated member 1072 is pivotally attached to the inner surface of the first jaw 1024 at a bottom end thereof, and a rear section of the front portion 1082 and the rear portion 1084 extends rearwardly of the first jaw 1024. The front end 1074a of the second elongated member 1074 is pivotally attached to the inner surface of the second jaw 1026, and a rear section of the front portion 1086 and the rear portion 1088 extends rearwardly of the second jaw 1026. A pivot pin 1090 extends through the first jaw 1024, the first elongated member 1072, the second elongated member 1074 and the second jaw 1026 to pivotally attach the first and second elongated members 1072, 1074 to the jaws 1024, 1026. The front portions 1082, 1086 align with each other; and the rear portions 1084, 1088 align with each other. The grip 1080 is attached to the rear portions 1084, 1088 to provide a grasping region for a user to grasp during operation of the tool 1010. While separate first and second elongated members 1072, 1074 are shown and described herein, it is to be understood that the rear portions 1084, 1088 of the first and second elongated members 1072, 1074 can be integrally formed with each other to form a single elongated member, with the front portions 1082, 1086 separated from each other by a slot.

The holding pawl assembly 1076 has a holding pawl 1092 pivotally mounted between the first and second elongated members 1072, 1074 of the movable handle 1017 by the pivot pin 1090, and a holding pawl torsion spring 1096.

Figure 44:
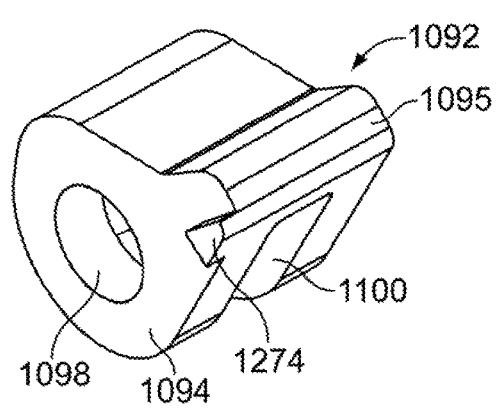
FIG. 44 is a rear perspective view of a holding pawl of the tool of FIG. 33.
Figure 45:
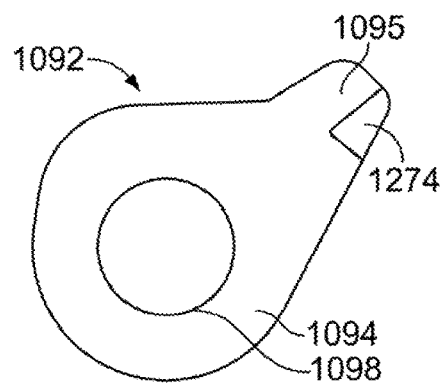
FIG. 45 is a side elevation view of the holding pawl of FIG. 44.
Figure 46:
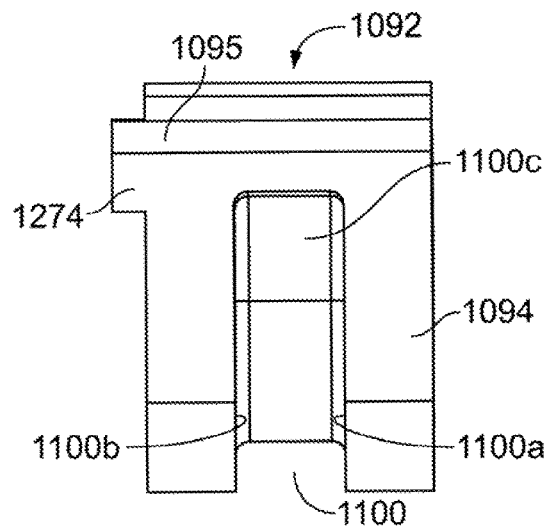
FIG. 46 is a rear plan view of the holding pawl of FIG. 44.

As shown in FIGS. 44-46, the holding pawl 1092 has a body 1094 with a tooth 1095 extending from an upper end of the body 1094. An aperture 1098 is provided through the body 1094 proximate to the lower end thereof. A portion of the body 1094 is bifurcated by a slot 1100 which extends from a lower end of the body 1094 upwardly. The slot 1100 is formed of a first side wall 1100a which extends upwardly from the lower end of the body 1094, a second side wall 1100b which extends upwardly from the lower end of the body 1094, and a top wall 1100c connecting the upper ends of the side walls 1100a, 1100b. Each wall 1100a, 1100b, 1100c extends from a front end of the body 1094 to a rear end of the body 1094. In an embodiment, the top wall 1100c is angled from the front end to the rear end of the body 1094. The pivot pin 1090 extends through the aperture 1098.

The holding pawl torsion spring 1096, see FIG. 36, seats within the slot 1100 and has a coiled portion 1096a wrapped around the pivot pin 1090 and legs 1096b, 1096c extending outwardly therefrom. The upper leg 1096b extends outwardly from the coiled portion 1096a and engages the top wall 1100c of the holding pawl 1092, and the lower leg 1096c extends outwardly from the coiled portion 1096a and engages with a filler piece of the grip 1080. The holding pawl torsion spring 1096 normally biases the holding pawl 1092 in a counter-clockwise direction around the pivot pin 1090.

The driving pawl assembly 1078 has a driving pawl 1102 mounted between the first and second elongated members 1072, 1074 of the movable handle 1016 and pivotally attached to the first and second elongated members 1072, 1074 by a driving pawl pin 1104, and a driving pawl torsion spring 1106. The driving pawl pin 1104 is attached to the first and second elongated members 1072, 1074 proximate to, but spaced rearwardly of, the pivot pin 1090 such that the driving pawl 1102 is mounted rearwardly of the holding pawl 1092. The driving pawl 1102 is longer than the holding pawl 1092.

Figure 47:
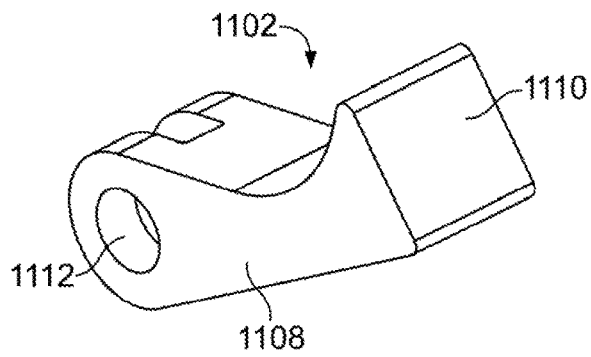
FIG. 47 is a rear perspective view of a driving pawl of the tool of FIG. 33.
Figure 48:
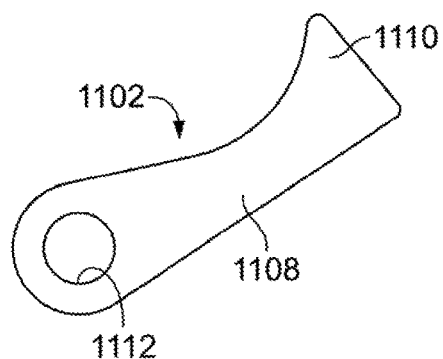
FIG. 48 is a side elevation view of the driving pawl of FIG. 46.
Figure 49:
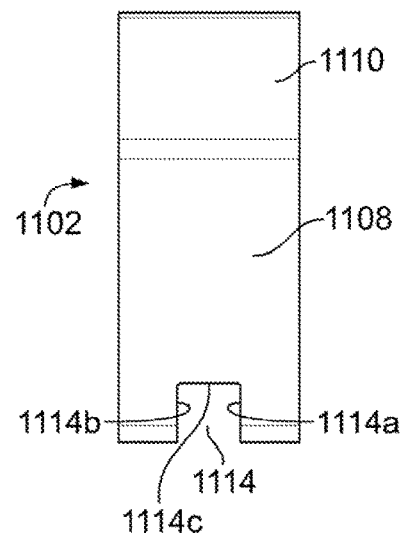
FIG. 49 is a rear plan view of the driving pawl of FIG. 46.

As shown in FIGS. 47-49, the driving pawl 1102 has a body 1108 with a hook end 1110 extending from an upper end of the body 1108. An aperture 1112 is provided through the body 1108 proximate to the lower end of the body 1108. The driving pawl pin 1104 extends through the aperture 1112. A portion of the body 1108 is bifurcated by a slot 1114 which extends from a lower end of the body 1108 upwardly. The slot 1114 is formed of a first side wall 1114a which extends upwardly from the lower end of the body 1108, a second side wall 1114b which extends upwardly from the lower end of the body 1108, and a top wall 1114c connecting the upper ends of the side walls 1114a, 1114b. Each wall 1114a, 1114b, 1114c extends from a front end of the body 1108 to a rear end of the body 1108. In an embodiment, the top wall 1114c is angled from the front end to the rear end of the body 1108.

The driving pawl torsion spring 1106, see FIG. 36, seats within the slot 1114 and has a coiled portion 1106a wrapped around the driving pawl pin 1104 and legs 1106b, 1106c extending outwardly therefrom. The upper leg 1106b extends outwardly from the coiled portion 1106a and engages the top wall 1114c of the driving pawl 1102, and the lower leg 1106c extends outwardly from the coiled portion 1106a and engages with a filler piece of the grip 1080. The driving pawl torsion spring 1106 normally biases the driving pawl 1102 in a counter-clockwise direction.

Figure 50:
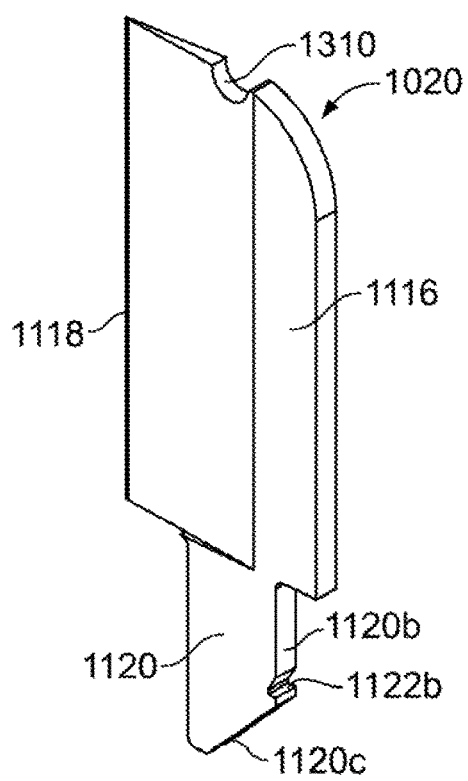
FIG. 50 is a rear perspective view of a blade of the tool of FIG. 33.
Figure 51:
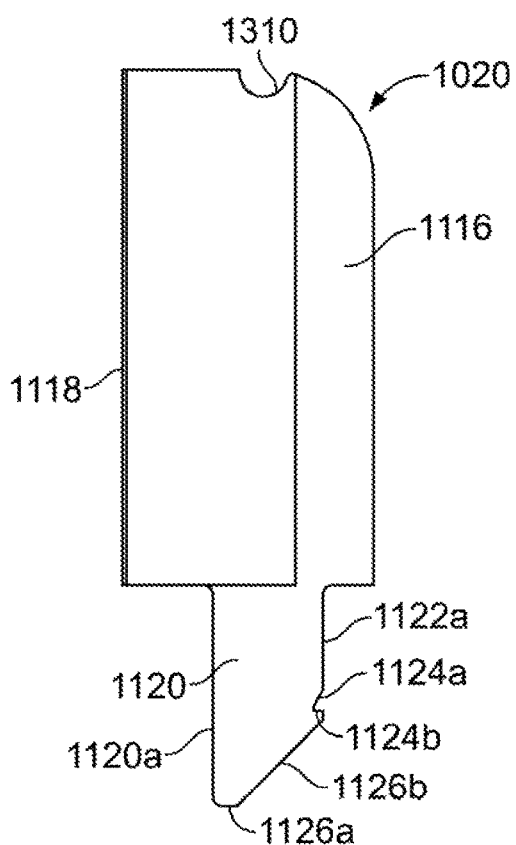
FIG. 51 is a side elevation view of the blade of FIG. 50.

As shown in FIGS. 50 and 51, the blade 1020 has a body 1116 having a cutting edge 1118 provided at a front edge thereof, and a leg 1120 extending downwardly from the body 1116. The cutting edge 1118 is centered on the front edge such that the body 1116 is substantially symmetrical on both sides of the cutting edge 1118. In an embodiment, the leg 1120 has an outer profile defined by a planar forward edge 1120a which extends downwardly from the body 1116, a rearward edge 1120b which extends downwardly from the body 1116, and a lower edge 1120c which extends between the forward edge 1120a and the rearward edge 1120b. In an embodiment, the rearward edge 1120b has an upper planar section 1122a which is parallel to the forward edge 1120a, and a lower generally V-shaped notched section 1122b which extends from the upper section 1122a to the lower edge 1120c. The notched section 1122b has an upper wall 1124a which joins with a lower wall 1124b to form the generally V-shape. In an embodiment, the lower edge 1120c has a front section 1126a which is perpendicular to the forward edge 1120a and a rear section 1126b which extends upwardly at an angle from the front section 1126a to the rearward edge 1120b.

The blade receiving assembly 1022 includes a blade receiving gear 1128 into which the blade 1020 is inserted, a slide plate 1130, a spring 1132, first and second plates 1134, 1136, and a spring retention plate 1240. The blade 1020 can be released from the blade receiving gear 1128 for replacement with a new blade. The blade receiving gear 1128 is fixedly attached between the first and second plates 1134, 1136. The blade receiving gear 1128/first plate 1134/second plate 1136 are pivotally mounted between the elongated members 1030, 1032 of the stationary handle 1014 by a pivot pin 1138. The slide plate 1130, the spring retention plate 1240 and the spring 1132 are mounted on the blade receiving gear 1128. In some embodiments, the spring 1132 is a coiled spring. In some embodiments, the spring 1132 is a leaf spring. In some embodiments, the spring 1132 is a rubber block.

The first plate 1134 has planar inner and outer surfaces, which are defined by front, rear, top and bottom surfaces. A through hole 1137, see FIG. 36, is provided through the first plate 1134 proximate to the corner between the upper edge and the front edge, and the pivot pin 1138 extends therethrough. The second plate 1136 has planar inner and outer surfaces which are defined by front, rear, top and bottom surfaces. A through hole 1139 is provided through the second plate 1136 proximate to the corner between the upper edge and the front edge, and the pivot pin 1138 extends therethrough.

Figure 53:
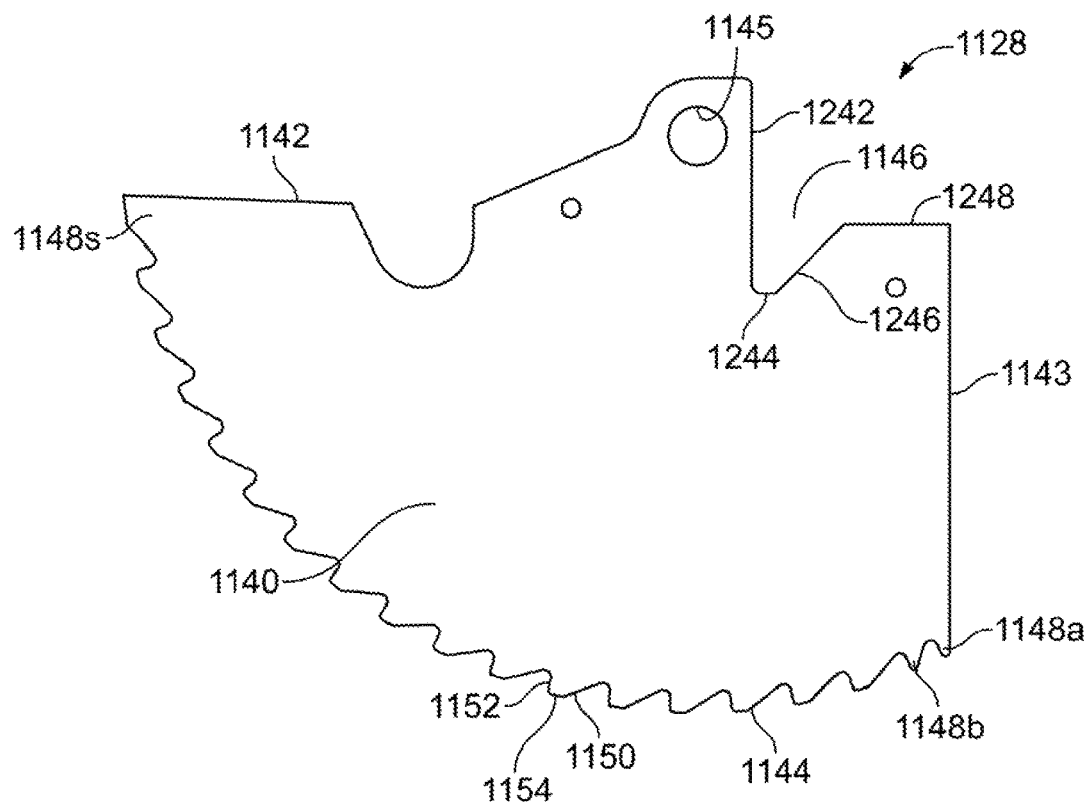
FIG. 53 is a side elevation view of a blade receiving gear of the tool of FIG. 33.
Figure 54:
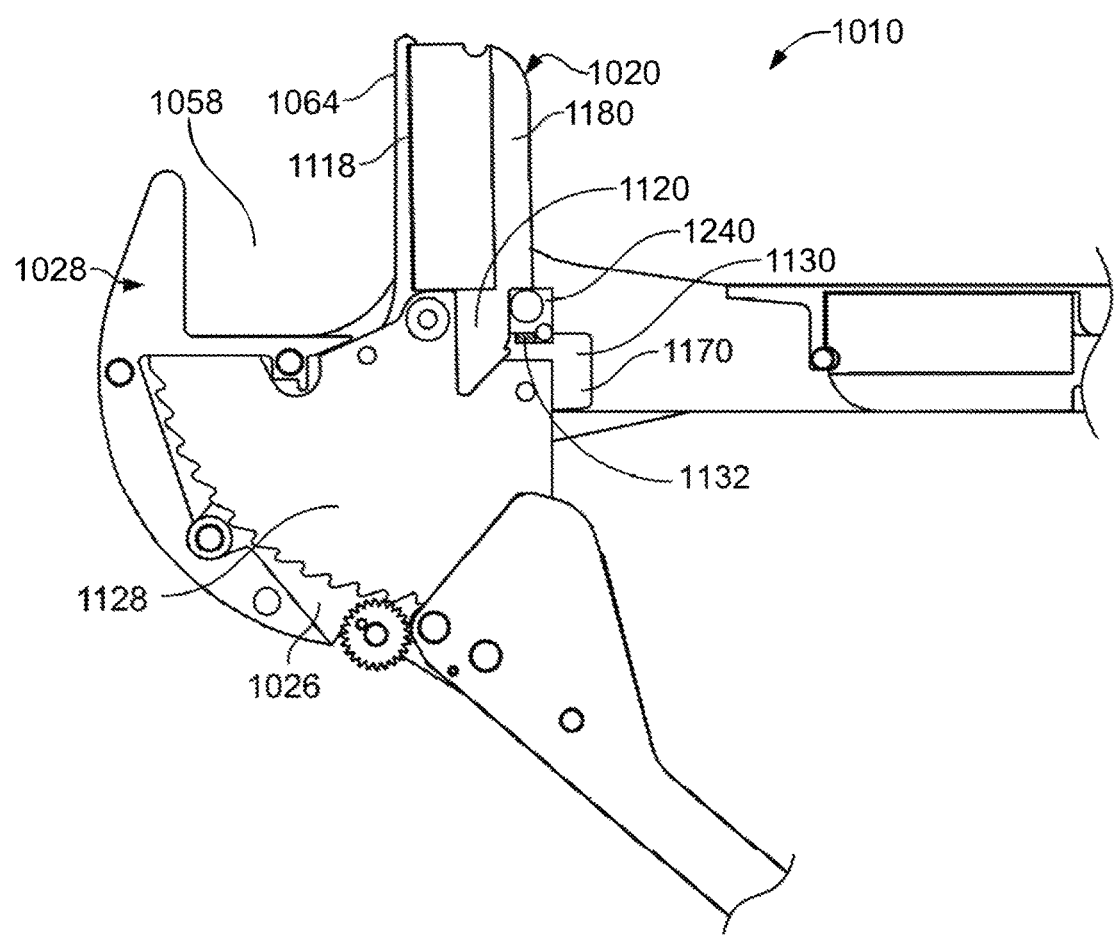
FIG. 54 is a partial side elevation view of the tool of FIG. 33 with some components removed so that internal structures can be seen.

An embodiment of the blade receiving gear 1128 is shown in FIG. 53. The blade receiving gear 1128 is formed of a body 1140 having planar inner and outer surfaces which are defined by a top surface 1142, a bottom surface 1144 and a rear surface 1143 extending between the top and bottom surfaces 1142, 1144. An aperture 1145 is provided through the body 1140 proximate to the midpoint of the top surface 1142 and the pivot pin 1138 extends therethrough. A notch 1146 extends downwardly from the top surface 1142 rearwardly of the aperture 1145. The bottom surface 1144 is curved and has a plurality of teeth 1148a-1148s thereon. More or fewer teeth than what is shown in the drawings may be provided. A first tooth is denoted at 1148a and is at the rearmost end of the teeth 1148a-1148s. A second tooth is denoted at 1148b; the teeth 1148c-1148s continue to the last tooth 1148s (in the embodiment as shown in the drawings) at the front of the teeth 1148a-1148s. A leading surface of each tooth 1148a-1148s is denoted at 1150, a trailing surface of each tooth 1148a-1148s is denoted at 1152, and a top land of each tooth 11148a-1148s is denoted at 1154. In some embodiments, the leading surface 1150 of the first tooth 1128a is formed by the rear surface 1143 of the body 1140. In some embodiments, the teeth 1148a-1148s have the same radius (as shown in FIG. 21A); in some embodiments, the teeth 1148a-1148s have a variable radius (as shown in FIG. 21B).

The notch 1146 is formed of a first wall 1242, a second wall 1244, a third wall 1246 and a fourth wall 1248. The first, second and third walls 1242, 1244, 1246 mirror the shape of the forward edge 1120a, and the lower edge 1120c of the leg 1120 of the blade 1020. The fourth wall 1248 extends from the third wall 1246 to the rear surface 1143 of the body 1140 and in some embodiments, is perpendicular to the first wall 1242 and at an angle relative to the third wall 1246.

Figure 55:
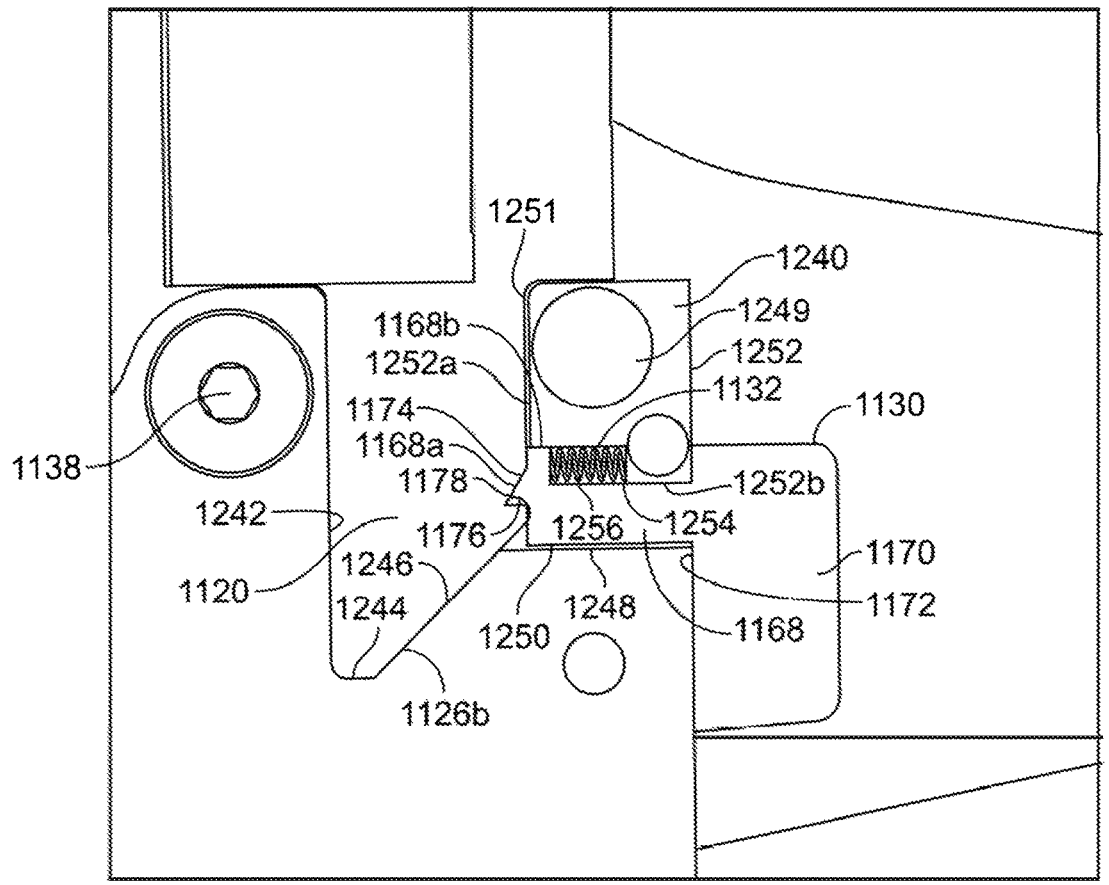
FIG. 55 is a partial side elevation view of the tool of FIG. 33 with some components removed so that internal structures can be seen.

The spring retention plate 1240 is fixedly attached to the inner surface of the first plate 1134 proximate to, but spaced from, the fourth wall 1248 of the blade receiving gear 1128 such that a space 1250, see FIG. 55, is provided therebetween in which the slide plate 1130 is seated, and the spring retention plate 1240 is fixedly attached to the inner surface of the first plate 1134 proximate to, but spaced from, the first wall 1242 of the blade receiving gear 1128 such that a space 1251 is provided therebetween in which the leg 1120 of the blade 1020 is seated. The spring retention plate 1240 is fixedly attached to the first plate 1134 by suitable means, such as rivets 1249. In an embodiment, the spring retention plate 1240 is formed of a plate 1252 having a cutout 1254 extending rearwardly from the front end 1252a of the plate 1252 and upwardly from the bottom end 1252b of the plate 1252.

The slide plate 1130 has a front portion 1168 and a rear portion 1170; the front portion 1168 having a height which is less than a height of the rear portion 1170 such that a shoulder 1172 is provided between the portions 1168, 1170. A front end 1168a of the front portion 1168 has a profile which mirrors or generally mirrors the profile of the notched section 1122b of the blade 1020. As shown, the front end 1168a of the front portion 1168 has an upper wall 1174 which joins with a lower wall 1176 at a tip 1178. A cutout 1256 is provided in the slide plate 1130 and extends from a top surface 1168b of the front portion 1168.

In use, the leg 1120 of the blade 1020 seats within the notch 1146 and abuts the walls 1242, 1244, 1246 and may abut against the front end of the spring retention plate 1240. The leg 1120 is also captured between the first and second plates 1134, 1136. The front end 1168a of the slide plate 1130 seats within the notched section 1122b of the blade 1020. The front portion 1168 of the slide plate 1130 seats within the space 1250 and the rear portion 1170 extends rearwardly of the blade receiving gear 1128 and the spring retention plate 1240. The slide plate 1130 is movable relative to the blade receiving gear 1128 and the spring retention plate 1240. The spring 1132 seats within, and is trapped between, the cutout 1254 of the spring retention plate 1240 and the cutout 1256 of the slide plate 1130. When the blade 1020 is seated within the notch 1146 of the blade receiving gear 1128, the spring 1132 is in its expanded or substantially expanded condition. As a result, the blade 1020 is securely held within the blade receiving gear 1128.

Figure 56:
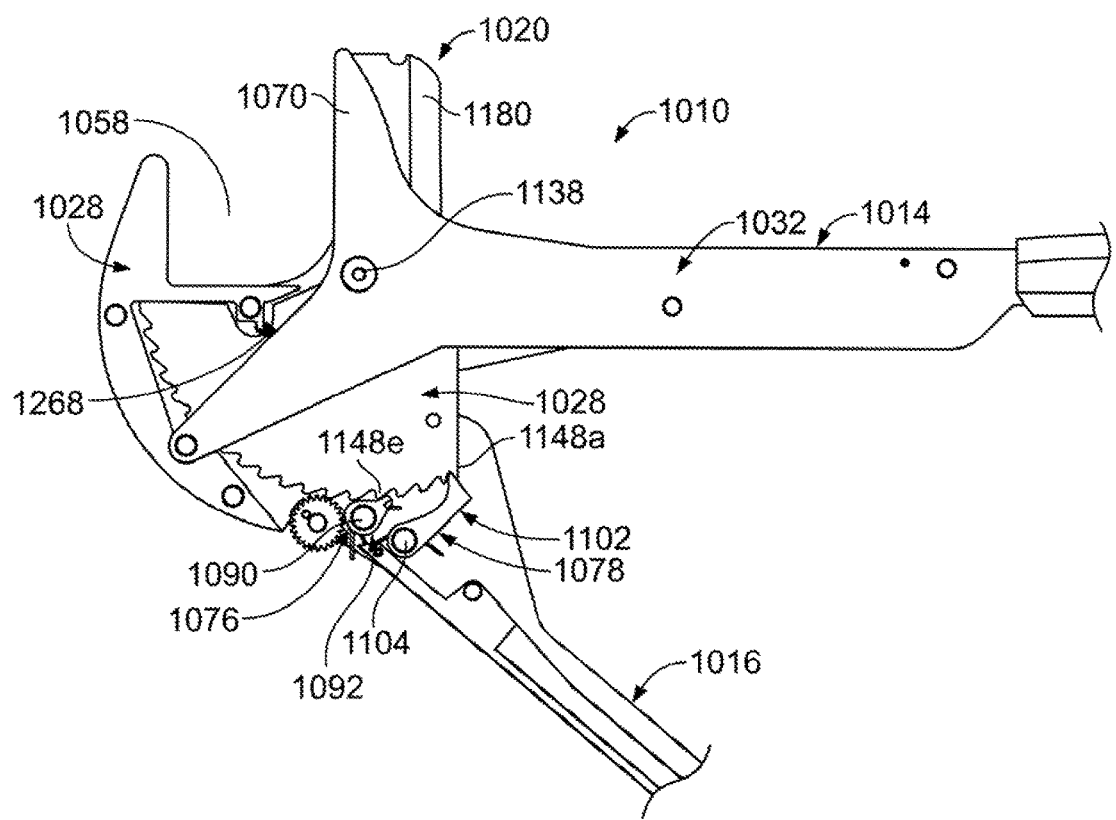
FIG. 56 is a partial side elevation view of the tool of FIG. 33 with some components removed so that internal structures can be seen, the tool of FIG. 33 being in a pre-cut position.

In a pre-cut position as shown in FIG. 56, where a cut of the workpiece 12 has not yet been started, the cutting edge 1118 of the blade 1020 is between the intermediate portions 1064, 1070 of the elongated members 1030, 1032 and a portion 1180 of the body 1116 of the blade 1020 is rearwardly of the intermediate portions 1064, 1070 of the elongated members 1030, 1032. The blade 1020 can be removed from the blade receiving gear 1128 without the use of tools. To remove the blade 1020, a user grasps the rear portion 1170 of the slide plate 1130 and the portion 1180 of the body 1116. The user pulls the slide plate 1130 rearwardly such that the front portion 1168 moves within the space 1250 and the front end 1168a of the slide plate 1130 is removed from the notched section 1122b of the blade 1020. The spring 1132 compresses between the slide plate 1130 and the spring retention plate 1240. When an outward force is applied to the blade 1020 by the user, the blade 1020 is then removed from the blade receiving gear 1128. Once the blade 1020 is completely removed from the blade receiving gear 1128, the rear portion 1170 of the slide plate 1130 is released by the user and the spring 1132 resumes its expanded condition, which causes the slide plate 1130 to move forwardly in the space 1250. As the slide plate 1130 moves forwardly, the shoulder 1172 engages the rear surface 1143 of the blade receiving gear 1128 to prevent the further movement of the slide plate 1130 relative to the blade receiving gear 1128.

In an embodiment, the blade 1020 can be inserted into the blade receiving gear 1128 without tools and with one hand of the user. The user pushes the leg 1120 of the blade 1020 downwardly into the space 1251. As the blade 1020 moves downwardly, the angled rear section 1126b of the lower edge 1120c of the blade 1020 engages with the upper angled wall 1174 of the slide plate 1130 which causes the slide plate 1130 to move rearwardly and engage against the spring 1132. The spring 1132 compresses and the slide plate 1130 moves further away from the blade 1020. After the angled rear section 1126b of the blade 1020 passes the slide plate 1130, the spring 1132 resumes its expanded condition, which causes the slide plate 1130 to move forwardly in the space 1250 until the front end 1168a of the slide plate 1130 seat within the notched section 1122b of the blade 1020. As the slide plate 1130 moves forwardly, the shoulder 1172 engages the rear surface 1143 of the blade receiving gear 1128 to prevent the further movement of the slide plate 1130 relative to the blade receiving gear 1128.

In an embodiment, the blade 1020 can be inserted into the blade receiving gear 1128 without tools by a user grasping the rear portion 1170 of the slide plate 1130 and pulling the slide plate 1130 rearwardly such that the front portion 1168 moves within the space 1250 and the front end 1168a of the slide plate 1130 is removed from the space 1251. The user also grasps the portion 1180 of the body 1116 of the blade 1020 and pushes the leg 1120 of the blade 1020 downwardly into the space 1251. Once the leg 1120 is fully inserted, the rear portion 1170 of the slide plate 1130 is released by the user and the spring 1132 resumes its expanded condition, which causes the slide plate 1130 to move forwardly in the space 1250 until the front portion 1168a seats within the notched section 1122b of the blade 1020. As the slide plate 1130 moves forwardly, the shoulder 1172 engages the rear surface 1143 of the blade receiving gear 1128 to prevent the further movement of the slide plate 1130 relative to the blade receiving gear 1128.

The blade receiving gear 1128 seats between the first and second plates 1134, 1136 and are affixed together by suitable means, such as fasteners. The first plate 1134 seats between the first jaw 1024 and the blade receiving gear 1128. The second plate 1136 seats between the second jaw 1026 and the blade receiving gear 1128. The pivot pin 1138 extends through the first jaw 1024, the first elongated member 1030 of the stationary handle 1014, the first plate 1134, the blade receiving gear 1128, the second plate 1136, the second elongated member 1032 of the stationary handle 1014, and the second jaw 1026. The blade receiving gear 1128 and the first and second plates 134, 136 can pivot relative to the first and second jaws 1024, 1026.

In the pre-cut position as shown in FIG. 56, where a cut of the workpiece 12 has not yet been started, the cutting edge 1118 of the blade 1020 is between the intermediate portions 1064, 1070 of the elongated members 1030, 1032 such that the cutting edge 1118 is not easily accessible by a user. In the pre-cut position, the tooth 1095 of the holding pawl 1092 engages the trailing surface 1152 of tooth 1148e and the hook end 1110 of the driving pawl 1102 engages with the trailing surface 1152 of tooth 1148a and the leading surface 1150 of tooth 1148b. The workpiece 12 is inserted into the receiving space 1058.

To operate the tool 1010, the user grasps the tool 1010 in both hands. One hand of the user engages the grip 1034 of the stationary handle 1014 and the other hand of the user engages the grip 1080 of the movable handle 1016. The movable handle 1016 is pivoted around pivot pin 1090 to move the rear portions 1084, 1088 of the movable handle 1016 toward the rear portions 1062, 1068 of the stationary handle 1014. This causes the movement of the holding pawl 1092 and the driving pawl 1102 which are mounted on the movable handle 1016 toward the blade receiving gear 1128 to move the blade receiving gear 1128 in a ratcheting manner from an open position wherein the rear portions 1084, 1088 of the movable handle 1016 are spaced from the rear portions 1062, 1068 of the stationary handle 1014 to a closed position wherein the rear portions 1084, 1088 of the movable handle 1016 are proximate to the rear portions 1062, 1068 of the stationary handle 1014. The driving pawl 1102 is biased in the counter-clockwise direction under the force of its torsion spring 1106 and pushes against the trailing surface 1152 of the tooth 1148a as the movable handle 1016 moves toward the stationary handle 1014. In an embodiment, the movable handle 1016 and the stationary handle 1014 are parallel to each other, or are generally parallel to each other, when the rear portions 1084, 1088 of the movable handle 1016 and the rear portions 1062, 1068 of the stationary handle 1014 are at their closest point. This causes the blade receiving gear 1128 to rotate in the counter-clockwise direction, thereby rotating the blade 1020 in the counter-clockwise direction and into the receiving space 1058.

Figure 57:
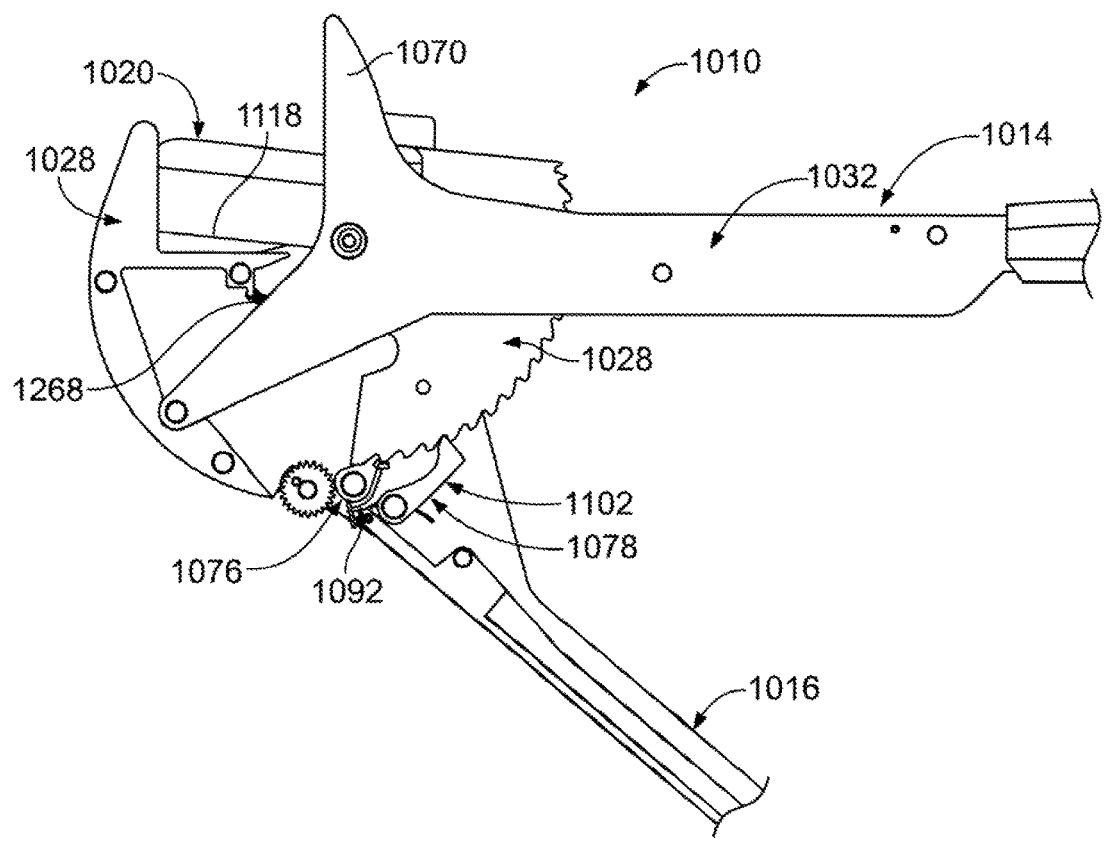
FIG. 57 is a partial side elevation view of the tool of FIG. 33 with some components removed so that internal structures can be seen, the tool of FIG. 33 being in a post-cut position.
Figure 52:
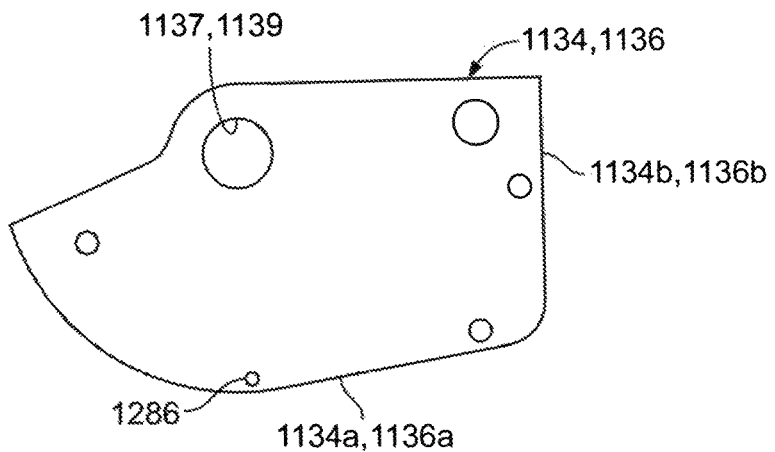
FIG. 52 is a side elevation view of a plate of the tool of FIG. 33.

When the blade receiving gear 1128 rotates, the holding pawl 1092 moves along the leading surface 1150 of tooth 1148e. The biasing force from the torsion spring 1096 biasing the holding pawl 1092 in the counter-clockwise direction is overcome and the holding pawl 1092 pivots in the clockwise direction to pass over the top land 1154 of tooth 1148e and thereafter engage the leading surface 1150 of tooth 1148f as the blade receiving gear 1128 rotates in the counter-clockwise direction. The pressure on the movable handle 1016 is thereafter released, and the holding pawl 1092 rotates in the counter-clockwise direction under the force of its torsion spring 1096. When the pressure on the movable handle 1016 is released, the driving pawl 1102 rides along the leading surface 1150 of tooth 1148b and the biasing force from the torsion spring 1106 biasing the driving pawl 1102 in the counter-clockwise direction is overcome and the driving pawl 1102 pivots in the clockwise direction to pass over the top land 1154 of tooth 1148b and thereafter engage the trailing surface 1152 of tooth 1148b. This ratcheting action is repeated until the workpiece 12 is completely cut. FIG. 57 shows the tool 1010 in an intermediate cutting position where the blade 1020 is almost completely rotated; the holding pawl 1092 is engaged with the trailing surface 1152 of the penultimate tooth 1148r and the driving pawl 1102 is engaged between teeth 1148o and 1148p, and the cutting edge 1118 of the blade 1020 is almost parallel to the upper surface 1044a of the base 1044 of the anvil 1028. In its post-cut position, the holding pawl 1092 is engaged with the trailing surface 1152 of the last tooth 1148s and the driving pawl 1102 is engaged between teeth 1148p and 1148q, the cutting edge 1118 of the blade 1020 is parallel to the upper surface 1044a of the base 1044 of the anvil 1028, and the blade 1020 seats within the slot 1054 within the upper leg 1046 and in the recess 1050 in the base 1044 of the anvil 1028. The engagement of the blade 1020 with the wall forming the recess 1050 prevents the further movement of the blade 1020 in the counter-clockwise direction.

When the teeth 148a-148p of the blade receiving gear 128 of FIG. 21A are provided as part of the blade receiving gear 1128 of the tool 1010, this results a mechanical advantage during the cut of the workpiece 12 for the same reasons as discussed hereinabove. By varying the radius 159a-159p of the teeth 148a-148p, the effective gear ratio between the teeth 148a-148p and the driving pawl 1102 is varied, which varies the mechanical advantage between the teeth 148a-148p and the driving pawl 102. Since the teeth 148a-148i have a larger radius 159a-159i at the beginning of the cut which are engaged by the driving pawl 102, the torque generated is greater. This is desirable as the greatest amount of workpiece material is being cut at the beginning of the cut. Once the initial cut through the wall of the workpiece 12 is completed, less torque is required so the radius 159j-159p decreases as the teeth 148j-149p progress forwardly toward the front of the blade receiving gear 1128 and as the driving pawl 102 engages with the teeth 148j-149p. This enables the tool 10 to cut the workpiece 12 faster than the cut being made through the initial cut through the wall of the workpiece 12.

The blade 1020 can be released from its post-cut position by the release assembly 1018. The release assembly 1018 includes a release lever 1260, a release handle 1262, a release handle torsion spring 1264, a connecting rod 1266, and one or more extension springs 1268.

Figure 58:
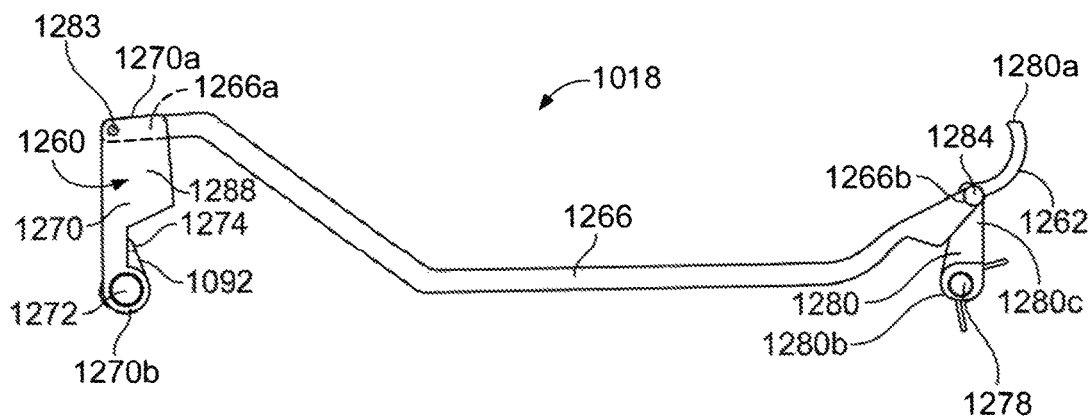
FIG. 58 is a side elevation view of a portion of a release assembly of the tool of FIG. 33.
Figure 59:
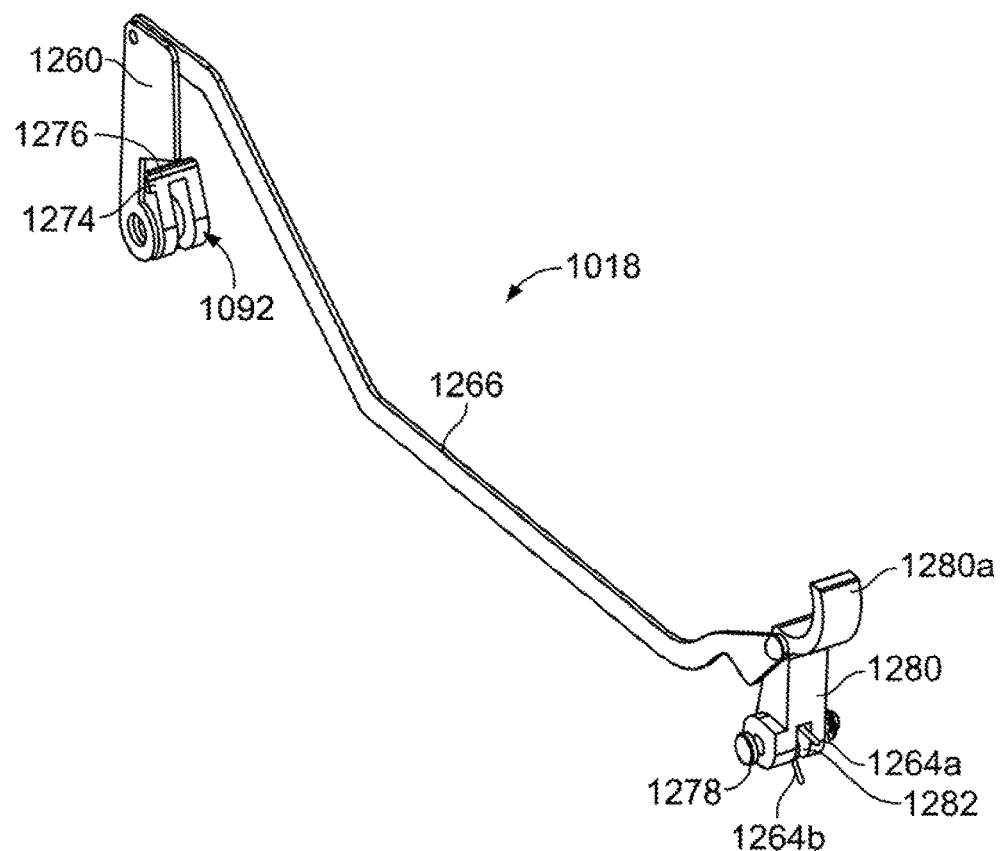
FIG. 59 is a rear perspective view of the portion of the release assembly.
Figure 60:
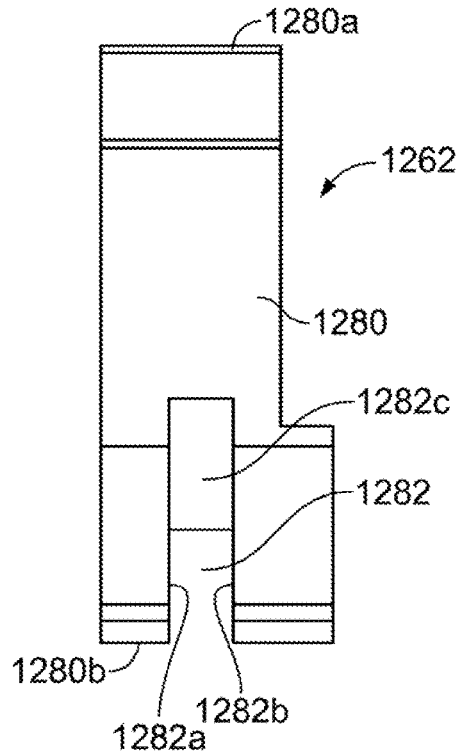
FIG. 60 is a front plan view of a release handle the portion of the release assembly.

The release lever 1260, see FIGS. 58 and 59, has an elongated body 1270 having an upper end 1270a and a lower end 1270b, and having an aperture 1272 through the lower end 1270b of the body 1270. The pivot pin 1090 extends through the aperture 1272 such that the release lever 1260 is rotatably attached to the movable handle 1016. The release lever 1260 is provided between the elongated member 1072 and the blade receiving gear 1128. The release lever 1260 is engaged with the holding pawl 1092, but is rotatable relative to the holding pawl 1092. In an embodiment, the holding pawl 1092 has a protrusion 1274, see FIGS. 44-46, which extends outwardly from the tooth 1095 and is configured to engage with the upper end 1270a of the body 1270. In an embodiment, the protrusion 1274 is provided on the upper end 1270a of the body 1270 and engages the tooth 1095 of the holding pawl 1092. In an embodiment, the holding pawl 1092 seats within a slot 1276 in the body 1270 of the release lever 1260.

The release handle 1262 is rotatably mounted on the movable handle 1016 proximate to the grip 1080. In an embodiment, the release handle 1262 is mounted between the elongated members 1070, 1072 by a pivot pin 1278 which extends through the release handle 1262 and the elongated members 1070, 1072. The release handle 1262 has a body 1280 having an upper end 1280a and a lower end 1280b; an aperture 1278 is provided through the lower end 1280b of the body 1280 through which the pivot pin 1278 extends. In an embodiment, the upper end 1280a is curved. The upper end 1280a forms a tab. A portion of the body 1280 is bifurcated by a slot 1282 which extends from the lower end 1280b of the body 1280 upwardly. The slot 1282 is formed of a first side wall 1282a which extends upwardly from the lower end 1280b of the body 1280, a second side wall 1282b which extends upwardly from the lower end 1280b of the body 1280, and a top wall 1282c connecting the upper ends of the side walls 1282a, 1282b. Each wall 1282a, 1282b, 1282c extends from a front end of the body 1280 to a rear end of the body 1280. In an embodiment, the top wall 1282c is angled from the front end to the rear end of the body 1280.

The release handle torsion spring 1264 seats within the slot 1282 and has a coiled portion 1264a wrapped around the pivot pin 1278 and legs 1264b, 1264c extending outwardly therefrom. The upper leg 1264b extends outwardly from the coiled portion 1264a and engages the top wall 1282c of the release handle 1262, and the lower leg 1264c extends outwardly from the coiled portion 1264a and engages with the grip 1080.

The connecting rod 1266 is an elongated member and has a first end 1266a pivotally connected to the release lever 1260 at pivot pin 1283 and a second end 1266b pivotally connected the release handle 1262 at pivot pin 1284. In an embodiment, the connecting rod 1266 is pivotally connected to the upper end 1270a of the body 1270 of the release lever 1260 and is pivotally connected to a middle portion 1280c of the release handle 1262.

The release handle torsion spring 1264 normally biases the release handle 1262 in a counter-clockwise direction around the pivot pin 1278, which also biases the connecting rod 1266 in a forward direction and the release lever 1260 into a counter-clockwise direction around the pivot pin 1090.

In an embodiment, the first and second plates 1134, 1136 are identically formed. In an embodiment, the bottom surfaces 1134a, 1136a of the first and second plates 1134, 1136 are curved and an aperture 1286 is provided between the respective bottom surface 1134a, 1136a and the rear surface 1134b, 1136b of the first and second plates 1134, 1136.

In an embodiment, two extension springs 1268 are provided. The first extension spring 1268 has a first end connected to the lower surface 1044d of the base 1044 at aperture 1287a and a second end connected to the aperture 1286 the first plate 1134; the second extension spring 1268 has a first end connected to the lower surface 1044d of the base 1044 at aperture 1287b and a second end connected to the aperture 1286 the second plate 1136. The extension springs 1268 engage against the bottom surfaces 1134a, 1136a of the first and second plates 1134, 1136.

During operation of the tool 1010 as the blade receiving gear 1128 is moved in the ratcheting manner, when the blade receiving gear 1128 rotates in the counter-clockwise direction, the fixedly attached first and second plates 1134, 1136 also rotate in the counter-clockwise direction. This causes the one or more extension springs 1268 to expand. The release lever 1260 does not rotate since the torsion spring 1264 causes the release lever 1260 to be biased in a counter-clockwise direction around the pivot pin 1090. During rotation of the holding pawl 1092, the protrusion 1274 on the holding pawl 1092 separates from the engagement with the release lever 1260.

Figure 61:
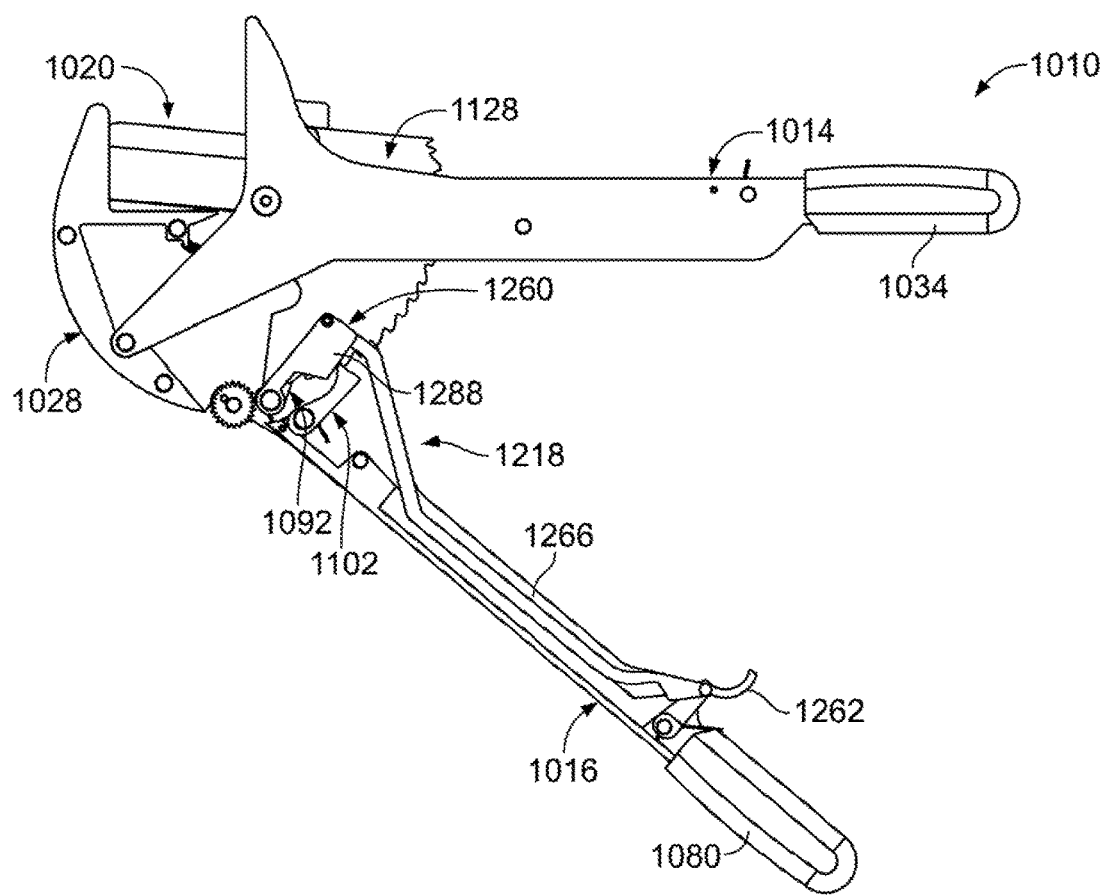
FIG. 61 is a side elevation view of the tool of FIG. 33 with some components removed so that internal structures can be seen, the tool being in a pre-release condition.
Figure 62:
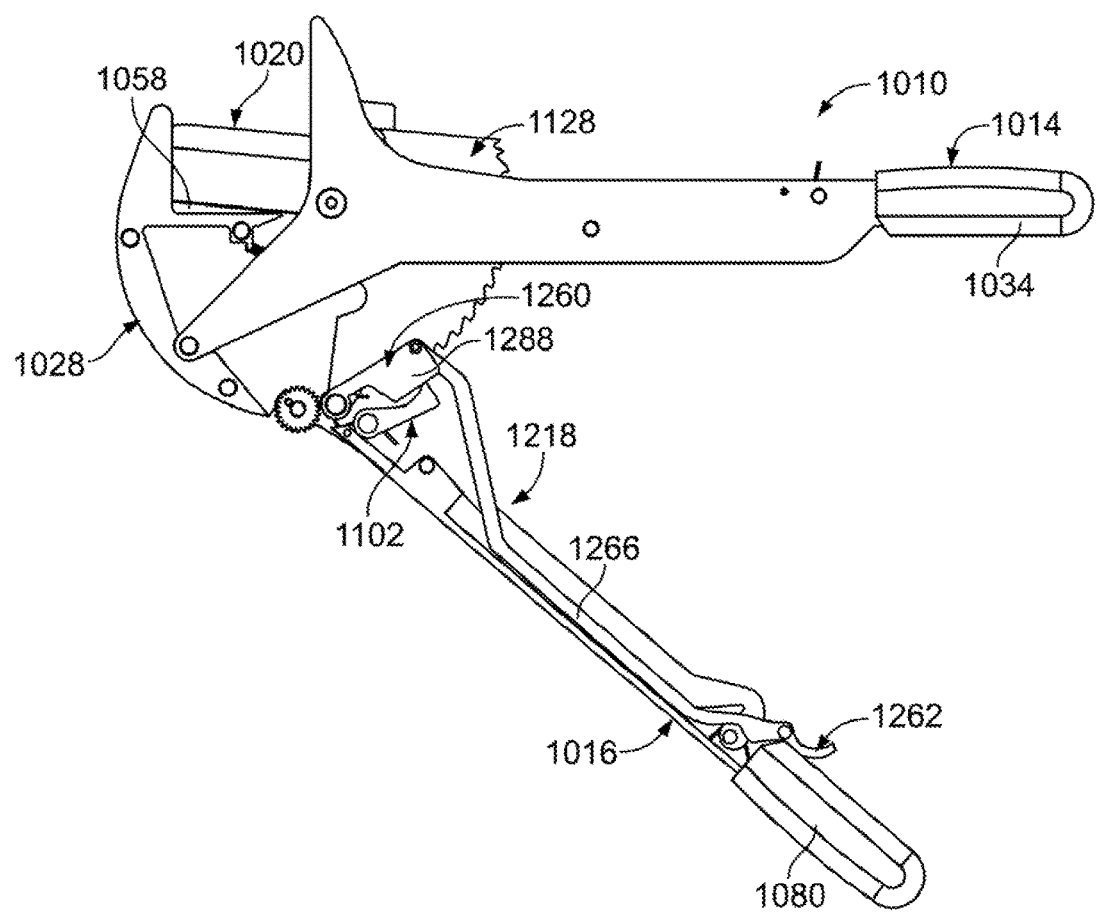
FIG. 62 is a side elevation view of the tool of FIG. 33 with some components removed so that internal structures can be seen, the tool being in a post-release condition.

To operate the release assembly 1018, a user engages the upper end 1280a which forms the tab and rotates the release handle 1262 in the clockwise direction, thereby moving the connecting rod 1266 rearwardly and causing the release lever 1260 to rotate in the clockwise direction. Upon rotation in the clockwise direction, the release lever 1260 first engages against protrusion 1274 on the holding pawl 1092 as shown in FIG. 61, and rotates the holding pawl 1092 in the clockwise direction against the force of its torsion spring 1096 such that the tooth 1095 of the holding pawl 1092 disengages from the blade receiving gear 1128. Upon continued rotation in the clockwise direction, as shown in FIG. 62, the release lever 1260 engages with the body 1108 of the driving pawl 1102 and causes the driving pawl 1102 to rotate in the clockwise direction against the force of its torsion spring 1106 such that the hook end 1110 of the driving pawl 1102 disengages from the blade receiving gear 1128. In an embodiment, the release lever 1260 has an enlarged head 1288 at the upper end 1270a of the body 1270 which engages with the driving pawl 1102.

When both the holding pawl 1092 and the driving pawl 1102 are released from engagement with the blade receiving gear 1128, the extension springs 1268 cause the blade 1020 and the blade receiving assembly 1022 to rotate in the clockwise direction until the cutting edge 1118 is between the intermediate portions 1064, 1070 of the elongated members 1030, 1032 of the stationary handle 1014. Thereafter, the release lever 1260 released by the user and the release lever 1260 rotates in the counter-clockwise direction under the force of its torsion spring 1264, thereby moving the connecting rod 1266 forwardly and causing the release lever 1260 to rotate in the counter-clockwise direction; the holding pawl 1092 and the driving pawl 1102 rotate in the counter-clockwise direction under the force of their torsion springs 1096, 1106 to reengage with the blade receiving gear 1128. In addition, rotation of the holding pawl 1092 in the counter-clockwise direction causes rotation of the release lever 1260 in the counter-clockwise direction since the protrusion 1274 of the holding pawl 1092 is in engagement with the release lever 1260. Thereafter, a new cutting cycle can be effected.

Having both pawls 1092, 1102 mounted on the movable handle 1016 makes the release more reliable and simpler, and with a consistent feel, because the stack-up of tolerances which is created when one pawl is on the movable handle and the other pawl is on the stationary handle as is done in the prior art is eliminated.

The release assembly 1018 can be used to release the blade 1020 after a partial cut of the workpiece 12 has been effected, if desired.

In some embodiments, a handle lock assembly 1208, see FIGS. 63-67, is provided to lock the tool 1010 into a locked condition when in the closed position such that the movable handle 1016 cannot move relative to the stationary handle 1014 and the movable handle 1016 and the stationary handle 1014 are parallel to each other or are generally parallel to each other. This makes the tool 10 more compact for stowage. The handle lock assembly 1208 works in conjunction with the driving pawl 1102 to lock the tool 1010 into the locked condition. The handle lock assembly 1208 includes a surface 1212 provided on the front portion 1082 of the first elongated member 1072 of the movable handle 1016, and a lock wheel 1216 rotatably mounted between the jaws 1024, 1026 at a lower end of the jaws 1024, 1026. In an embodiment, the surface 212 is angled. The lock wheel 1216 and the movable handle 1016 are configured to engage with each other to prevent movement of the movable handle 1016 relative to the stationary handle 1014.

The surface 1212 is provided on the front portion 1082 of the first elongated member 1072 proximate to the front end 1072a. The surface 1212 faces the bottom surface of the first elongated member 1030 of the stationary handle 1014.

The lock wheel 1216 includes a body 1224 and a locking ear 1226 extending from a side of the body 1224. In some embodiments, the body 1224 is cylindrical. In some embodiments, the body 1224 has a knurled outer surface 1228. The locking ear 1226 has opposite side walls 1226a, 1226b, a first end wall 1226c extending between the side walls 1226a, 1226b at one end thereof, and a second end wall 1226d extending between the side walls 1226a, 1226b at the other end thereof. The first end wall 1226c is curved. A hole 1230 extends through the lock wheel 1216 and the locking ear 1226 and a pivot pin 123l extends through the hole 1230 to rotatably connect the wheel 1216 to the first and second jaws 1024, 1026. The first end wall 1226c aligns with the outer diameter of the lock wheel 1216. In some embodiments, the first end wall 1226c extends outwardly from the outer diameter of the lock wheel 1216. The second end wall 1226d is proximate to the hole 1230 and is spaced inwardly from the outer diameter of the lock wheel 1216.

Figure 65:
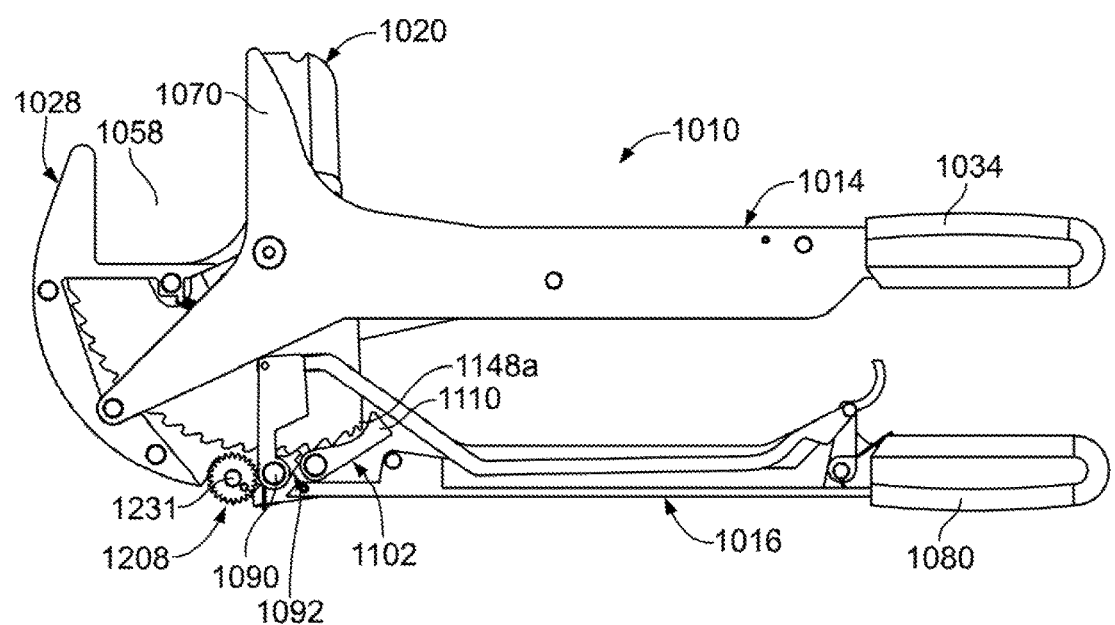
FIG. 65 is a side elevation view of the tool of FIG. 33 with some components removed so that internal structures can be seen, the tool of FIG. 33 being in a locked position.
Figure 66:
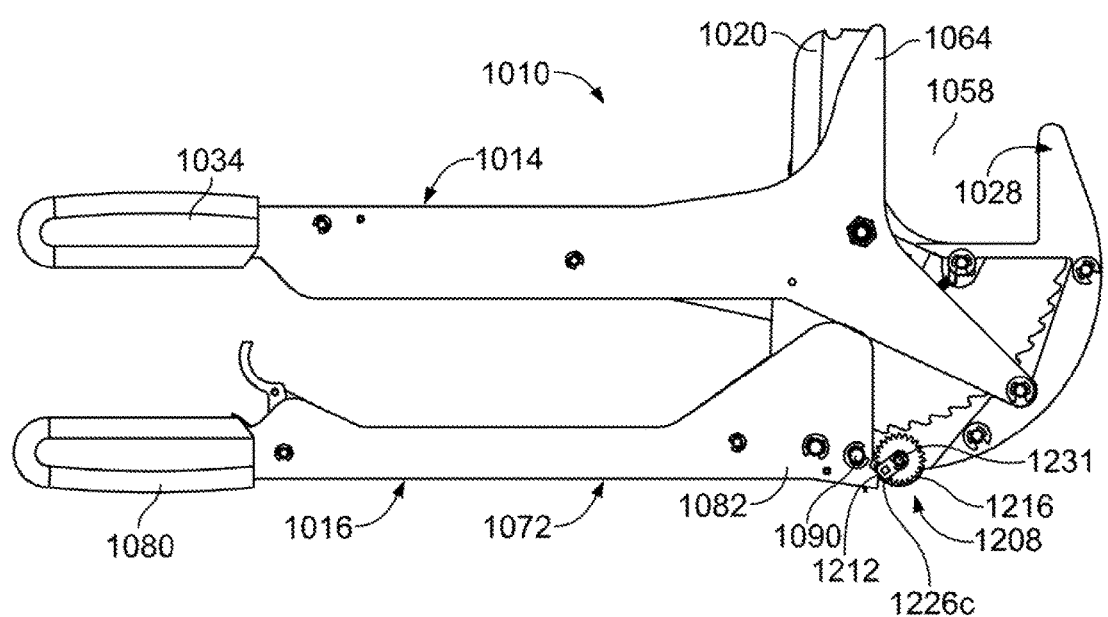
FIG. 66 is an alternate side elevation view of the tool of FIG. 33 with some components removed so that internal structures can be seen, the tool of FIG. 33 being in a locked position.
Figure 67:
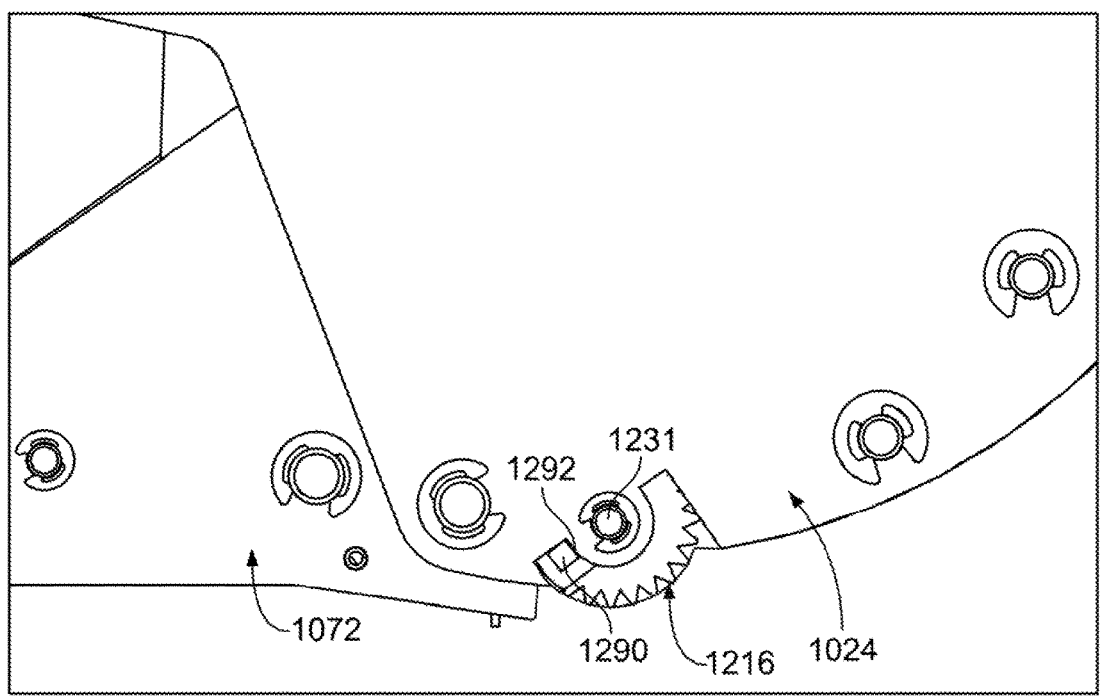
FIG. 67 is a partial enlarged side elevation view of the tool of FIG. 33 with some components removed so that internal structures can be seen, the tool of FIG. 33 being in a locked position.
Figure 68:
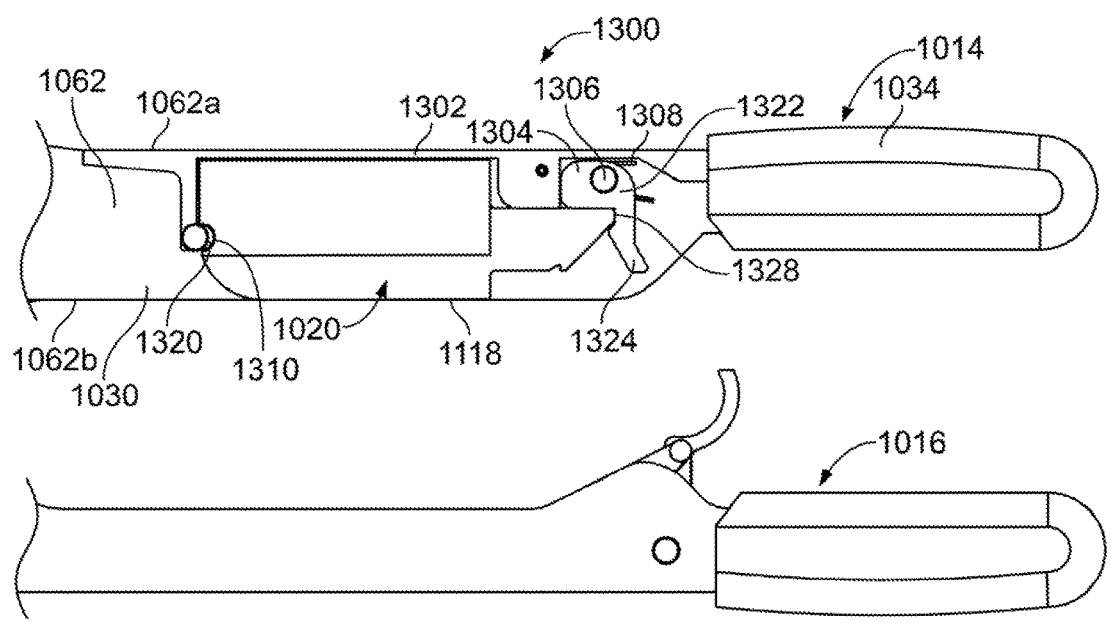
FIG. 68 is a partial enlarged side elevation view of the tool of FIG. 33 with some components removed so that internal structures can be seen.
Figure 69:
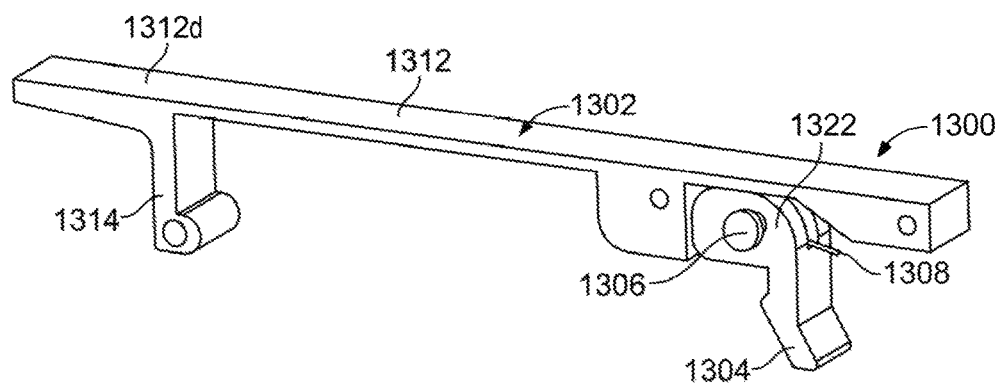
FIG. 69 is a rear perspective view of a portion of a blade storage assembly of the tool of FIG. 33.
Figure 70:
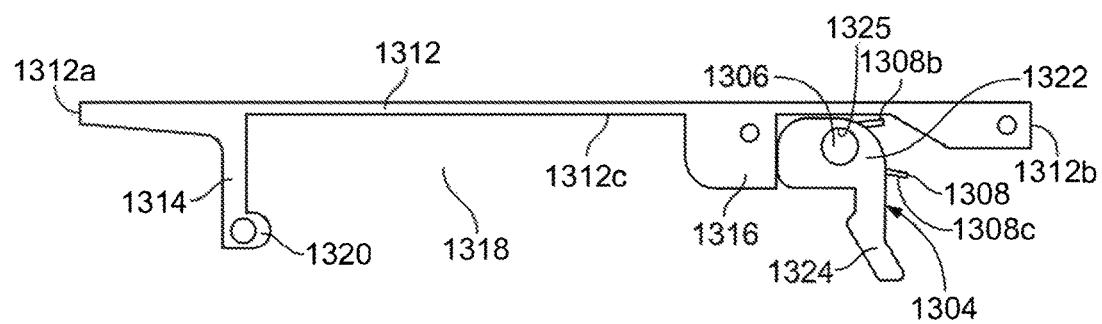
FIG. 70 is a side elevation view of the portion of the blade storage assembly.
Figure 71:
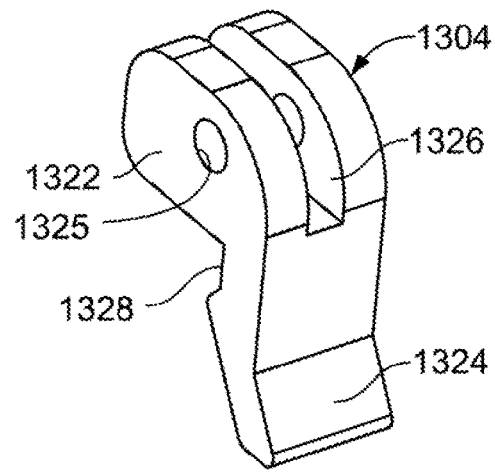
FIG. 71 is a rear perspective view of a lock member of the blade storage assembly.
Figure 72:
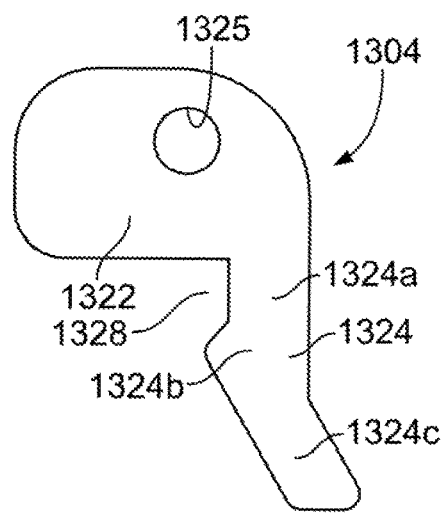
FIG. 72 is a side elevation view of the lock member of the blade storage assembly.
Figure 73:
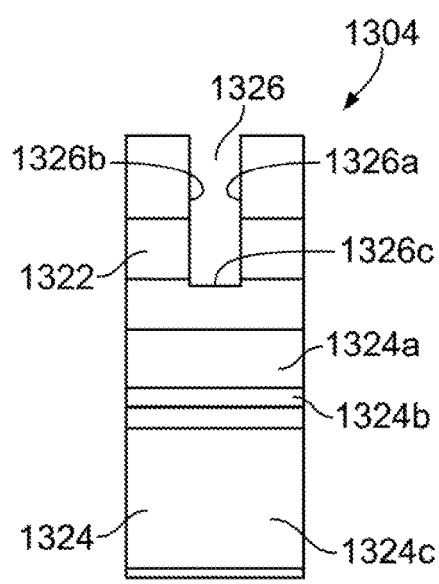
FIG. 73 is an end elevation view of the lock member of the blade storage assembly.

In the locked position as shown in FIGS. 65 and 66, the rear ends 1030b, 1032b of the stationary handle 1014 and the rear ends 1072b, 1074b of the movable handle 1016 are proximate to each other. The hook end 1110 of the driving pawl 1102 is engaged with the leading surface 1150 of the first tooth 1148a on the blade receiving gear 1128 and the tooth 1095 on the holding pawl 1092 is engaged with the leading surface 1150 or the top land 1154 of tooth 1148e. The first end wall 1226c of the lock wheel 1216 is engaged with the surface 1212 of the front portion 1082 of the elongated member 1072 of the movable handle 1016. Since lock wheel 1216 is engaged with the movable handle 1016 and the pawls 1092, 1102 bias the movable handle 1016 away from the stationary handle 1014, the handles 1014, 1016 are locked into position.

To move the tool 1010 from the locked position shown in FIGS. 65 and 66 to the pre-cut position as shown in FIG. 56, the movable handle 1016 is pivoted around pivot pin 1090 to move the rear ends 1072b, 1074b of the movable handle 1016 toward the rear ends 1030b, 1032b of the stationary handle 1014. This causes the first end wall 1226c to separate from the surface 1212 of the movable handle 1016, thereby allowing a user to rotate the lock wheel 1216. The lock wheel 1216 is rotated to disengage the first end wall 1226c from the surface 1212. In some embodiments, the lock wheel 1216 is rotated in the counter-clockwise direction. In some embodiments, the lock wheel 1216 is rotated in the clockwise direction. As the movable handle 1016 is released, the holding pawl 1092 moves over tooth 1148e which causes the hook end 1110 of the driving pawl 1102 to move over the first tooth 1148a and move to the pre-cut position as shown in FIG. 56. Thereafter, the workpiece 12 is inserted into the receiving space 1058 and the cut is performed.

To move the tool 1010 from the pre-cut position shown in FIG. 56 to the locked position shown in shown in FIGS. 65 and 66, the lock wheel 1216 is rotated in the opposite direction. As the lock wheel 1216 is rotated, the first end wall 1226c engages with the surface 1212 of the movable handle 1016. As the first end wall 1226c moves upwardly along the surface 1212, this causes the movable handle 1016 to pivot around the pivot pin 1090 and move the rear ends 1072b, 1074b of the movable handle 1016 toward the rear ends 1030b, 1032b of the stationary handle 1014. As the movable handle 1016 pivots, the pawls 1092, 1102 are biased in the clockwise direction until the pawls 1092, 1102 move into the locked position shown in FIGS. 65 and 66.

Figure 63:
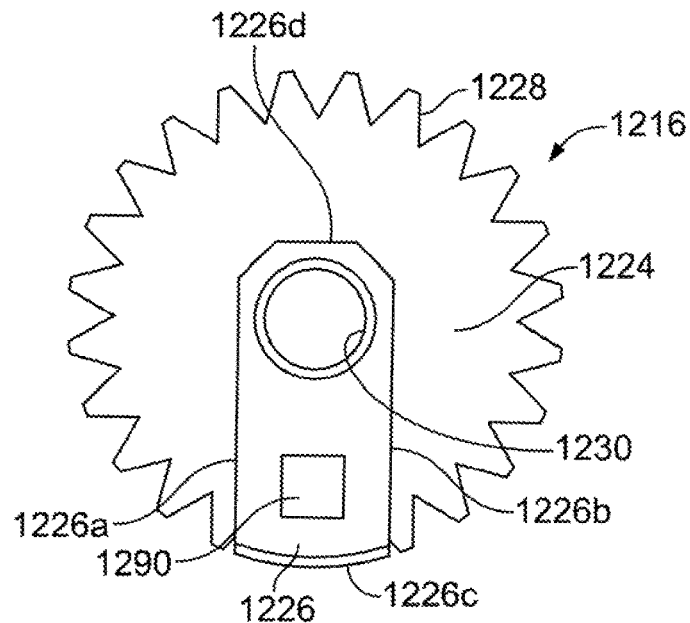
FIG. 63 is a side elevation view of a lock wheel of the tool of FIG. 33.
Figure 64:
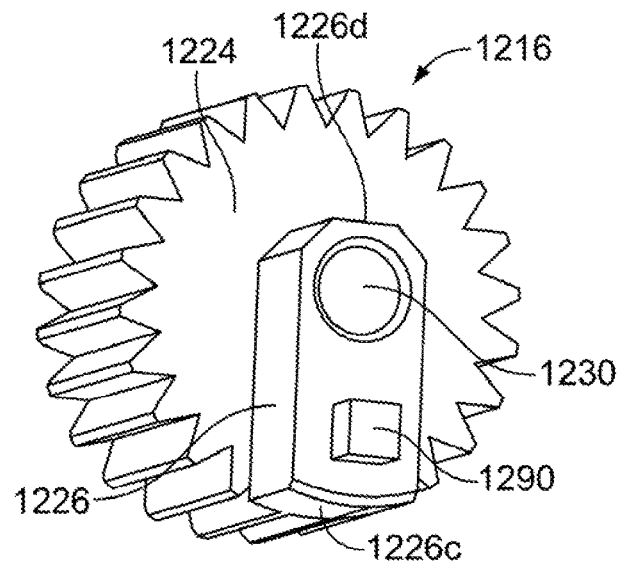
FIG. 64 is a perspective view of the lock wheel.

In some embodiments, a locking projection 1290, see FIG. 63, is provided on the ear 1226 proximate to the first end wall 1226c of the lock wheel 1216, and a recess 1292 is provided in the front edge of the first jaw 1024 proximate to, but spaced from, where in the pivot pin 123l extends through the first jaw 1024. The locking projection 1290 can engage with the recess 1292 to prevent the further rotation of the lock wheel 1216 relative to the handles 1014, 1016. While the recess 1292 is shown on the first jaw 1024, the recess 1292 could instead be provided on the second jaw 1026. While the locking projection 1290 is shown as provided on the ear 1226 of the lock wheel 1216, the ear 1226 could instead have the recess 1292 and the jaw 1024 (or 1026) has the locking projection 1290 extending therefrom.

In an embodiment, a spare blade 1020 may be stored in the stationary handle 1014 between the elongated members 1030, 1032 by a blade storage assembly 1300, see FIGS. 68-73. The blade storage assembly 1300 includes a support member 1302, a lock member 1304 pivotally attached to the elongated members 1030, 1032 by a pivot pin 1306, and a torsion spring 1308. The blade 1020 has notch 1310 provided in its upper end. The blade 1020 is stored in the stationary handle 1014 such that the blade 1020 is concealed from view when viewing the tool 1010 from the sides of the tool 1010.

The support member 1302 is formed from an elongated bar 1312 having a first leg 1314 extending downwardly therefrom proximate to a first end 1312a of the bar 1312, and a second leg 1316 extending downwardly therefrom proximate to a second end 1312b of the bar 1312. A blade receiving space 1318 is defined by the bar 1312, the first leg 1314 and the second leg 1316. The shape of the space 1318 mirrors the shape of the cutting edge 1118 and the body 1116 of the blade 1020 such that the cutting edge 1118 is proximate to, and may engage against, the lower surface 1312c of the bar 1312 that partially defines the space 1318. The first leg 1314 has an enlarged portion 1320 thereon which seats within the notch 1310 in the blade 1020. In an embodiment, the enlarged portion 1320 mirrors the shape of the notch 1310 in the blade 1020. In an embodiment, the enlarged portion 1320 is at the lower end of the leg 1314. The elongated bar 1312 is mounted between the rear portions 1062, 1068 of the elongated members 1030, 1032 such that a top surface 1312c of the elongated bar 1312 is flush with, or substantially flush with, the top surfaces 1062b, 1068b of the elongated members 1030, 1032. The first and second legs 1314, 1316 extend downwardly between the inner surfaces of the rear portions 1062, 1068 of the elongated members 1030, 1032, but do not extend below the bottom surfaces 1062c, 1068c of the elongated members 1030, 1032.

The lock member 1304 has a body 1322 with a leg 1324 extending from an end of the body 1322. An aperture 1325 is provided through the body 1322 proximate to the lower end thereof through which the pivot pin 1306 extends. The pivot pin 1306 is mounted to the rear portions 1062, 1068 of the elongated members 1030, 1032. A portion of the body 1322 is bifurcated by a slot 1326 which extends from an upper end of the body 1322 downwardly. The slot 1326 is formed of a first side wall 1326a which extends downwardly from the upper end of the body 1322, a second side wall 1326b which extends downwardly from the upper end of the body 1322, and a bottom wall 1326c connecting the lower ends of the side walls 1326a, 1326b. Each wall 1326a, 1326b, 1326c extends from a front end of the body 1322 to a rear end of the body 1322.

In an embodiment, the leg 1324 has an upper portion 1324a extending downwardly from the body 1322, an intermediate portion 1324b extending downwardly from the upper portion 1324a and at an angle relative thereto, and a lower portion 1324c extending downwardly from the intermediate portion 1324b and at an angle relative thereto. A notch 1328 is formed by the upper portion 1324a and the intermediate portion 1324b which generally mirrors the shape of the lower edge 1120c of the blade 1020. The lower portion 1324c forms a finger tab. When mounted between the rear portions 1062, 1068 of the elongated members 1030, 1032, the lower portion 1324c of the leg 1324 does not extends outwardly from the bottom surfaces 1062c, 1068c of the elongated members 1030, 1032.

The torsion spring 1308 seats within the slot 1326 and has a coiled portion wrapped around the pivot pin 1306 and legs 1308b, 1308c extending outwardly therefrom. The upper leg 1308b extends outwardly from the coiled portion and engages the lower surface 1312c of the bar 1312, and the lower leg 1308c extends outwardly from the coiled portion and engages with the bottom wall 1326c of the slot 1326. The torsion spring 1308 normally biases the lock member 1304 in a clockwise direction around the pivot pin 1306.

The blade 1020 can be inserted into and removed from the space 1318 without the use of tools.

To insert the blade 1020 into the space 1318, the user grasps the body 1116 with the cutting edge 1118 pointing upwardly. The body 1116 is pushed up into the space 1318, and the leg 1120 comes into contact with the lower portion 1324c of the leg 1324 of the lock member 1304. This contact causes the lock member 1304 to rotate in a counter-clockwise direction against the bias of its torsion spring 1308. The blade 1020 is continued to be pushed up toward the bar 1312 until the lower edge 1120c of the blade 1020 seats within the notch 1328. Once the lower edge 1120c of the blade 1020 is seated within the notch 1328, the lock member 1304 rotates in a clockwise direction under the bias of its torsion spring 1308 which then causes the blade 1020 to move forwardly to engage the enlarged portion 1320 within the notch 1310 in the blade 1020. This maintains the blade 1020 in the blade storage assembly 1300. The cutting edge 1118 of the blade 1020 is flush with, or recessed from, the bottom surface 1062c, 1068c of the elongated members 1030, 1032. As a result, the blade 1020 is hidden from view when the tool 1010 is viewed from the side. Since the blade 1020 is held by the blade storage assembly 1300 between the elongated members 1030, 1032 of the stationary handle 1014, the blade 1020 is not easily bumped by a user or by another tool in a tool box such that the blade 1020 is easily dislodged from the blade storage assembly 1300. Since the lower portion 1324c of the leg 1324 of lock member 1304 does not extends outwardly from the bottom surfaces 1062c, 1068c of the elongated members 1030, 1032, the lock member 1304 is not easily bumped by a user or by another tool in a tool box such that the blade 1020 is easily dislodged from the blade storage assembly 1300.

To remove the blade 1020 from the blade storage assembly 1300, the user grasps the lower portion 1324c of the lock member 1304 and pulls the lower portion 1324c rearwardly toward the rear ends 1030b, 1032b of the elongated members 1030, 1032 of the stationary handle 1014. This causes the lock member 1304 to rotate in a counter-clockwise direction against the bias of its torsion spring 1308. The user then pulls the blade 1020 away from the bar 1312 and rotates the blade 1020 in a clockwise direction to release the enlarged portion 1320 from the notch 1310. Once the blade 1020 is removed from the blade storage assembly 1300, the lock member 1304 is released rotates in a counter-clockwise direction under the force of its torsion spring 1308.

Figure 74:
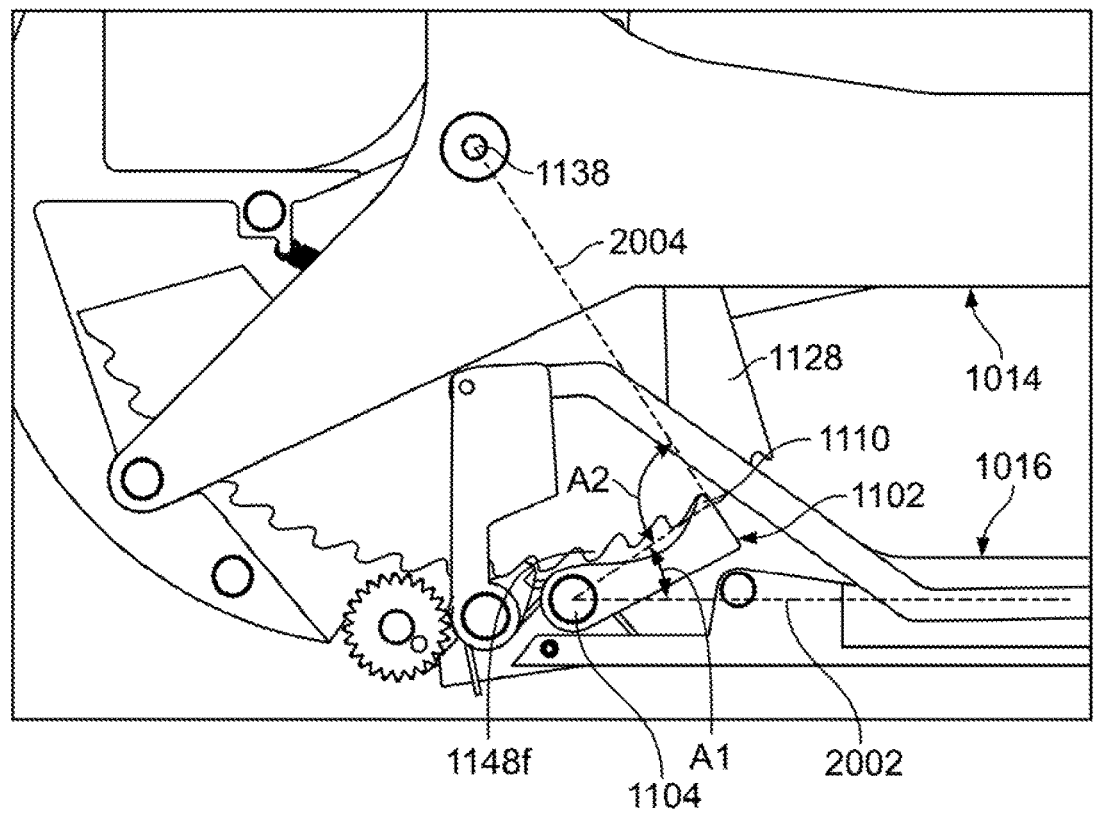
FIG. 74 is a partial side elevation view of the tool of FIG. 33 with some components removed so that internal structures can be seen, the tool of FIG. 33 being in a closed position.
Figure 75:
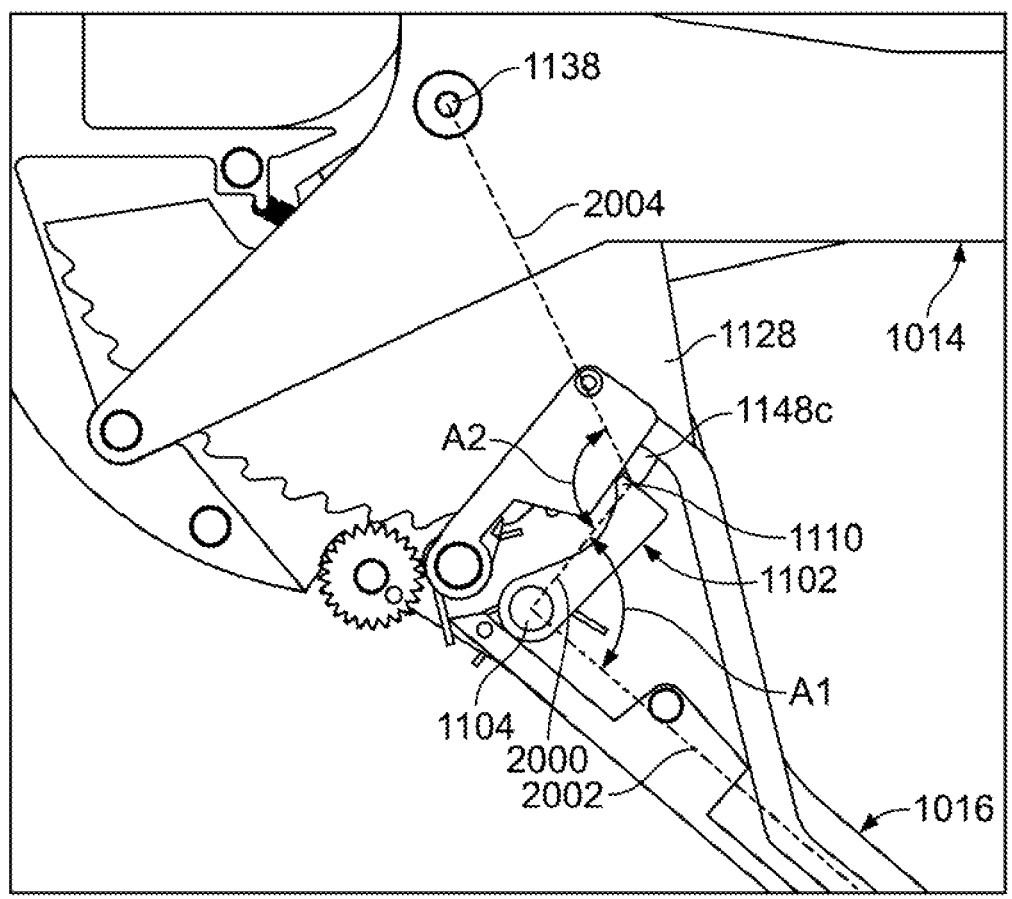
FIG. 75 is a partial side elevation view of the tool of FIG. 33 with some components removed so that internal structures can be seen, the tool of FIG. 33 being in an open position.

FIGS. 74 and 75 show the tool 1010 in closed and open positions and the driving pawl 1102 engagement angles with the teeth 1148a-n of the blade receiving gear 1128. In the closed position as shown in FIG. 74, the hook end 1110 of the driving pawl 1102 engages with one of the teeth, shown as tooth 1148c in FIG. 74. A first imaginary line 2000 is defined between the center of the driving pawl pin 1104 which forms the pivot of the driving pawl 1102 and the contact point of the hook end 1110 of the driving pawl 1102 with the tooth 1148c. A second imaginary line 2002 extends along the centerline of the movable handle 1016. A first angle A1 is defined between the lines 2000 and 2002. A third imaginary line 2004 is defined between the pivot pin 1138 and the contact point of the hook end 1110 of the driving pawl 1102 with the tooth 1148c. A second angle A2 is formed between the lines 2000 and 2004. First angle A1 when the handles 1014, 1016 are in the closed position is less than first angle A1 when the handles 1014, 1016 are in the open position, and second angle A2 when the handles 1014, 1016 are in the closed position is less than second angle A2 when the handles 1014, 1016 are in the open position. In an embodiment, angle A1 is approximately 35 degrees when the handles 1014, 1016 are in the closed position and is approximately 93 degrees when the handles 1014, 1016 are in the open position, and angle A2 is approximately 92 degrees when the handles 1014, 1016 are in the closed position and is approximately 116 degrees when the handles 1014, 1016 are in the open position. These angles A1 and A2 make the tool 1010 more efficient to use.

The blade 20, 1020 may be heat treated to provide for a long cutting life, and to prevent rusting of the blade 20, 1020. The tool 10, 1010 may be made of carbon steel for strength and durability. A corrosion resistant finish may be applied to the tool 10, 1010.

While the grips 34, 80, 1034, 1080 are shown as separate components, the grips 34, 80, 1034, 1080 may be integrally formed with the stationary and movable handles 14, 16, 1014, 1016.

One or more features of embodiments illustrated in FIGS. 1-32 can be combined with one or more features of embodiments illustrated in FIGS. 33-75. One or more features of embodiments illustrated in FIGS. 33-75 can be combined with one or more features of embodiments illustrated in FIGS. 1-32.

One or more features of embodiments illustrated in FIGS. 1-32 and/or in FIGS. 33-75 can be used with other tools, such as pliers configured to hold a workpiece 12, gripping tools configured to hold a workpiece 12, ratcheting tools configured to hold a workpiece 12, etc. In some embodiments, the blade 20, 1020 is replaced by a gripping jaw (not shown) such that the workpiece 12 can be gripped. Accordingly, the present disclosure is not limited solely for use with cutting tools.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A cutting tool comprising:
a stationary handle having a grip at an end thereof;
a movable handle having a grip at an end thereof, the movable handle being pivotally attached to the stationary handle;
a blade comprising a body having a cutting edge thereon and a leg extending from the body, the leg having a notched section formed therein, the cutting edge extending in a first direction;
a blade receiving gear pivotally attached to the stationary handle, the blade receiving gear comprising a body having a plurality of teeth on an edge thereof and a notch extending into the body of the blade receiving gear from an opposite edge thereof, the leg being seated within the notch;
a slide plate engaged with the body of the blade receiving gear, the slide plate being seated within the notch, the slide plate having a lock projection which is configured to seat within the notched section on the leg;
a spring engaged with the slide plate and the blade receiving gear, the spring configured to bias the lock projection of the slide plate into engagement with the notched section of the leg of the blade, the lock projection of the slide plate being biased into engagement with the leg of the blade in a second direction that is not parallel to the first direction; and
wherein the blade is removable from the blade receiving gear.

2. The cutting tool of claim 1, wherein the spring is a coil spring.

3. The cutting tool of claim 1, wherein the spring is a leaf spring.

4. The cutting tool of claim 1, wherein the notched section is generally V-shaped.

5. The cutting tool of claim 1, wherein the leg has a centerline which extends from a top of the leg to a bottom of the leg, and a bottom edge of the leg is angled relative to the centerline.

6. The cutting tool of claim 1, wherein the slide plate has a tab portion which extends outwardly from the blade receiving gear, wherein in use a user's hand is capable of gripping the portion.

7. The cutting tool of claim 1, wherein the body of the blade is substantially symmetrical on each side of the cutting edge.

8. The cutting tool of claim 1, further comprising a handle lock attached to the movable handle, wherein when the handle lock is engaged, the movable handle cannot move relative to the stationary handle.

9. The cutting tool of claim 8, wherein the handle lock comprises a lock wheel rotationally attached to the movable handle, the lock wheel having a projection thereon having first and second end surfaces, wherein the first end surface is generally aligned with an outer dimension of the lock wheel and the second end surface is spaced inwardly from the outer dimension, wherein the first end surface is configured to be engaged with the movable handle and disengaged from the movable handle.

10. The cutting tool of claim 1, further comprising a holding pawl pivotally attached to the movable handle and configured to be engaged with the teeth of the blade receiving gear, and a driving pawl pivotally attached to the movable handle and configured to be engaged with the teeth of the blade receiving gear.

11. The cutting tool of claim 1, further comprising a first plate having an elongated slot therein, the first plate being fixedly attached to the stationary handle, a second plate having an elongated slot therein, the second plate being fixedly attached to the blade receiving gear, wherein the blade receiving gear is pivotally attached to the stationary handle by a pivot pin, and further comprising a torsion spring having a coiled portion around the pivot pin, a first leg extending from the coiled portion and a second leg extending from the coiled portion, the first leg being seated within the slot in the first plate and the second leg being seated within the slot in the second plate.

12. The cutting tool of claim 11, wherein the first plate is integrally formed with the stationary handle and the second plate is integrally formed with the blade receiving gear.

13. The cutting tool of claim 1, wherein each grip has a length, and one of the grips is longer than the other grip.

14. The cutting tool of claim 13, wherein the lengths of the grips are defined by a ratio of 1.25:1.

15. The cutting tool of claim 13, wherein the grip of the movable handle is longer than the grip of the stationary handle.

16. The cutting tool of claim 15, wherein the lengths of the grips are defined by a ratio of 1.25:1.

17. The cutting tool of claim 1, further comprising a second blade attached to one of the handles.

18. The cutting tool of claim 17, wherein the second blade is mounted to a blade storage assembly comprising a bar and a rotatable lock.

19. The cutting tool of claim 1, wherein the stationary handle comprises first and second elongated members fixedly attached to each other, the blade receiving gear being pivotally attached between the first and second elongated members, each first and second elongated members having an elongated front portion, an elongated rear portion and an intermediate portion extending upwardly from a rear end of the front portion, wherein the blade is configured to seat between the intermediate portions of the first and second elongated members and the blade is configured to be rotated from in between the first and second elongated members.

20. The cutting tool of claim 1, wherein each tooth of the blade receiving gear is defined by a radius, the radius of some of the teeth varying from the radius of other ones of the teeth.

21. The cutting tool of claim 1, wherein each tooth of the blade receiving gear is defined by a radius, each tooth being defined by the same radius.

22. A cutting tool comprising:
a stationary handle having a grip at an end thereof;
a movable handle having a grip at an end thereof, the movable handle being pivotally attached to the stationary handle;
a blade comprising a body having a cutting edge thereon and a leg extending from the body, the leg having a notched section formed therein;
a blade receiving gear pivotally attached to the stationary handle, the blade receiving gear comprising a body having a plurality of teeth on an edge thereof and a notch extending into the body of the blade receiving gear from an opposite edge thereof, the leg being seated within the notch, wherein the blade is removable from the blade receiving gear;
a slide plate engaged with the body of the blade receiving gear, the slide plate being seated within the notch, the slide plate having a lock projection which is configured to seat within the notched section on the leg;
a spring engaged with the slide plate, the spring configured to bias the lock projection of the slide plate into engagement with the notched section of the leg;
a holding pawl pivotally attached to the movable handle and configured to be engaged with the teeth of the blade receiving gear;
a driving pawl pivotally attached to the movable handle and configured to be engaged with the teeth of the blade receiving gear; and
a release lever pivotally attached to the movable handle and configured to be engaged with at least one of the holding pawl and the driving pawl to disengage the holding pawl and the driving pawl from engagement with the teeth of the blade receiving gear.

23. The cutting tool of claim 22, wherein the release lever is configured to be engaged with the holding pawl, and the holding pawl is configured to be engaged with the driving pawl to disengage the holding pawl and the driving pawl from engagement with the teeth of the blade receiving gear.

24. The cutting tool of claim 22, wherein the release lever is configured to be engaged with the holding pawl and with the driving pawl to disengage the holding pawl and the driving pawl from engagement with the teeth of the blade receiving gear.

25. The cutting tool of claim 22, further comprising a release handle pivotally attached to the movable handle and connected to the release lever by a connecting rod, the release handle being proximate to the grip of the movable handle.

26. A cutting tool comprising:
a stationary handle having a grip at an end thereof;
a movable handle having a grip at an end thereof, the movable handle being pivotally attached to the stationary handle;
a blade comprising a body having a cutting edge thereon and a leg extending from the body, the leg having a notched section formed therein;

a blade receiving gear pivotally attached to the stationary handle, the blade receiving gear comprising a body having a plurality of teeth on an edge thereof and a notch extending into the body of the blade receiving gear from an opposite edge thereof, the leg being seated within the notch, wherein the blade is removable from the blade receiving gear;

a slide plate engaged with the body of the blade receiving gear, the slide plate being seated within the notch, the slide plate having a lock projection which is configured to seat within the notched section on the leg;

a spring engaged with the slide plate, the spring configured to bias the lock projection of the slide plate into engagement with the notched section of the leg;

a holding pawl pivotally attached to the movable handle and configured to be engaged with the teeth of the blade receiving gear; and a driving pawl pivotally attached to the movable handle at a pivot and configured to be engaged with the teeth of the blade receiving gear, a first imaginary line is defined between a center of the driving pawl pivot and a contact point of the driving pawl with one of the teeth, a second imaginary line is defined along a centerline of the movable handle, a first angle is formed between the first and second imaginary lines, wherein the movable handle is pivotally attached to the stationary handle at a pivot, a third imaginary line is defined between the movable handle pivot and the contact point of the driving pawl with the defined tooth, and a second angle is formed between the first imaginary line and the third imaginary line, wherein the first angle when the handles are in a closed position is less than first angle when the handles are in an open position, and the second angle when the handles are in the closed position is less than the second angle when the handles are in the open position.

27. The cutting tool of claim 26, wherein the first angle is 35 degrees when the handles are in the closed position and is 93 degrees when the handles are in the open position, and the second angle is 92 degrees when the handles are in the closed position and is 116 degrees when the handles are in the open position.

28. A cutting tool comprising:

a stationary handle having a grip at an end thereof;

a movable handle having a grip at an end thereof, the movable handle being pivotally attached to the stationary handle;

a blade comprising a body having a cutting edge thereon and a leg extending from the body, the leg having a notched section formed therein;

a blade receiving gear pivotally attached to the stationary handle, the blade receiving gear comprising a body having a plurality of teeth on an edge thereof and a notch extending into the body of the blade receiving gear from an opposite edge thereof, the notch having a first section which is configured to receive the leg of the blade;

a slide plate engaged with the body of the blade receiving gear, the slide plate being seated within a second section of the notch, the slide plate having a lock projection which is configured to seat within the notched section of the leg when the leg is seated in the first section;

a spring engaged with the slide plate and the blade receiving gear, the spring normally biasing the lock projection into the first section such that the lock projection is seated within the notched section when the leg is seated in the first section;

wherein the blade is removable from the blade receiving gear, and wherein the slide plate is biased in a direction out of the notched section of the leg to compress the spring by interaction of the leg and the lock projection during removal of the leg from the first section.

\* \* \* \* \*